(12) United States Patent
Wada et al.

(10) Patent No.: US 12,433,604 B2
(45) Date of Patent: Oct. 7, 2025

(54) HEMOSTATIC DEVICE

(71) Applicant: TERUMO KABUSHIKI KAISHA, Tokyo (JP)

(72) Inventors: Satoshi Wada, Shizuoka (JP); Yuichi Hioki, Shizuoka (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 481 days.

(21) Appl. No.: 17/890,664

(22) Filed: Aug. 18, 2022

(65) Prior Publication Data

US 2022/0387048 A1 Dec. 8, 2022

Related U.S. Application Data

(63) Continuation of application No. PCT/JP2021/006276, filed on Feb. 19, 2021.

(30) Foreign Application Priority Data

Feb. 21, 2020 (JP) .................................. 2020-028101

(51) Int. Cl.
*A61B 17/132* (2006.01)
*A61B 17/12* (2006.01)

(52) U.S. Cl.
CPC .............................. *A61B 17/1325* (2013.01); *A61B 2017/12004* (2013.01)

(58) Field of Classification Search
CPC ...... A61B 17/1325; A61B 2017/12004; A61B 2017/00438; A61B 17/132;

(Continued)

(56) References Cited

U.S. PATENT DOCUMENTS

| 2017/0231827 A1* | 8/2017 | Goree .................. A61F 13/064 |
| | | 602/53 |
| 2019/0029693 A1* | 1/2019 | Okamura ............. A61B 17/135 |

FOREIGN PATENT DOCUMENTS

| WO | 2018181314 A1 | 10/2018 |
| WO | 2019189438 A1 | 10/2019 |
| WO | 2019189439 A1 | 10/2019 |

OTHER PUBLICATIONS

International Search Report (PCT/ISA/210) with translation and Written Opinion (PCT/ISA/237) mailed on Mar. 30, 2021, by the Japan Patent Office as the International Searching Authority for International Application No. PCT/JP2021/006276. (10 pages).

(Continued)

*Primary Examiner* — Shaun L David
*Assistant Examiner* — Rachael L Geiger
(74) *Attorney, Agent, or Firm* — BUCHANAN INGERSOLL & ROONEY PC

(57) ABSTRACT

A hemostatic device includes a main body belt to be wound around at least a part of a patient's hand/wrist, and a pressing member positionable at a puncture site of the patient's hand to compress the puncture site. The main body belt includes a distal region, and a proximal region farther from the patient's fingertip than the distal region. The distal region includes an anchor portion having a space portion configured to receive the patient's finger and open at opposite ends to receive the patient's finger while the fingertip protrudes distally beyond the anchor portion. The pressing member allows the puncture site to be viewed from outside while the pressing member is at the puncture site, and is fixed to the distal region at a position spaced from the insertion port on an inner surface of the main body belt at which the insertion port is provided.

21 Claims, 44 Drawing Sheets

(58) Field of Classification Search
CPC ............ A61B 17/1322; A61B 17/1327; A61B 17/135; A61B 17/1355
See application file for complete search history.

(56) References Cited

OTHER PUBLICATIONS

English Translations of the International Search Report (Form PCT/ISA/210) and the Written Opinion of the International Searching Authority (Form PCT/ISA/237) issued Mar. 30, 2021, by the Japan Patent Office in corresponding International Application No. PCT/JP2021/006276. (6 pages).

* cited by examiner

HEMOSTATIC DEVICE

CROSS-REFERENCES TO RELATED APPLICATIONS

This application is a continuation of International Patent Application No. PCT/JP2021/06276 filed on Feb. 19, 2021, which claims priority to Japanese Patent Application No. 2020-028101 filed on Feb. 21, 2020, the entire content of both of which is incorporated herein by reference.

TECHNOLOGICAL FIELD

The present invention generally relates to a hemostatic device.

BACKGROUND DISCUSSION

As one of catheter procedures, a procedure is known in which various medical elongated bodies are introduced into a blood vessel through a puncture site (corresponding to a "site where bleeding is to be stopped") formed by puncturing the blood vessel of an arm or hand of a patient to perform treatment and therapy on a lesion site. For example, WO 2019/189439 discloses a hemostatic instrument for stopping bleeding at a puncture site that allows access to a palmar artery (including a distal radial artery) from an anatomical snuffbox located on a dorsal side of one's hand or from a position in the vicinity of the snuffbox.

The hemostatic instrument according to WO 2019/189439 includes a covering member that covers a dorsal side and a palm side of a hand of a patient, a finger sack portion into which a finger of the patient is inserted for preventing the covering member from falling off from the hand of the patient, a string-like member having a part thereof inserted into the covering member to increase a holding force for holding the covering member in the hand of the patient, and a balloon that is disposed on the covering member and applies a compressive force to the puncture site formed in the hand of the patient.

A surgeon such as a doctor (hereinafter, referred to as the "surgeon or the like") can stably hold the hemostatic instrument to the hand of the patient by the finger sack portion and the string-like member when stopping bleeding at the puncture site formed in the hand of the patient using the hemostatic instrument according to WO 2019/189439. The surgeon or the like can effectively apply the compressive force to the puncture site formed in the hand of the patient by supplying fluid to the balloon and inflating the balloon in a state in which the hemostatic instrument is disposed such that the covering member covers the hand of the patient.

However, the hemostatic instrument described in WO 2019/189439 may have the following problems.

When attaching the hemostatic instrument according to WO 2019/189439 to the hand of the patient, the surgeon or the like disposes the balloon provided on the covering member of the hemostatic instrument at the puncture site formed in the hand of the patient. At this time, the surgeon or the like needs to dispose the balloon at an appropriate position of the puncture site of the patient while paying attention to twisting or the like of the finger sack portion. Therefore, when stopping bleeding using the hemostatic instrument according to WO 2019/189439, the surgeon or the like may take time to accurately dispose the balloon at the puncture site formed in the hand of the patient. For this reason, regarding the puncture site formed in the hand, there is a need for a hemostatic instrument that allows the pressing member to be accurately disposed at the puncture site formed in the hand of the patient with a simpler operation.

SUMMARY

In view of the above, there exist a need for a hemostatic device that facilitates alignment of a pressing member to a puncture site formed in a hand of a patient, that is capable of preventing misalignment of the hemostatic device from the hand of the patient while stopping bleeding at the puncture site formed in the hand of the patient, and that allows a surgeon or the like to view the puncture site formed in the hand of the patient while stopping bleeding.

According to one aspect, a hemostatic device comprises: a main body belt configured to be wound around at least a part of a hand and a wrist of a patient; and a pressing member configured to be disposed at a site of the hand where bleeding is to be stopped to compress the site where bleeding is to be stopped. The main body belt includes a distal region and a proximal region that are positioned relative to one another so that when the pressing member is at the site on the hand where bleeding is to be stopped the proximal region of the main body belt is disposed at a position farther away from a fingertip of the hand of the patient than the distal region of the main body belt. The distal region of the main body belt includes an anchor portion comprising: a space portion configured to receive the finger of the patient so that the finger is positioned in the space portion, an insertion port that is opened toward the proximal region and that communicates with the space portion to allow the finger of the patient to be inserted into the space portion, and a distal opening that communicates with the space portion to allow the fingertip of the finger of the patient inserted into the space portion to protrude distally beyond the anchor portion. The pressing member is configured to allow the site where bleeding is to be stopped to be viewed from outside in a state in which the pressing member is disposed at the site where bleeding is to be stopped, and the pressing member is fixed to the distal region of the main body belt at a position spaced from the insertion port and being fixed on a surface of the main body belt in which the insertion port is provided.

Another aspect involves a hemostatic device hemostatic device comprises: a main body belt configured to be wound around at least a part of a hand and a wrist of a patient; and a pressing member configured to be disposed at a site on the hand where bleeding is to be stopped to compress the site where bleeding is to be stopped. The main body belt includes a distal region and a proximal region that are positioned relative to one another so that when the pressing member is at the site on the hand where bleeding is to be stopped the proximal region of the main body belt is disposed at a position farther away from a fingertip of the patient than the distal region of the main body belt. The distal region of the main body belt includes an anchor portion that comprises a space portion configured to receive the finger of the patient so that the finger is positioned in the space portion, and an insertion port that is opened toward the proximal region and that communicates with the space portion to allow the finger of the patient to be inserted into the space portion, with a center line extending throughout the anchor portion. The pressing member is configured to allow the site where bleeding is to be stopped to be viewed from outside in a state in which the pressing member is disposed at the site where bleeding is to be stopped, and the pressing member is fixed to the distal region of the main body belt at a position spaced from the insertion port and being fixed on a surface of the main body belt at which the insertion port is provided. The pressing member is disposed, at the main body belt, at a position different from a portion through which the center line of the anchor portion passes, and the pressing member is configured so that the pressing member includes both a short axis direction and a long axis direction that intersect one another. The long axis direction of the pressing member intersects the center line of the anchor portion.

According to the hemostatic device in a state in which the main body belt is wound around at least a part of the hand and the wrist of the patient, misalignment of the hemostatic device from the hand of the patient can be prevented by inserting the finger of the patient into the anchor portion disposed in the distal region of the main body belt. According to the above hemostatic devices, since the pressing member that applies a compressive force to the site formed in the hand of the patient where bleeding is to be stopped is implemented by a member that allows the site where bleeding is to be stopped to be viewed from the outside, a surgeon or the like can view the site where bleeding is to be stopped while stopping bleeding using the hemostatic devices. Therefore, the surgeon or the like can easily check a hemostasis state. In the above hemostatic devices, the pressing member is fixed to the distal region of the main body belt on the surface of the main body belt in which the insertion port of the anchor portion is provided. Therefore, when attaching the hemostatic device to the hand of the patient, the surgeon or the like can easily dispose the pressing member provided on the surface of the main body belt at the site of the hand of the patient where bleeding is to be stopped while inserting the finger of the patient into the insertion port of the anchor portion. Therefore, the surgeon or the like can easily attach the hemostatic device to the hand of the patient.

In the hemostatic device, the anchor portion into which the finger of the patient is inserted is provided with the distal opening. Therefore, when attaching the one hemostatic device to the hand of the patient, the surgeon or the like can easily dispose the pressing member at a puncture site formed in the hand of the patient with the anchor portion as a starting point while pulling the proximal region of the main body belt, while checking the fixation of the anchor portion to the finger of the patient. Therefore, the surgeon or the like can easily wind the main body belt in a short time in a manner of making the main body belt in close contact with the hand, while disposing the pressing member at the puncture site. Since the anchor portion has the distal opening, the one hemostatic device can be attached to the hand of the patient regardless of a size of the finger of the patient (such as a length of the finger of the patient).

In the hemostatic device, the pressing member is disposed not on the center line of the anchor portion, and the long axis direction of the pressing member intersects the direction along the center line of the anchor portion. Therefore, when attaching the another hemostatic device to the hand of the patient, the surgeon or the like can easily align, by pulling the proximal region of the main body belt in a state in which the finger of the patient is inserted into the anchor portion, the pressing member with the puncture site formed in the hand. Since the long axis direction of the pressing member intersects the direction along the center line of the anchor portion, the surgeon or the like can easily dispose the pressing member along an extensor pollicis longus muscle of the hand of the patient when attaching the another hemostatic device to the hand of the patient.

According to another aspect, a method comprises inserting a finger of a patient's hand through an insertion port of an anchor portion that communicates with a space portion in the anchor portion and positioning the finger in the space portion. The anchor portion is positioned on a first surface of a main body belt at a distal region of the main body belt, and the insertion port opens toward a proximal region of the main body belt. A pressing member is fixed to the first surface of the main body belt at the distal region of the main body belt, and the pressing member is spaced from the insertion port and projecting away from the first surface of the main body belt. The method additionally involves positioning the pressing member at a site of the patient's hand where bleeding is to be stopped, with the proximal region of the main body belt being disposed at a position farther away from a fingertip of the finger of the patient's hand than the distal region of the main body belt, and the pressing member being configured to allow the site of the patient's hand where bleeding is to be stopped to be viewed from outside while the pressing member is positioned at the site where bleeding is to be stopped. The positioning of the pressing member at the site of the patient's hand where bleeding is to be stopped occurs after the positioning of the finger of the patient in the space portion. The method also includes wrapping the main body belt around at least a part of a wrist or the hand of the patient while the pressing portion is in contact with the site of the patient's hand where bleeding is to be stopped to apply compression to the site of the patient's hand where bleeding is to be stopped.

DETAILED DESCRIPTION

First Embodiment

Figure 1:
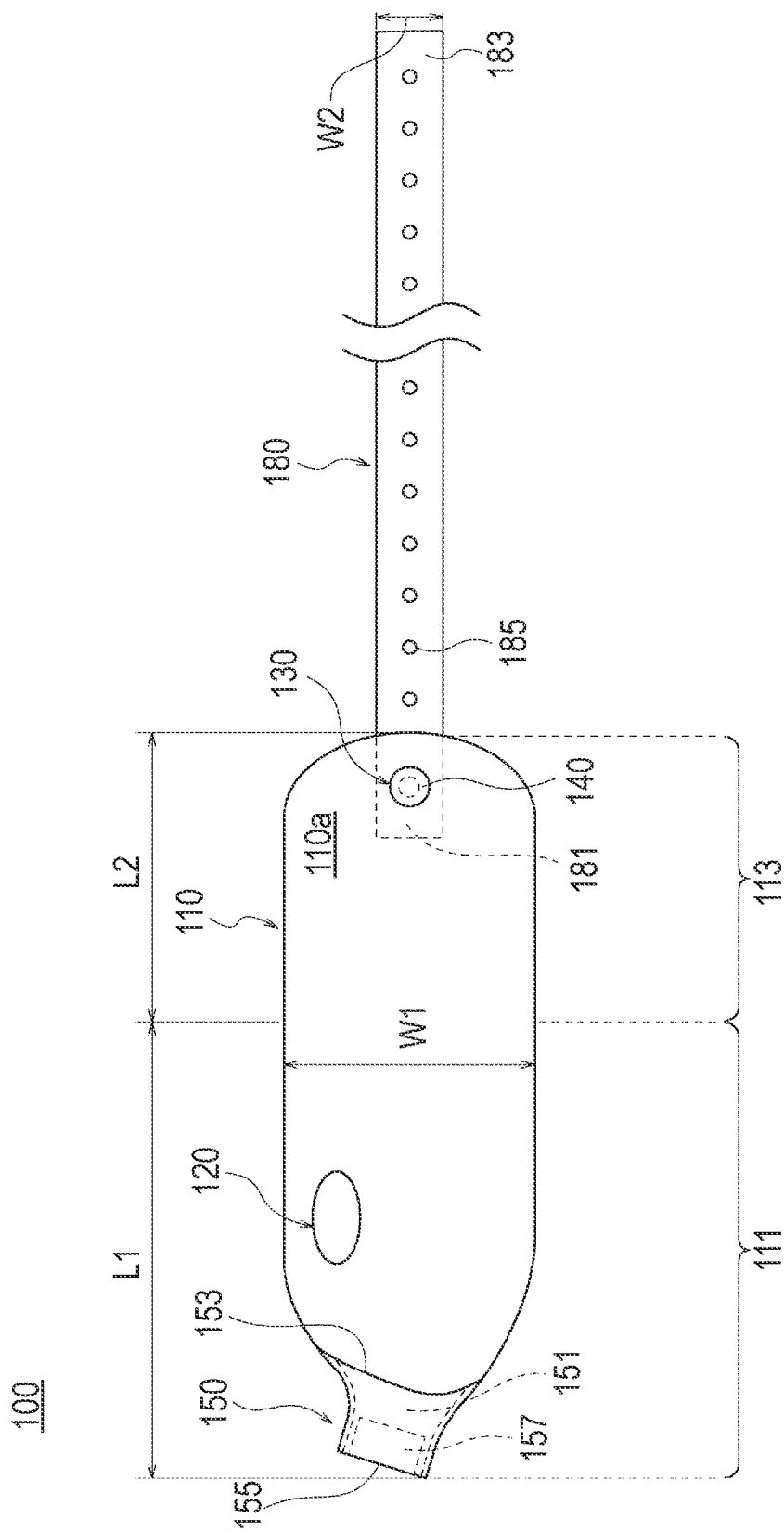
FIG. 1 is a plan view illustrating a hemostatic device according to a first embodiment as viewed from an inner surface (a surface) of a main body belt.

Set forth below with reference to the accompanying drawings is a detailed description of embodiments of a hemostatic device representing examples of the new hemostatic device disclosed here. The following description does not limit the technical scope and the meaning of terms described in the claims. Dimensional ratios in the drawings are exaggerated for convenience of description, and may be different from actual ratios. Hereinafter, a first embodiment of the hemostatic device will be described with reference to the accompanying drawings.

FIGS. 1 to 6 are views illustrating a hemostatic device 100 according to the first embodiment. FIGS. 7 to 13 are views illustrating procedures when stopping bleeding at a puncture site t1 formed in a right hand HR of a patient using the hemostatic device 100. FIGS. 14 to 21 are views illustrating procedures when stopping bleeding at the puncture site t1 formed in a left hand HL of the patient using the hemostatic device 100.

As illustrated in FIGS. 7 to 21 by way of example, the hemostatic device 100 can be used to stop bleeding at the puncture site t1 (corresponding to a "site where bleeding is to be stopped") formed in a radial artery (for example, an artery in the vicinity of an anatomical snuffbox or a distal radial artery traveling through a fingertip side relative to the snuffbox) of a palmar artery (a deep palmar artery) traveling through a dorsal side Hb of one's hand (the right hand HR or the left hand HL).

Figure 2:
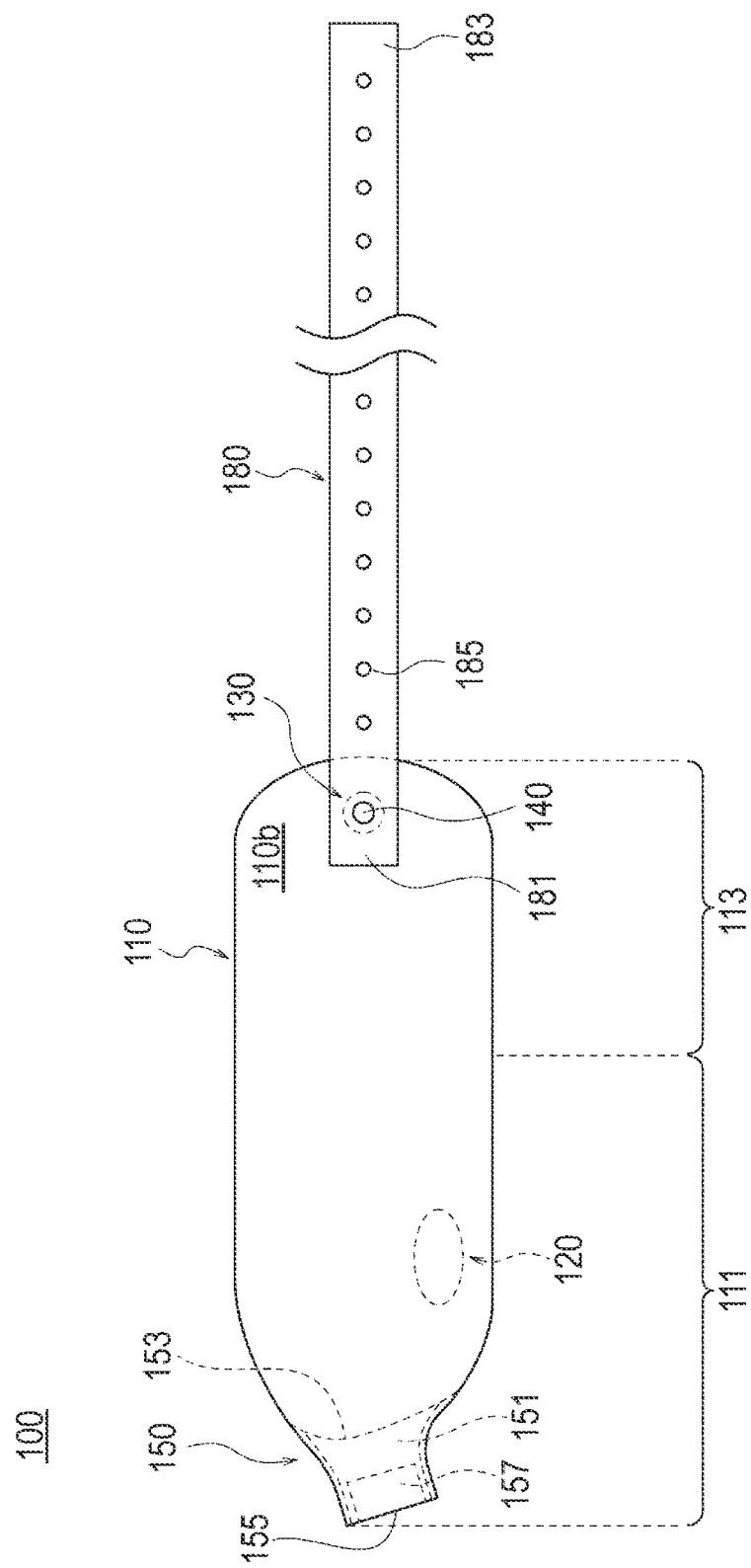
FIG. 2 is a plan view illustrating the hemostatic device according to the first embodiment as viewed from an outer surface of the main body belt.
Figure 3:
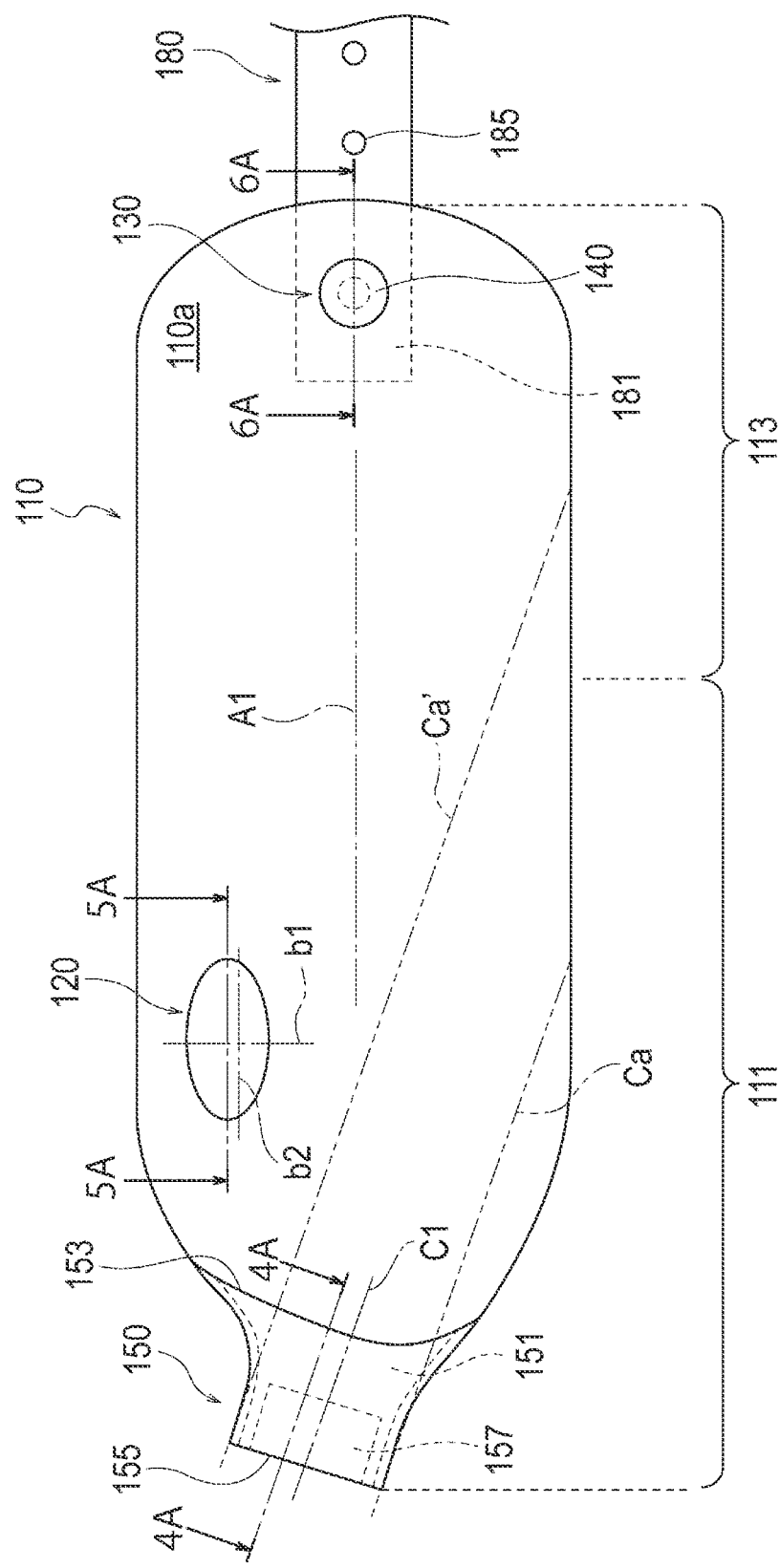
FIG. 3 is a plan view illustrating an enlarged part of the hemostatic device according to the first embodiment as viewed from the inner surface of the main body belt.
Figure 4:
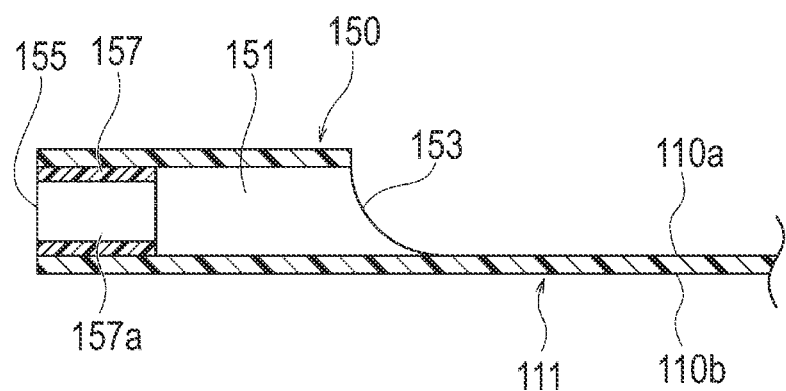
FIG. 4 is a cross-sectional view taken along a line 4A-4A illustrated in FIG. 3.

Generally, as illustrated in FIGS. 1 to 3, 13, and 21, the hemostatic device 100 includes a main body belt 110 that is wound around at least a part of a hand and a wrist WS of the patient, and a pressing member 120 that is disposed at the puncture site t1 formed in the hand of the patient and compresses the puncture site t1. As illustrated in FIG. 3, the main body belt 110 includes a distal region 111 and a proximal region 113 disposed at a position farther away from a fingertip of the patient than the distal region 111. As illustrated in FIG. 4, the distal region 111 is provided with an anchor portion 150 including a space portion 151 that allows a finger of the patient to be disposed into, an insertion port 153 that is opened toward the proximal region 113 and allows the finger of the patient to be inserted into the space portion 151, and a distal opening 155 that allows the fingertip of the finger of the patient inserted into the space portion 151 to protrude therefrom. The pressing member 120 is implemented by a member that allows the puncture site t1 to be viewed from outside in a state in which the pressing member 120 is disposed at the puncture site t1, and is fixed to the distal region 111 at a position away from (spaced from) the insertion port 153 on an inner surface 110a (corresponding to a "surface") of the main body belt 110 in which the insertion port 153 is provided.

FIGS. 1 and 3 illustrate the hemostatic device 100 as viewed from the inner surface 110a of the main body belt 110. FIG. 2 illustrates the hemostatic device 100 as viewed from an outer surface 110b of the main body belt 110. In the present specification, the "inner surface 110a of the main body belt 110" is a surface facing a body surface of the patient when the hemostatic device 100 is attached to the right hand HR (or the left hand HL) of the patient. The "outer surface 110b of the main body belt 110" is a surface opposite to the inner surface 110a.

Main Body Belt

As illustrated in FIGS. 1, 2, and 3, the main body belt 110 includes the distal region 111 and the proximal region 113. The distal region 111 includes the anchor portion 150 into which the finger of the patient is inserted when the hemostatic device 100 is attached to the patient. The proximal region 113 is a region including an end portion of the main body belt 110 that is located opposite to the distal region 111.

In the proximal region 113, a connection portion 130 to which an auxiliary belt 180, which will be described later, is connected is disposed. In an unattached state of the hemostatic device 100 illustrated in FIGS. 1, 2, and 3, the distal region 111 is located on a lower side in the drawings, and the proximal region 113 is located on an upper side in the drawings.

Figure 13:
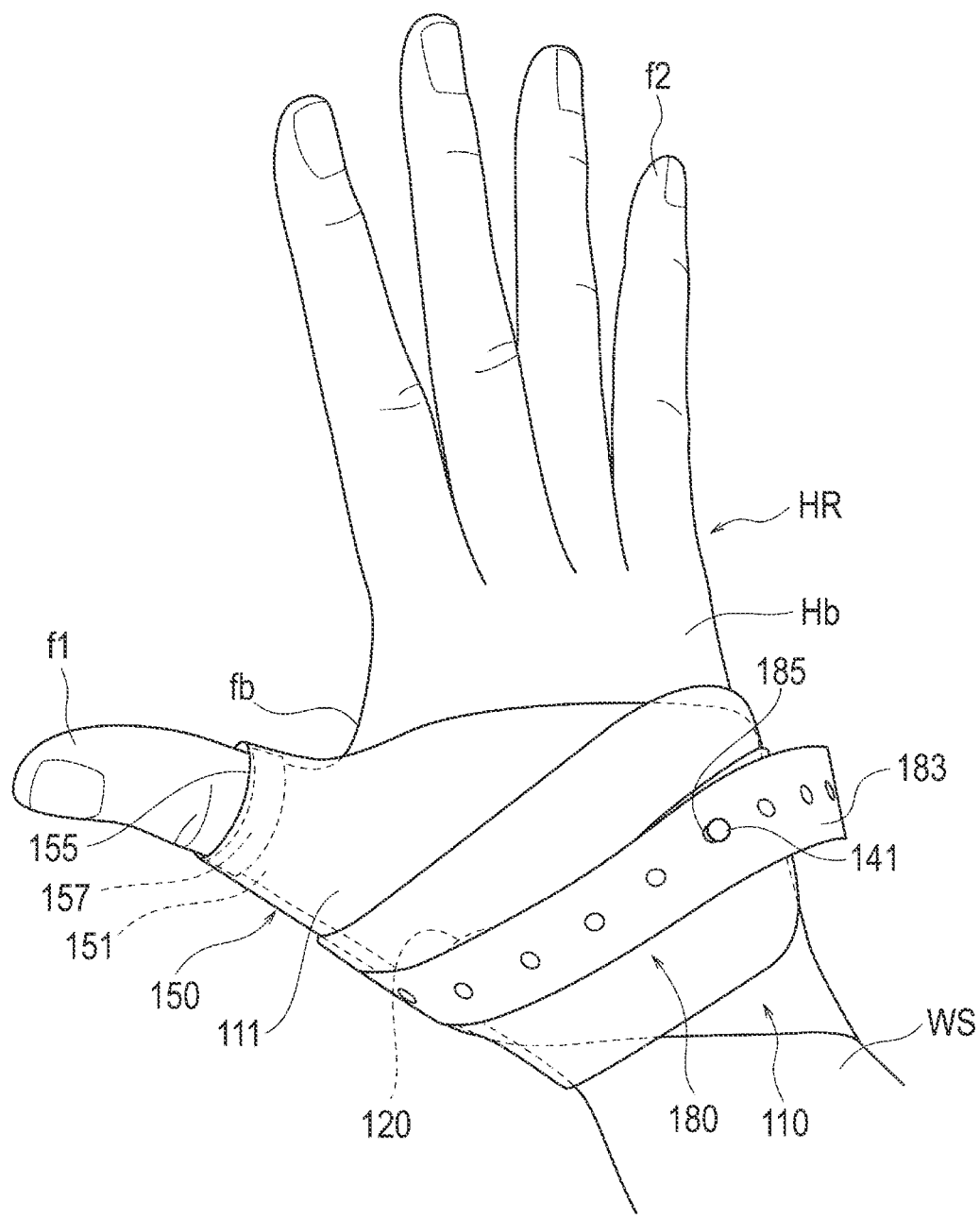
FIG. 13 is a perspective view illustrating a procedure when stopping bleeding at the puncture site formed in the right hand of the patient using the hemostatic device according to the first embodiment.

The main body belt 110 may be implemented by a flexible member. The main body belt 110 may be implemented by a material having physical properties that allow the hemostatic device 100 to be held on the hand of the patient with the main body belt 110 alone in a state in which the main body belt 110 is wound around at least a part of the hand and the wrist WS of the patient. In other words, the "physical properties that allow the hemostatic device 100 to be held on the hand of the patient with the main body belt 110 alone" mean physical properties that allow, by frictional resistance generated between the hand and wrist WS of the patient and the main body belt 110, the hemostatic device 100 including the main body belt 110 to not fall off the hand and the wrist WS of the patient due to the own weight of the hemostatic device 100 in a state in which the main body belt 110 is wound a predetermined number of times along an outer periphery of the hand and the wrist WS of the patient as illustrated in FIG. 13. Examples of a constituent material from which the main body belt 110 having the physical properties described above may be fabricated include soft silicone rubber, or soft urethane rubber.

The main body belt 110 is preferably transparent, translucent, colored transparent, or the like so as to allow the puncture site t1 to be checked by visual observation from the outer surface 110b of the main body belt 110 in a state in which the main body belt 110 is wound in a manner of covering the puncture site t1 formed in the hand of the patient.

The main body belt 110 extends along a longitudinal direction in which the distal region 111 and the proximal region 113 are adjacent to each other. A planar shape of the main body belt 110 is a substantially oval shape except for the anchor portion 150 provided in the distal region 111. A length L1 of the distal region 111 in the longitudinal direction illustrated in FIG. 1 may be, for example, 200 mm to 400 mm. When the length L1 of the distal region 111 is in the above range, a length of the anchor portion 150 along the longitudinal direction of the main body belt 110 (a linear distance along a vertical direction in FIG. 1) may be, for example, 70 mm to 130 mm. A length L2 of the proximal region 113 in the longitudinal direction may be, for example, 70 mm to 330 mm.

A width (a width of the main body belt 110 in a direction orthogonal to the longitudinal direction) W1 of the main body belt 110 is larger than a width W2 of the auxiliary belt 180 described later. The width W1 of the main body belt 110 may be, for example, 60 mm to 120 mm. When the width W1 of the main body belt 110 is in the above range, the width W2 of the auxiliary belt 180 may be, for example, 20 mm to 40 mm. Note that the width W2 of the auxiliary belt 180 is preferably larger than a dimension of the pressing member 120 along a short axis direction. Since the auxiliary belt 180 has the width W2, the auxiliary belt 180 can stably compress the pressing member 120. Since the width W2 of the auxiliary belt 180 is smaller than the width W1 of the main body belt 110, when the auxiliary belt 180 is wound around the hand of the patient, the auxiliary belt 180 can be prevented from applying a compressive force to unnecessary portions other than the pressing member 120.

Pressing Member

Figure 5:
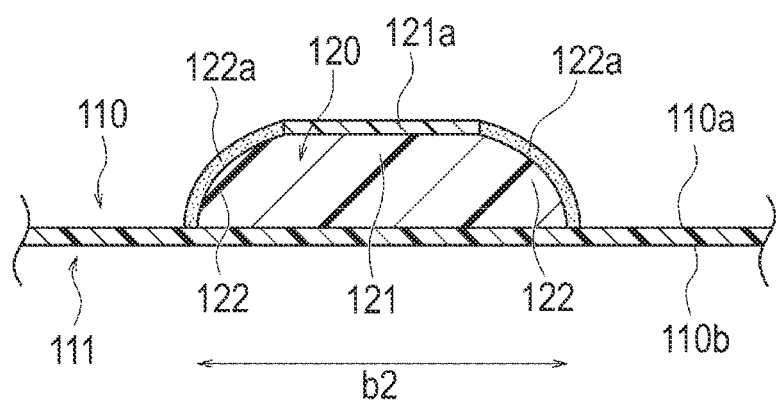
FIG. 5 is a cross-sectional view taken along a line 5A-5A illustrated in FIG. 3.

As illustrated in FIG. 5, the pressing member 120 is fixed to the inner surface 110a of the main body belt 110. A method for fixing the pressing member 120 to the inner surface 110a of the main body belt 110 is not particularly limited, and for example, adhesion or fusion can be adopted.

The pressing member 120 has a convex cross-sectional shape protruding or upstanding in a direction away from the main body belt 110. In a state in which the hemostatic device 100 is attached to the hand of the patient, the pressing member 120 is disposed at the puncture site t1 in the hand of the patient, thereby applying the compressive force to the puncture site t1 and the vicinity thereof.

As illustrated in FIG. 3, the pressing member 120 is disposed in a portion of the main body belt 110 different from a portion through which a center line C1 of the anchor portion 150 passes. That is, the pressing member 120 is not disposed on the center line C1 of the anchor portion 150 in the main body belt 110 (the pressing member 120 is spaced from the center line C1). Here, the center line C1 of the anchor portion 150 is a line passing through a center of the distal opening 155 in FIG. 3, which is a plan view as viewed from inside of the main body belt 110. When the distal opening 155 defines a space by a holding member 157 or the like, the center line C1 of the anchor portion 150 is a line passing through a center of the space portion 151 when viewed from the distal opening 155. As illustrated in FIG. 3, the pressing member 120 is preferably disposed in a portion different from a region (a region including the center line C1 of the anchor portion 150 and extending from two distal ends of the distal opening 155 toward a proximal side in parallel with the center line C1, a region surrounded by two-dot chain lines Ca-Ca' in FIG. 3) corresponding to the distal opening 155 of the anchor portion 150 in a direction parallel to the center line C1 of the anchor portion 150. That is, it is preferable that the pressing member 120 is not disposed at a position overlapping the distal opening 155 of the anchor portion 150 in a direction parallel to the center line C1 of the anchor portion 150. As shown in FIG. 3, the two lines Ca, Ca' are parallel to one another, are parallel to the center line of the anchor portion, and are disposed at diametrically opposite portions of the outer surface of the distal opening 155 of the anchor portion. Accordingly, when the hemostatic device 100 is disposed at the puncture site t1 formed in the hand of the patient, the pressing member 120 is not located on an axis of the finger on which the anchor portion 150 is disposed, and thus the surgeon or the like can easily align the pressing member 120 with the puncture site t1 while winding the main body belt 110 around the hand of the patient. In the present embodiment, the pressing member 120 is disposed at a position biased toward one end portion (a left side in FIG. 3) from a central portion of the main body belt 110 in a width direction.

As illustrated in FIG. 3, the pressing member 120 has the short axis direction (a direction parallel to a straight line b1) and a long axis direction (a direction parallel to a straight line b2) intersecting the short axis direction b1. In the present embodiment, the pressing member 120 has a substantially elliptical planar shape. The long axis direction b2 of the pressing member 120 is substantially parallel to a long axis direction (a direction parallel to a straight line A1) of the main body belt 110 along the longitudinal direction. A length of the pressing member 120 in the short axis direction b1 may be, for example, 10 mm to 20 mm, and a length of the pressing member 120 in the long axis direction b2 may be, for example, 20 mm to 40 mm.

The pressing member 120 may be transparent, translucent, colored transparent or the like so as to allow the puncture site t1 to be checked by visual observation from the outer surface 110b of the main body belt 110 via the pressing member 120 in a state in which the pressing member 120 is disposed at the puncture site t1 formed in the hand of the patient. When the pressing member 120 includes a first region 121 and a second region 122, which will be described later, in the pressing member 120, at least the first region 121 may be implemented by a member that allows the puncture site t1 to be viewed from the outside.

As illustrated in FIG. 5, the pressing member 120 includes the first region 121 disposed at the puncture site t1 formed in the hand of the patient, and the second region 122 surrounding the first region 121.

The first region 121 may be implemented by a region including a most protruding top portion in a cross section of the pressing member 120. In the present embodiment, the first region 121 has a flat surface shape substantially parallel to the long axis direction b2 of the pressing member 120. The second region 122 is implemented by an inclined surface extending curvedly from the first region 121 toward the inner surface 110a of the main body belt 110. The cross-sectional shape of the pressing member 120 is not limited to the shape illustrated in FIG. 5.

The second region 122 has an adhesive layer 122a having adhesiveness higher than that of a material for the pressing member 120. That is, the adhesive layer 122a is more adhesive than the material constituting the pressing member 120. The adhesive layer 122a has a color different from that of the first region 121. The adhesive layer 122a may be implemented by, for example, a surgical tape adhesive such as an acrylic-based adhesive, a rubber-based adhesive, a silicone-based adhesive, or a urethane-based adhesive. For example, for the adhesive layer 122a, the silicone-based adhesive, or the acrylic-based adhesive may be used. The adhesive layer 122a preferably has, for example, a color of green or blue that can be easily distinguished from blood. In order to make the first region 121 and the second region 122 distinguishable by visual observation or the like, a portion of the pressing member 120 where the adhesive layer 122a is disposed may be colored with a color different from that of the first region 121.

The first region 121 has a water repellent layer 121a having water repellency higher than that of the adhesive layer 122a of the second region 122. The water repellent layer 121a may be implemented by, for example, a material such as vinyl chloride or silicone.

Anchor Portion

As illustrated in FIG. 4, the anchor portion 150 includes the space portion (space or hollow portion) 151 that allows the finger (for example, a thumb f1 or a little finger f2) of the patient to be inserted into, the insertion port 153 communicating with the space portion 151, and the distal opening 155 that allows the fingertip of the finger of the patient inserted into the space portion 151 to protrude therefrom.

The insertion port 153 has a cross-sectional shape curved in an arc shape from the space portion 151 toward a center (a right side in FIG. 4) of the main body belt 110 in the longitudinal direction. By forming the insertion port 153 in this manner, the patient can smoothly insert the finger into the space portion 151.

The anchor portion 150 includes the holding member 157 that holds or maintains the shape of the space portion 151. The holding member 157 is implemented by a hollow tubular member. The holding member 157 is inserted into or positioned in the space portion 151 and supports an inner surface of the anchor portion 150 in the space portion 151. The holding member 157 may be implemented by a resin material or a metal material that is harder than a material for the anchor portion 150.

In the present embodiment, the anchor portion 150 is formed integrally with the main body belt 110 by the same material as that of the main body belt 110. Alternatively, the anchor portion 150 may be implemented by a member independent of the main body belt 110 and fixed to the main body belt 110.

A long axis direction (a direction parallel to the center line C1) of the anchor portion 150 along a longitudinal direction extends in a direction intersecting the long axis direction A1 of the main body belt 110 along the longitudinal direction. Specifically, the anchor portion 150 is inclined toward the one end portion (the left side in FIG. 3) in the width direction of the main body belt 110.

A specific shape or structure of the anchor portion 150 is not particularly limited as long as the anchor portion 150 allows at least one of the fingers of the patient to be inserted. In the present embodiment, the distal opening 155 is formed in the anchor portion 150. The anchor portion 150 is thus open at opposite ends. Alternatively, in a hemostatic device according to another embodiment, the anchor portion 150 may be provided with the space portion 151 having a closed distal end. The anchor portion 150 could thus include a blind hole. For example, the inside of the space portion 151 of the anchor portion 150 may be provided with a hole portion or the like having a part thereof communicating with the outside of the space portion 151.

Connection Portion

Figure 6:
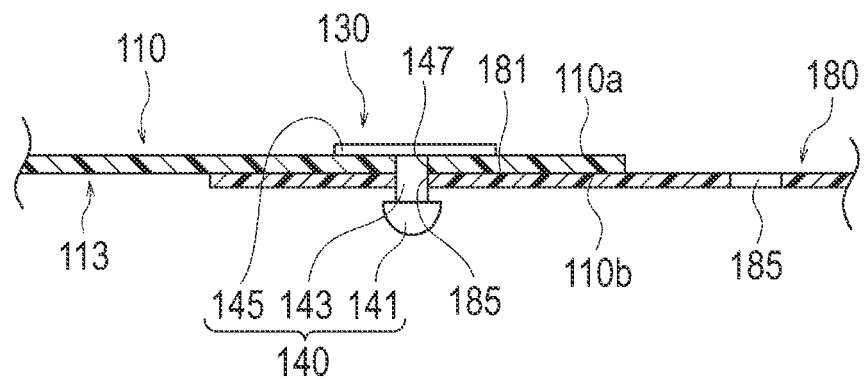
FIG. 6 is a cross-sectional view taken along a line 6A-6A illustrated in FIG. 3.

As illustrated in FIGS. 3 and 6, the main body belt 110 includes the connection portion 130 that allows the auxiliary belt 180, which will be described later, to be attached to the main body belt 110.

As illustrated in FIG. 3, the connection portion 130 is disposed at a position overlapping the insertion port 153 of the anchor portion 150 in the longitudinal direction of the main body belt 110. The connection portion 130 is disposed in the vicinity of a proximal portion of the proximal region 113 of the main body belt 110.

The connection portion 130 includes a fixing member 140 that is insertable through a hole portion 185 of the auxiliary belt 180. The fixing member 140 includes a head portion 141 disposed on the main body belt 110 on the outer surface 110b side, an insertion portion 143 inserted through a connection hole 147 formed in the proximal region 113 of the main body belt 110, and a locking portion 145 disposed on the main body belt 110 on the inner surface 110a side.

Auxiliary Belt

As illustrated in FIGS. 1 to 3, the hemostatic device 100 includes the auxiliary belt 180 that assists in compressing the puncture site t1 by the pressing member 120. As described above, the width W1 of the main body belt 110 is larger than the width W2 of the auxiliary belt 180.

As illustrated in FIGS. 1 and 3, the auxiliary belt 180 has a plurality of hole portions 185 disposed at different positions of the auxiliary belt 180 in the longitudinal direction. The plurality of hole portions 185 are disposed between one end portion 181 and the other end portion 183 in the longitudinal direction of the auxiliary belt 180.

As illustrated in FIG. 6, the one end portion 181 of the auxiliary belt 180 overlaps the proximal region 113 of the main body belt 110 on the main body belt 110 on the outer surface 110b side. The insertion portion 143 of the fixing member 140 is inserted through the connection hole 147 of the main body belt 110 and the hole portion 185 of the auxiliary belt 180. The head portion 141 and the locking portion 145 of the fixing member 140 each have a larger outer shape than the connection hole 147 of the main body belt 110 and the hole portion 185 of the auxiliary belt 180. Therefore, the fixing member 140 can prevent the head portion 141 and the locking portion 145 of the fixing member 140 from coming out of the connection hole 147 of the main body belt 110 and the hole portion 185 of the auxiliary belt 180. Accordingly, the main body belt 110 and the auxiliary belt 180 are connected via the fixing member 140 so as not to be separated from each other.

When the main body belt 110 is wound around the hand of the patient, as illustrated in FIG. 13, the head portion 141 of the fixing member 140 can be inserted through the hole portion 185 that is not adjacent to the hole portion 185 (see FIG. 3) at which the auxiliary belt 180 is connected in a positionally-fixed manner to the main body belt 110. Accordingly, the auxiliary belt 180 wound along the outer periphery of the hand of the patient can be fixed to the main body belt 110 at a predetermined position different from the one end portion 181 of the auxiliary belt 180. The surgeon or the like can firmly hold the main body belt 110 to the hand of the patient by fixing, via the fixing member 140, the hole portion 185 that is not adjacent to the hole portion 185 formed in the vicinity of the one end portion 181 of the auxiliary belt 180 to the main body belt 110.

A specific configuration of the connection portion 130 that connects the main body belt 110 and the auxiliary belt 180 is not particularly limited as long as the connection portion 130 can connect the main body belt 110 and the auxiliary belt 180. The connection portion 130 may be implemented by, for example, a hook-and-loop fastener that attachably and detachably connects the main body belt 110 and the auxiliary belt 180.

The auxiliary belt 180 may be implemented by, for example, a material harder than the material for the main body belt 110 so as to increase the compressive force applied to the puncture site t1 by the pressing member 120 when the auxiliary belt 180 is wound around the hand of the patient. Examples of the material for the auxiliary belt 180 include polypropylene, silicone rubber, or vinyl chloride.

The auxiliary belt 180 may be, for example, transparent, translucent, or colored transparent so as to allow the surgeon or the like to visually observe the puncture site t1 when the auxiliary belt 180 covers the puncture site t1 formed in the hand of the patient.

The surgeon or the like may use a plurality of auxiliary belts 180 when stopping bleeding using the hemostatic device 100. The surgeon or the like may wind one auxiliary belt 180 along the outer periphery of the hand of the patient (see FIG. 13), and may hook another auxiliary belt(s) 180 on an interfinger portion fb (for example, the interfinger portion fb between the thumb f1 and an index finger) of the hand of the patient. In this case, the another auxiliary belts 180 may be fixed to the fixing member 140 of the main body belt 110 via the hole portions 185. In treatment using the hemostatic device 100, the surgeon or the like can more stably hold the hemostatic device 100 on the hand of the patient using the plurality of auxiliary belts 180 as described above.

Next, examples of using the hemostatic device 100 will be described.

First Example of Use of the Hemostatic Device 100

Procedures when stopping bleeding at the puncture site t1 formed on the dorsal side Hb of the right hand HR of the patient using the hemostatic device 100 will be described with reference to FIGS. 7 to 13.

Figure 7:
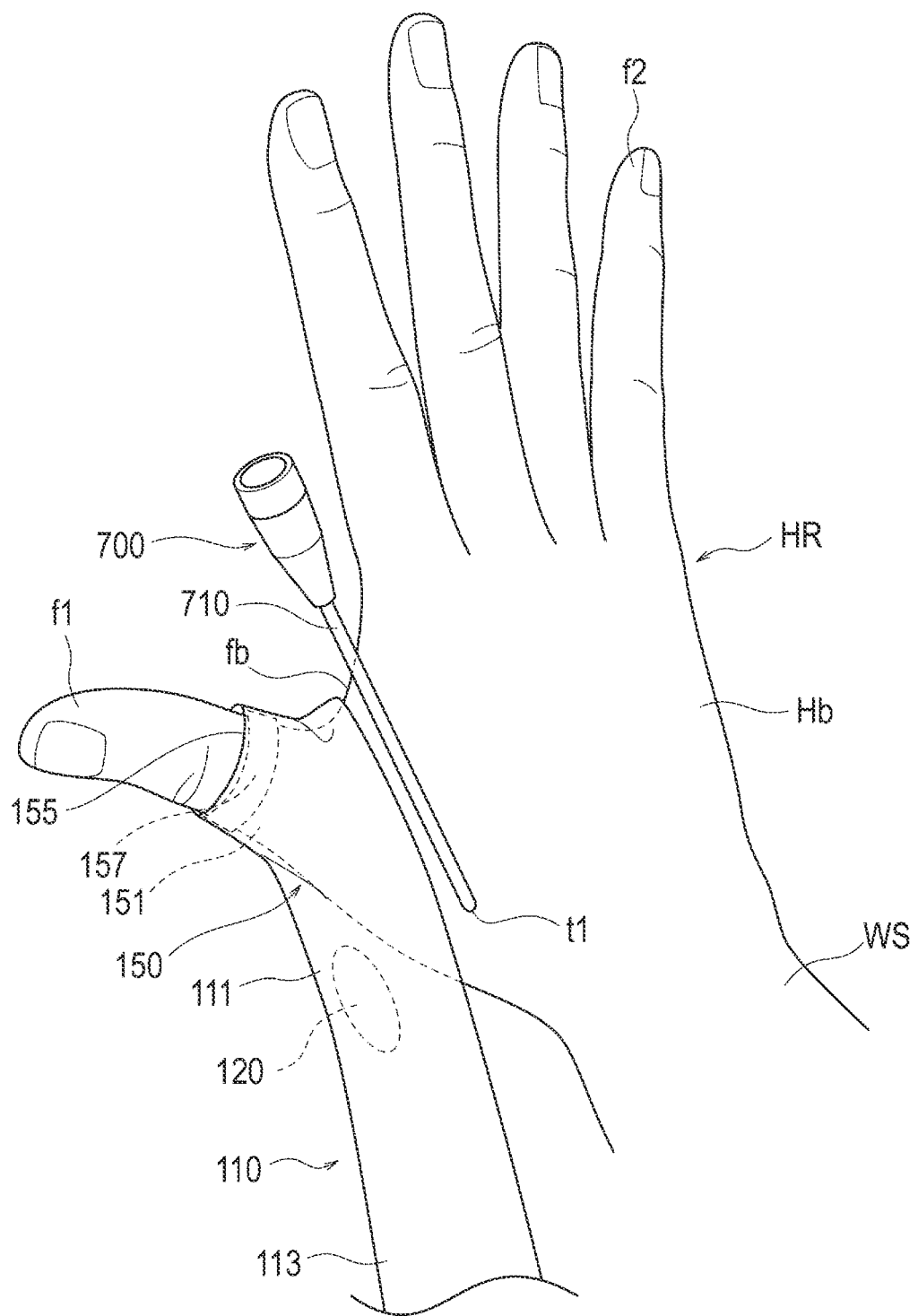
FIG. 7 is a perspective view illustrating a procedure when stopping bleeding at a puncture site formed in a right hand of a patient using the hemostatic device according to the first embodiment.

FIG. 7 illustrates a state in which a sheath tube 710 of an introducer 700 is inserted into the puncture site t1 formed in the dorsal side Hb of the right hand HR of the patient.

For example, in order to introduce various medical devices into the radial artery through the sheath tube 710 of the introducer 700, the surgeon or the like may form the puncture site t1 for inserting the sheath tube 710 in the hand of the patient. After completing a procedure using the introducer 700 and the various medical devices, the surgeon or the like starts the treatment of stopping bleeding at the puncture site t1.

As illustrated in FIG. 7, the surgeon or the like inserts the thumb f1 of the right hand HR of the patient into the space portion 151 of the anchor portion 150. The surgeon or the like can cause the fingertip of the thumb f1 to protrude from the anchor portion 150 by the distal opening 155. In the hemostatic device 100, the insertion port 153 of the anchor portion 150 and the pressing member 120 are disposed on the same surface (the inner surface 110a) of the main body belt 110. Therefore, even when it is difficult to distinguish between the inner surface 110a and the outer surface 110b of the main body belt 110 by visual observation due to a fact that the main body belt 110 is, for example, transparent, translucent, or colored transparent, the surgeon or the like can easily recognize the inner surface 110a on which the pressing member 120 is disposed. Therefore, the surgeon or the like can easily dispose the inner surface 110a of the main body belt 110 on the body surface side of the right hand HR of the patient, and can smoothly attach the hemostatic device 100.

In the hemostatic device 100 according to the present embodiment, the main body belt 110 may be implemented by a transparent member or the like similarly to the pressing member 120. Therefore, when winding the main body belt 110 around the right hand HR of the patient, the surgeon or the like can easily check a position of the pressing member 120 from the outer surface 110b of the main body belt 110. Therefore, the surgeon or the like can easily dispose the pressing member 120 at the puncture site t1 while checking the positions of the puncture site t1 and the pressing member 120.

Figure 8:
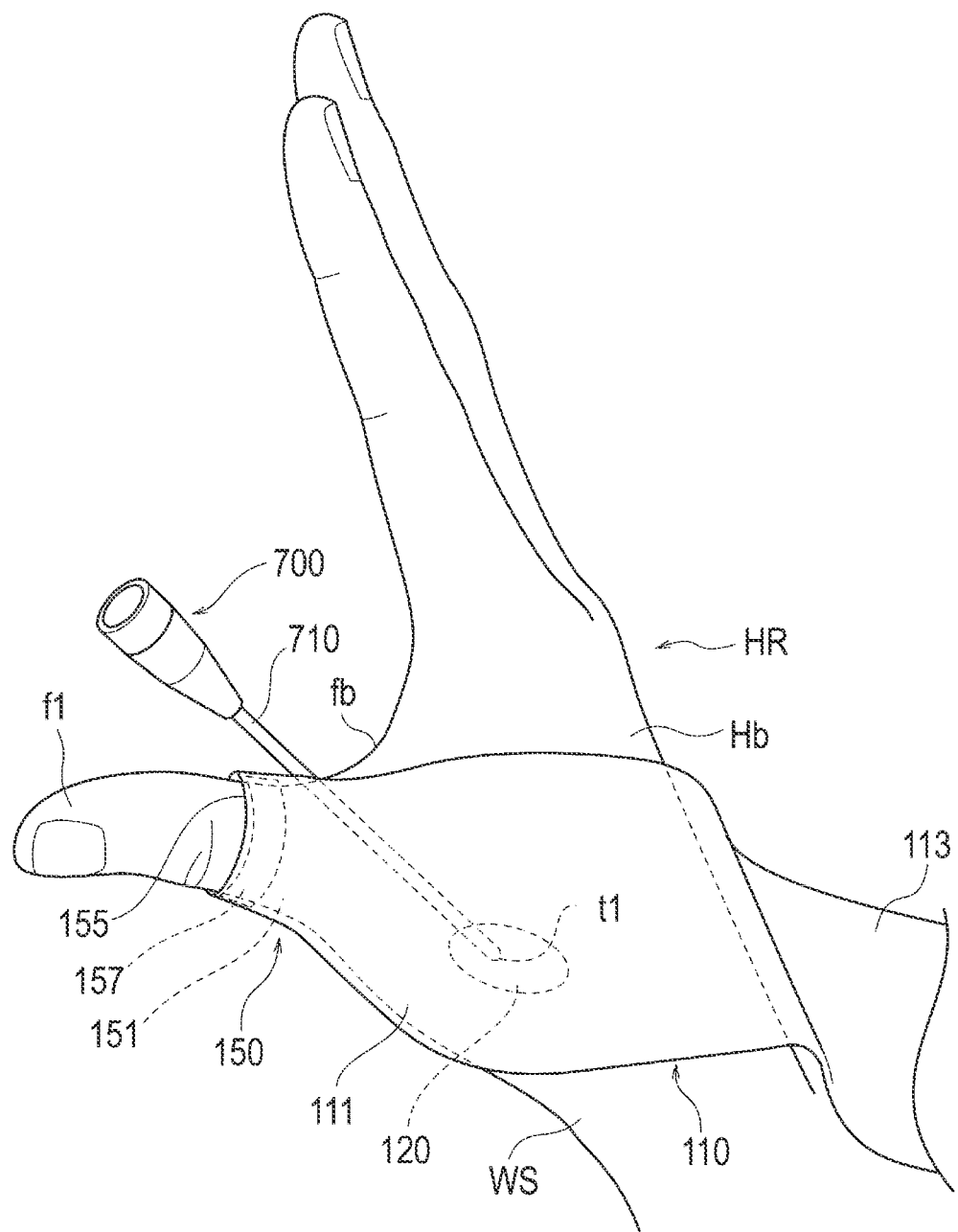
FIG. 8 is a perspective view illustrating a procedure when stopping bleeding at the puncture site formed in the right hand of the patient using the hemostatic device according to the first embodiment.
Figure 9:
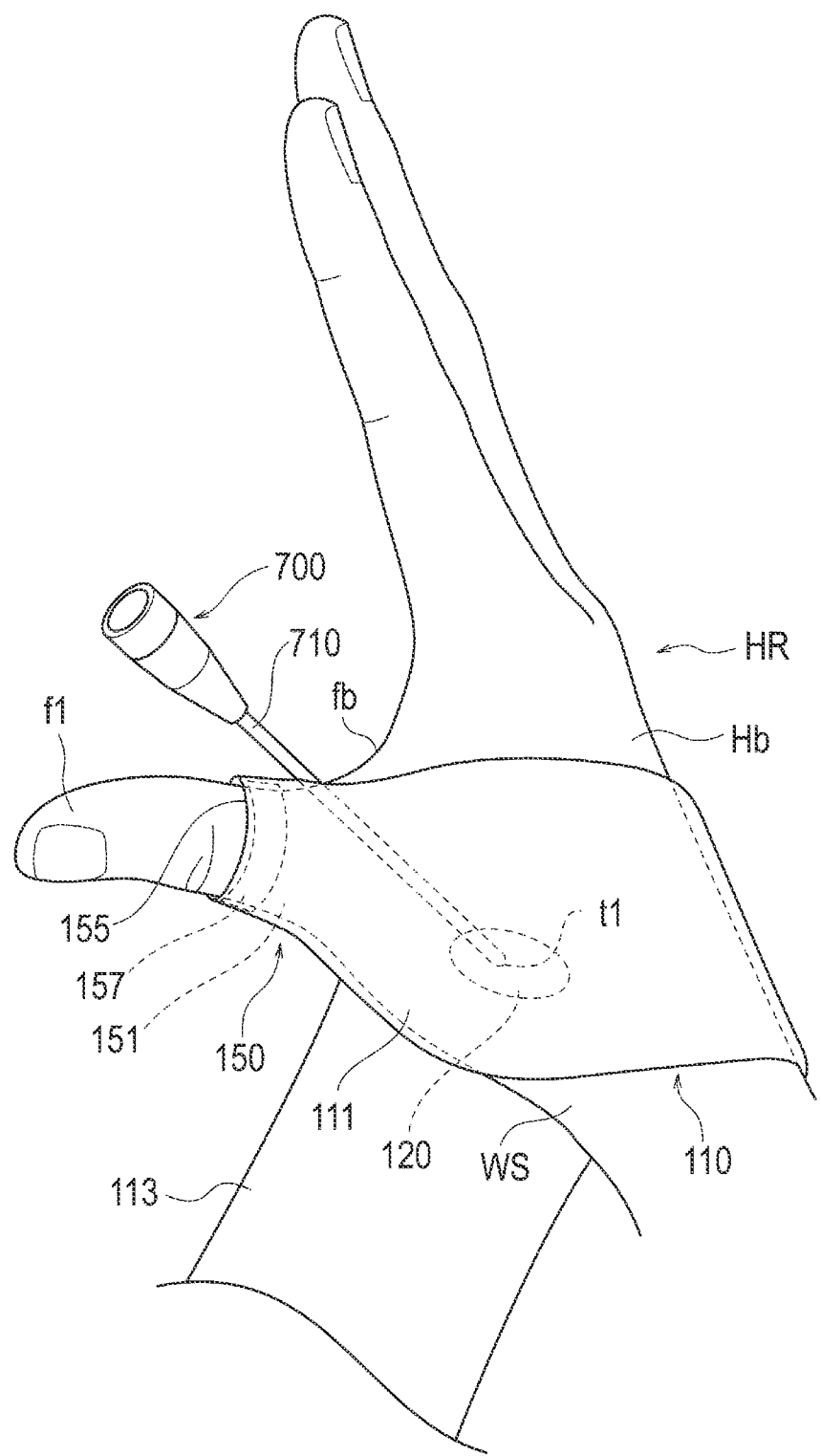
FIG. 9 is a perspective view illustrating a procedure when stopping bleeding at the puncture site formed in the right hand of the patient using the hemostatic device according to the first embodiment.

As illustrated in FIG. 8, the surgeon or the like winds the main body belt 110 right-handed along the outer periphery of the right hand HR of the patient with the anchor portion 150 into which the thumb f1 is inserted as a starting point. At this time, the surgeon or the like disposes the pressing member 120 disposed on the inner surface 110a of the main body belt 110 at the puncture site t1. As illustrated in FIG. 9, the surgeon or the like further winds the main body belt 110 from a palm side Hf to the dorsal side Hb. A part of the main body belt 110 may also be wound around a part of the wrist WS.

Figure 10:
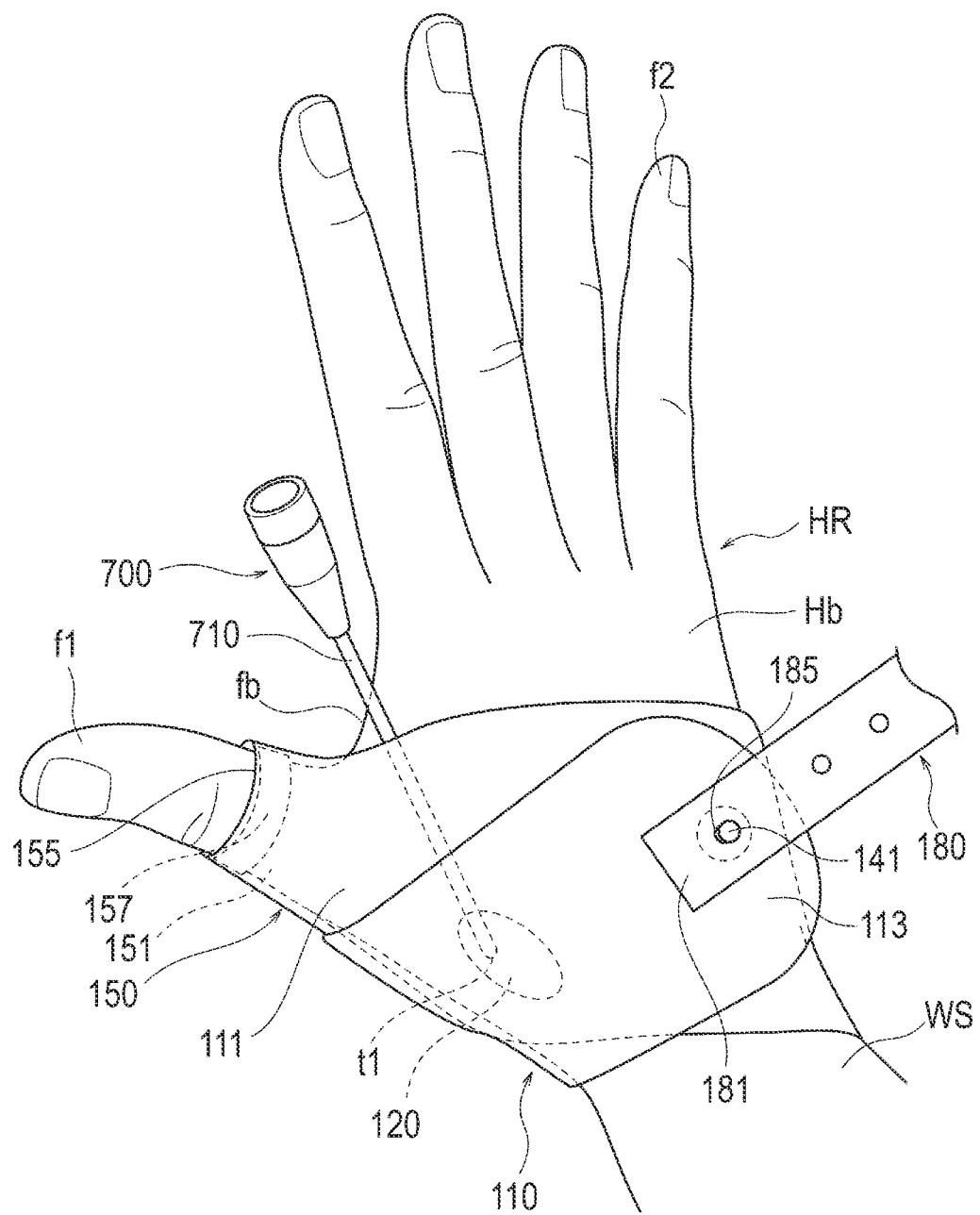
FIG. 10 is a perspective view illustrating a procedure when stopping bleeding at the puncture site formed in the right hand of the patient using the hemostatic device according to the first embodiment.
Figure 11:
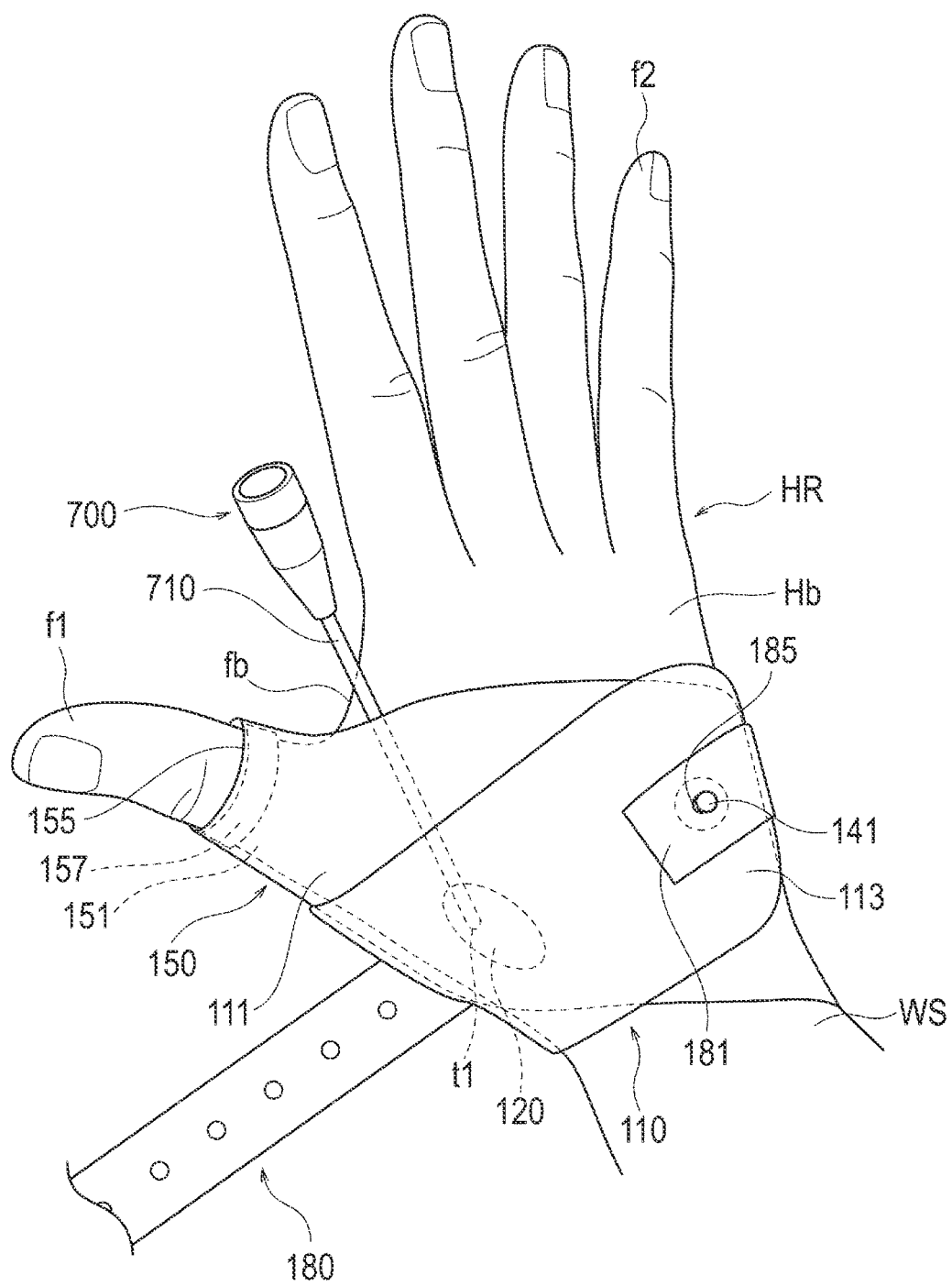
FIG. 11 is a perspective view illustrating a procedure when stopping bleeding at the puncture site formed in the right hand of the patient using the hemostatic device according to the first embodiment.
Figure 12:
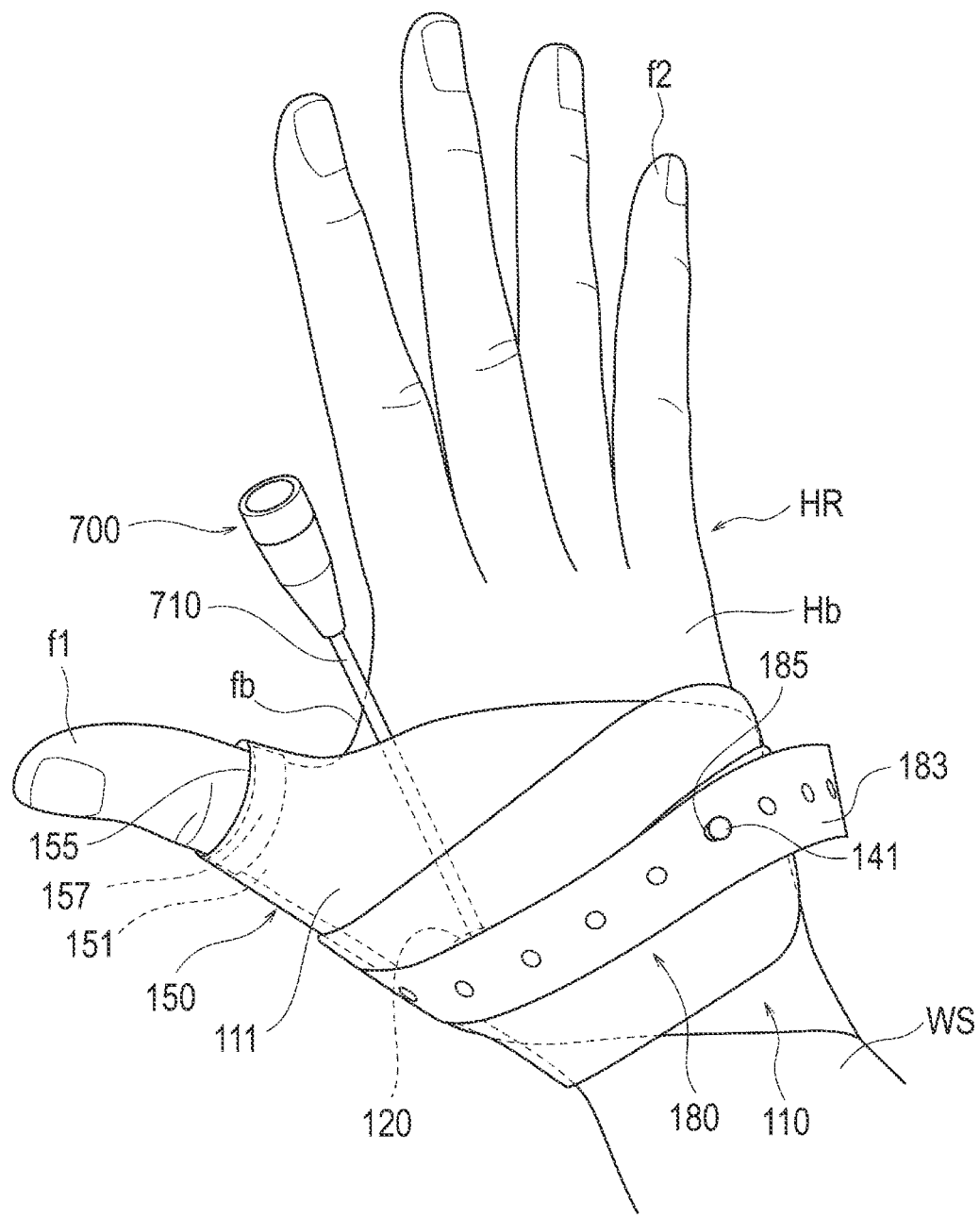
FIG. 12 is a perspective view illustrating a procedure when stopping bleeding at the puncture site formed in the right hand of the patient using the hemostatic device according to the first embodiment.

As illustrated in FIG. 10, the surgeon or the like winds the main body belt 110 to a predetermined position of the dorsal side Hb of the right hand HR of the patient, and then winds the auxiliary belt 180 connected to the main body belt 110 along the outer surface 110b of the main body belt 110. As illustrated in FIG. 11, the surgeon or the like winds the auxiliary belt 180 from the dorsal side Hb of the right hand HR of the patient to the palm side Hf. As illustrated in FIG. 12, the surgeon or the like winds the auxiliary belt 180 to the vicinity of the head portion 141 of the fixing member 140 disposed at a predetermined position of the dorsal side Hb of the right hand HR of the patient, and then inserts the head portion 141 of the fixing member 140 through one hole portion 185 of the auxiliary belt 180 (the hole portion not adjacent to the hole portion 185 at which the main body belt 110 and the auxiliary belt 180 are position-fixedly fixed) to fix the auxiliary belt 180 to the right hand HR of the patient.

As illustrated in FIG. 13, the surgeon or the like can apply the compressive force to the puncture site t1 formed in the right hand HR of the patient by winding the main body belt 110 and the auxiliary belt 180 around the right hand HR of the patient. The surgeon or the like can stop bleeding at the puncture site t1 by compressing the puncture site t1 with the pressing member 120. The surgeon or the like removes the sheath tube 710 of the introducer 700 in a state in which the hemostatic device 100 is attached to the right hand HR of the patient.

In the hemostatic device 100 according to the present embodiment, the pressing member 120 is implemented by a member that allows the puncture site t1 to be viewed from the outside in a state in which the pressing member 120 is disposed at the puncture site t1. Therefore, the surgeon or the like can view the puncture site t1 while stopping bleeding using the hemostatic device 100. In particular, when the main body belt 110 and the auxiliary belt 180 are implemented by a transparent member or the like together with the pressing member 120 as in the present embodiment, the surgeon or the like can easily check a hemostasis state of the puncture site t1 by visual observation.

The surgeon or the like can adjust the compressive force by increasing or decreasing the compressive force by the pressing member 120 according to a state of the puncture site t1 while stopping bleeding by the hemostatic device 100. The surgeon or the like can increase the compressive force of the pressing member 120 by, for example, tightly tightening the main body belt 110 and/or the auxiliary belt 180. The surgeon or the like can decrease the compressive force of the pressing member 120 by, for example, loosening the tightening of the main body belt 110 and/or the auxiliary belt 180.

Second Example of Use of the Hemostatic Device 100

Procedures when stopping bleeding at the puncture site t1 formed on the dorsal side Hb of the left hand HL of the patient using the hemostatic device 100 will be described with reference to FIGS. 14 to 21. A detailed description of aspects of the procedures and the like already described above in the first example of use are not repeated.

Figure 14:
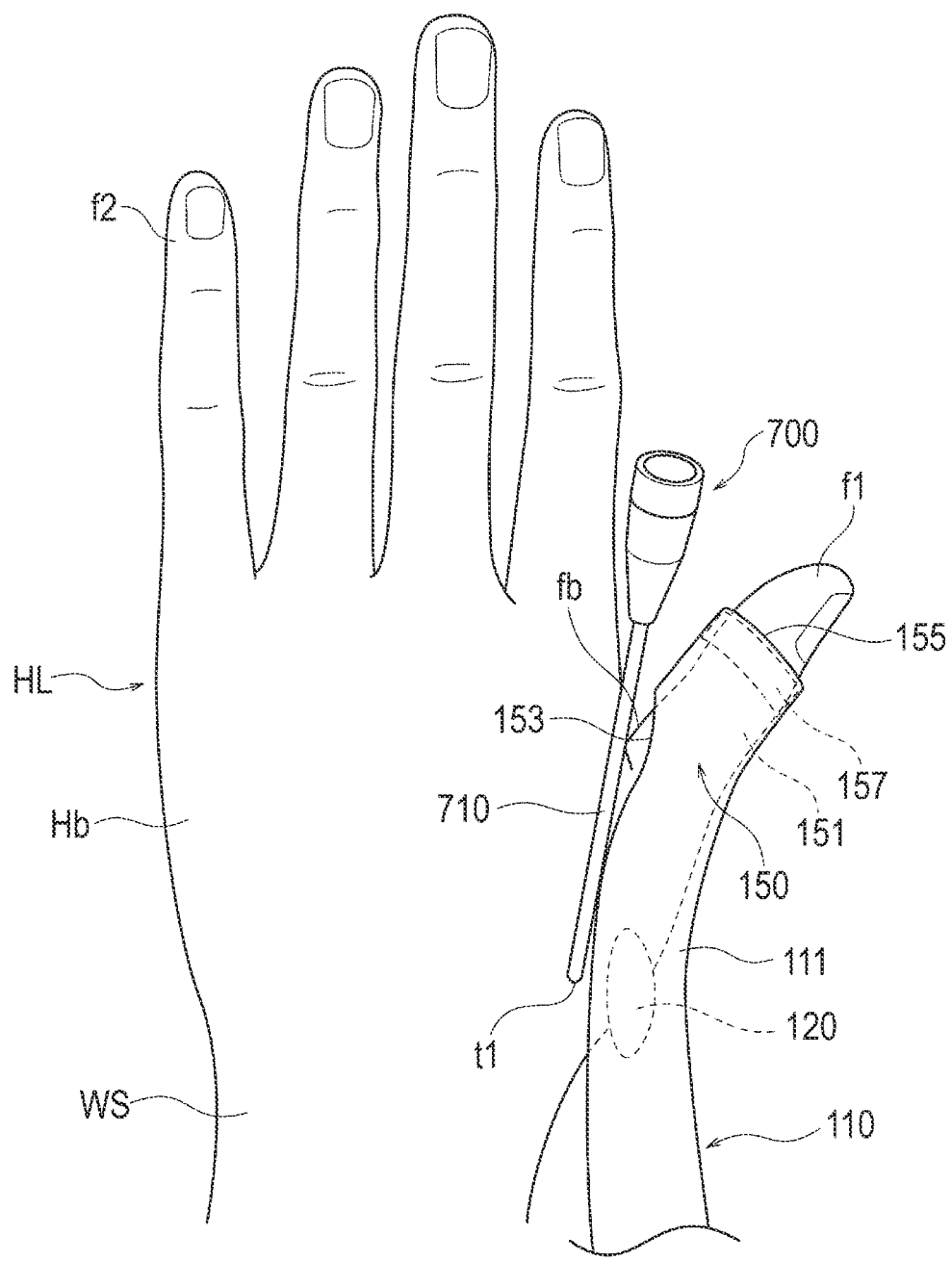
FIG. 14 is a perspective view illustrating a procedure when stopping bleeding at a puncture site formed in a left hand of the patient using the hemostatic device according to the first embodiment.
Figure 15:
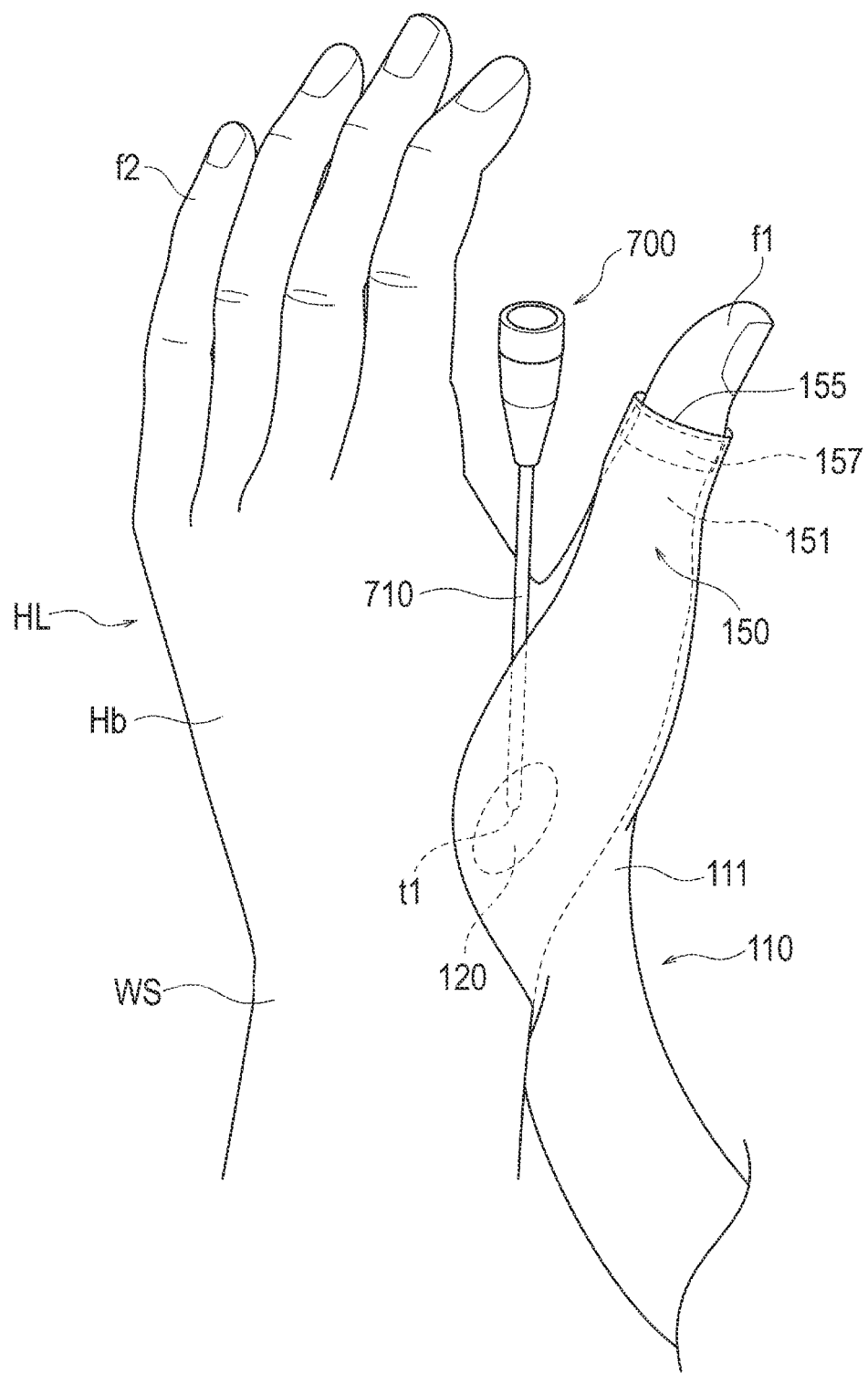
FIG. 15 is a perspective view illustrating a procedure when stopping bleeding at the puncture site formed in the left hand of the patient using the hemostatic device according to the first embodiment.
Figure 16:
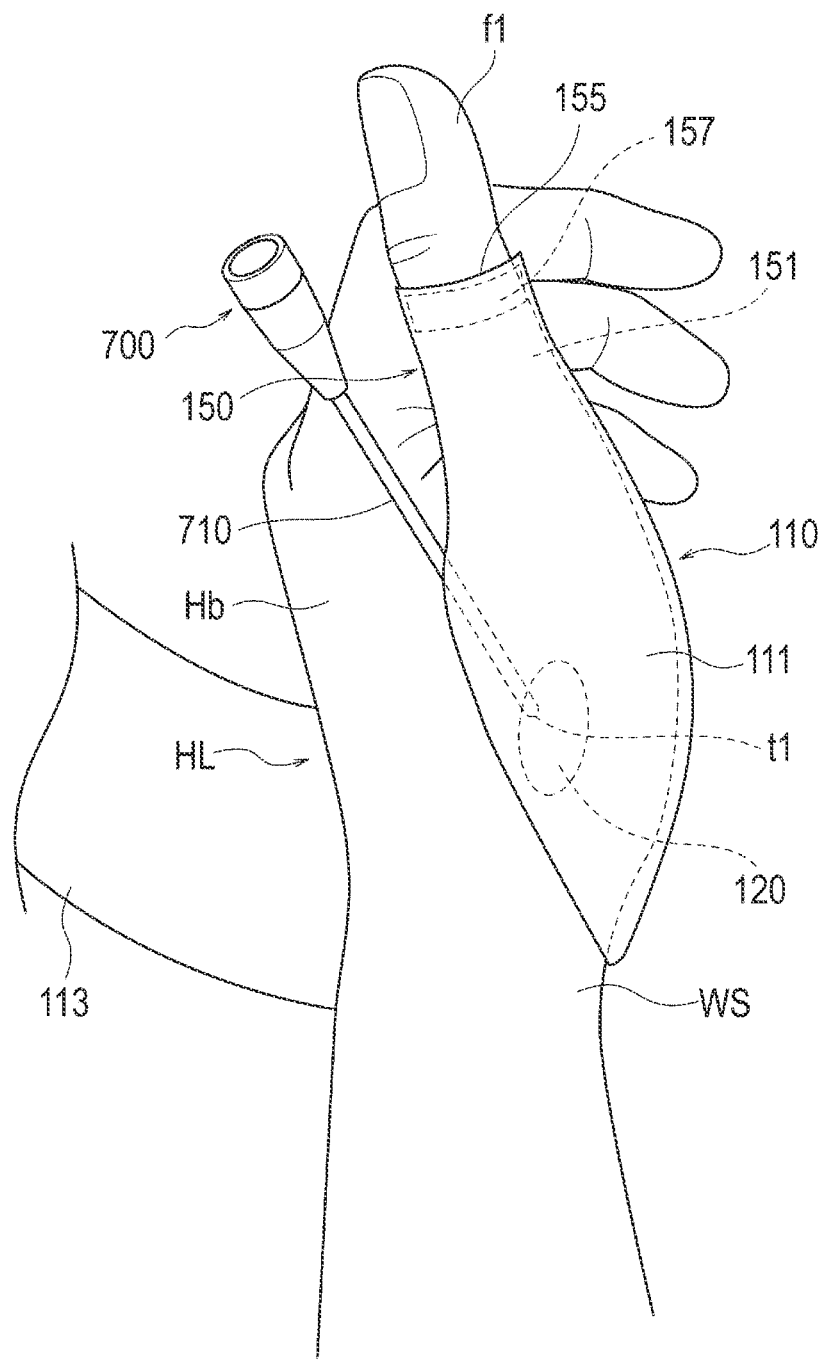
FIG. 16 is a perspective view illustrating a procedure when stopping bleeding at the puncture site formed in the left hand of the patient using the hemostatic device according to the first embodiment.
Figure 17:
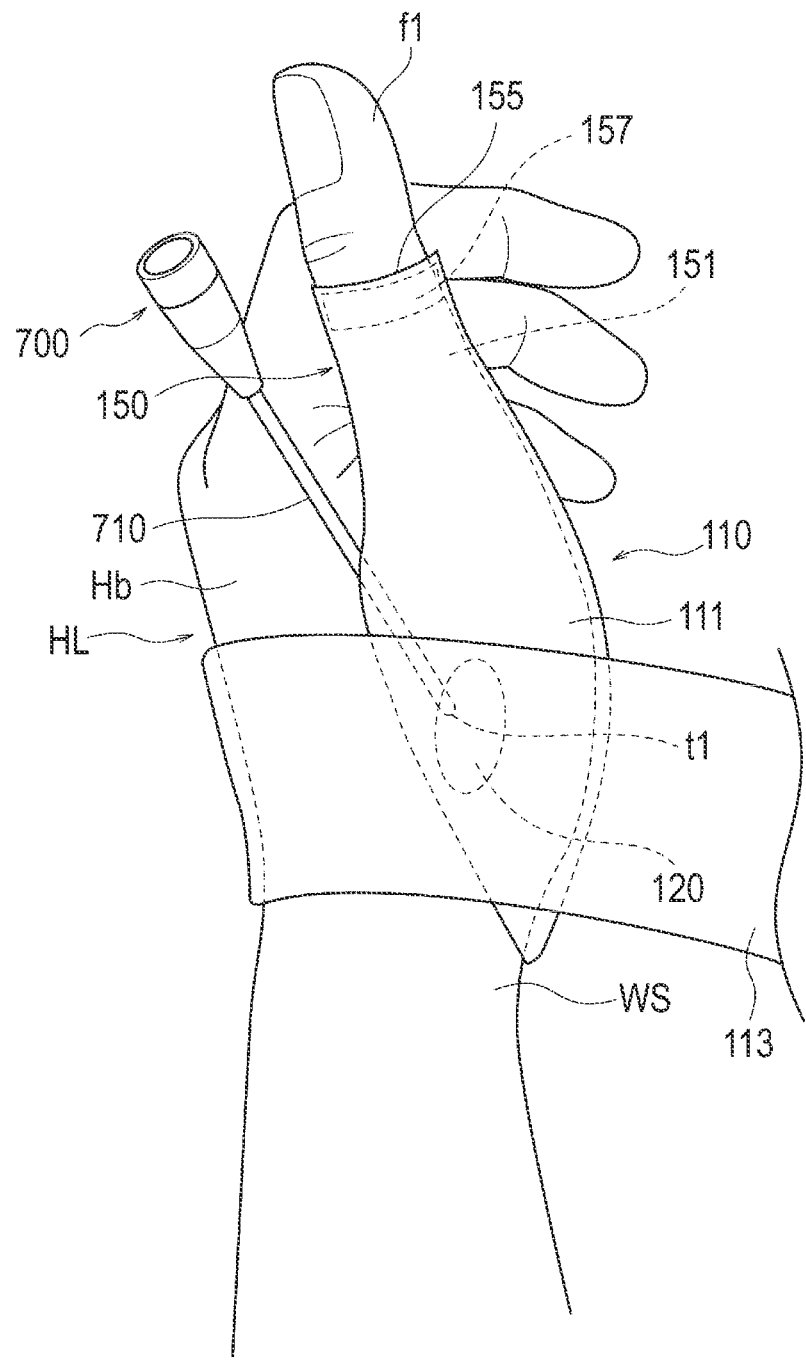
FIG. 17 is a perspective view illustrating a procedure when stopping bleeding at the puncture site formed in the left hand of the patient using the hemostatic device according to the first embodiment.
Figure 18:
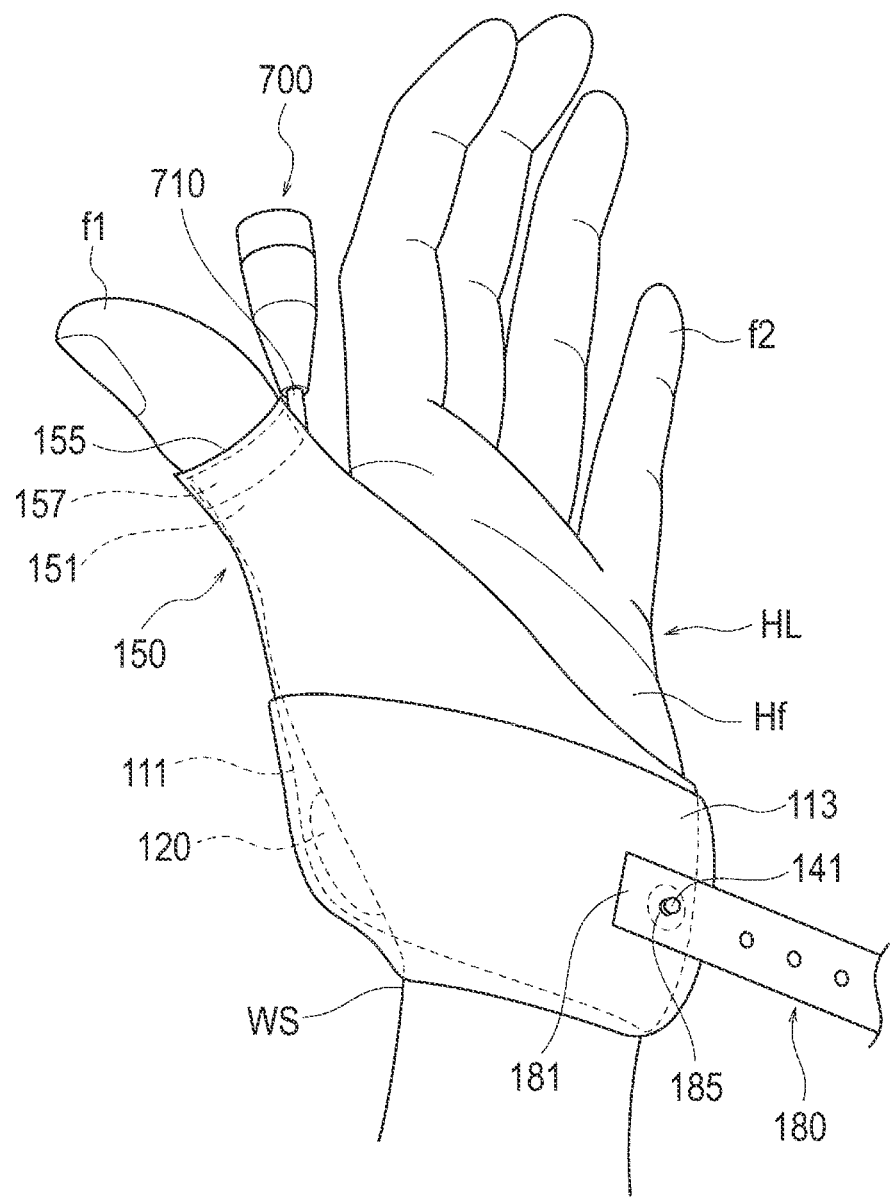
FIG. 18 is a perspective view illustrating a procedure when stopping bleeding at the puncture site formed in the left hand of the patient using the hemostatic device according to the first embodiment.
Figure 19:
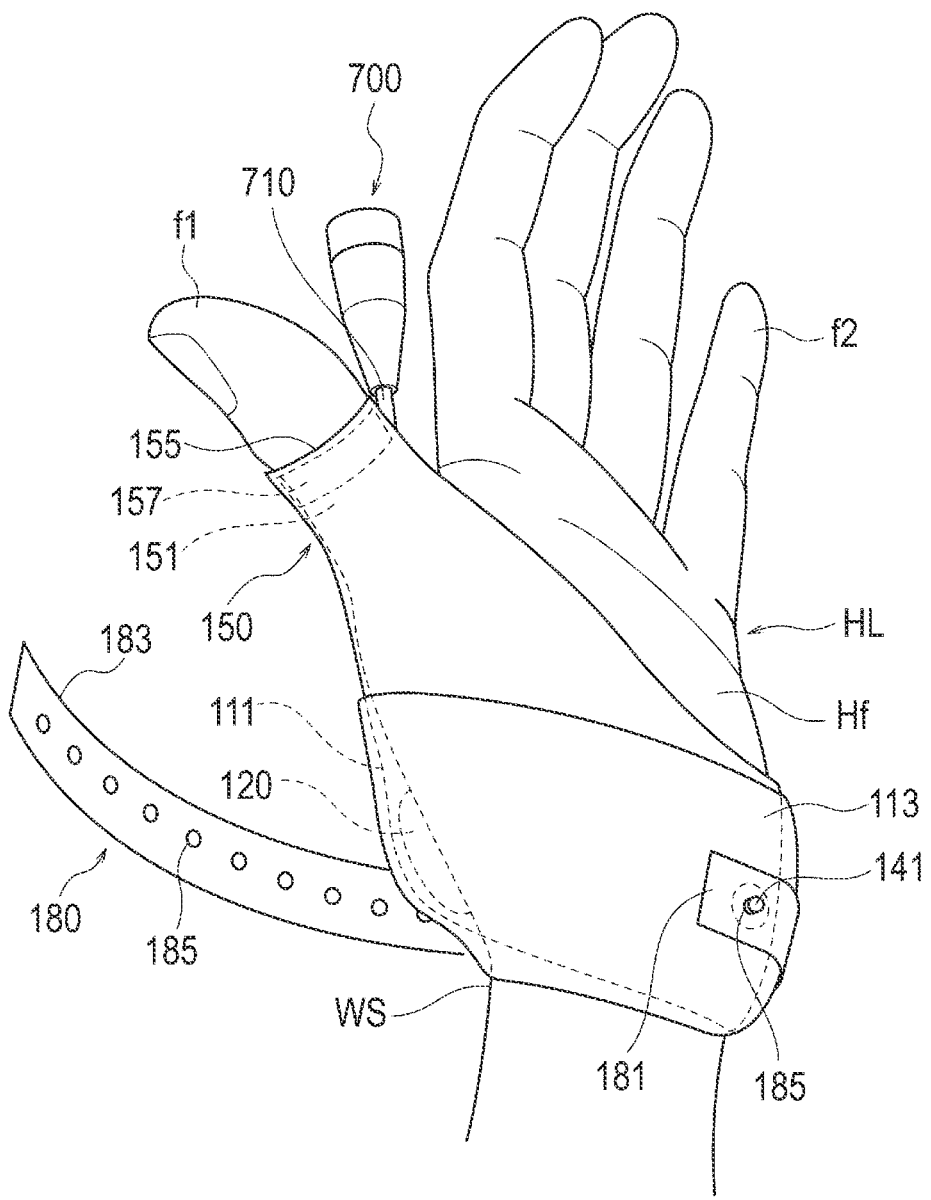
FIG. 19 is a perspective view illustrating a procedure when stopping bleeding at the puncture site formed in the left hand of the patient using the hemostatic device according to the first embodiment.
Figure 20:
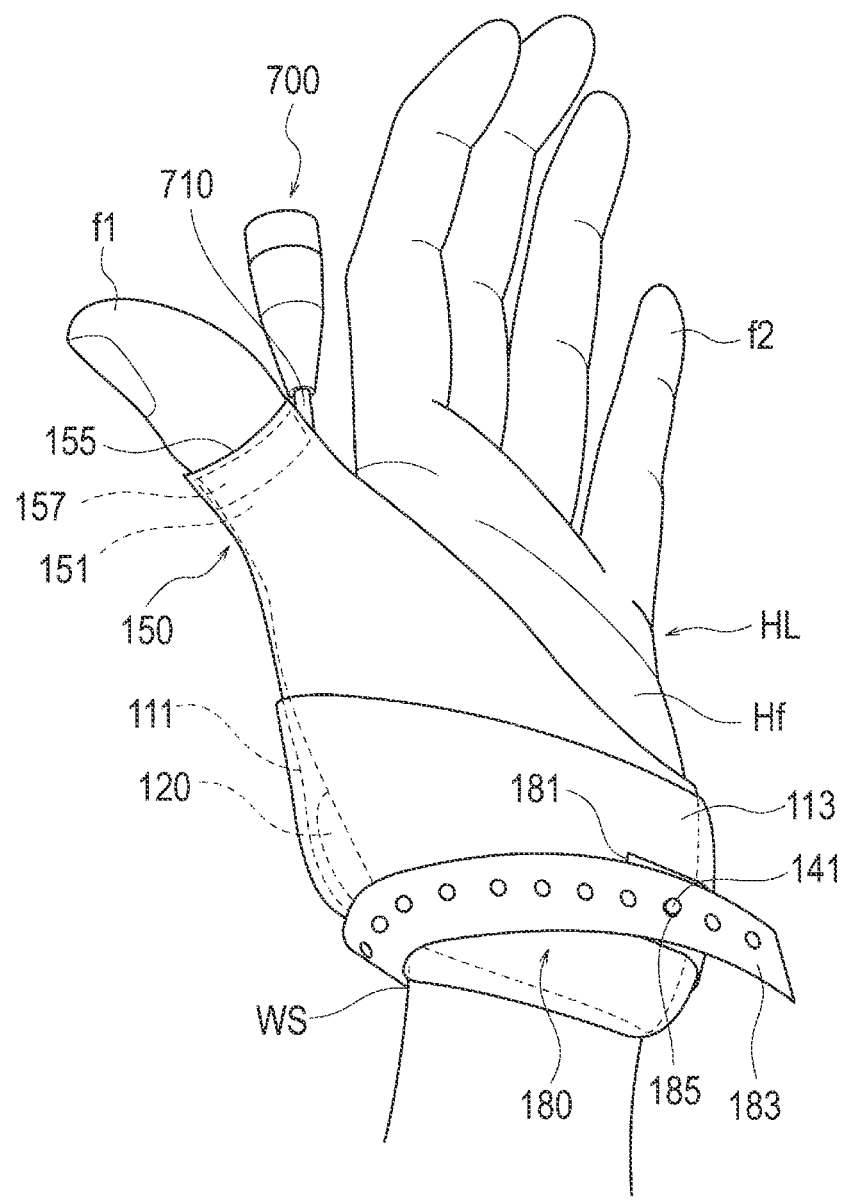
FIG. 20 is a perspective view illustrating a procedure when stopping bleeding at the puncture site formed in the left hand of the patient using the hemostatic device according to the first embodiment.
Figure 21:
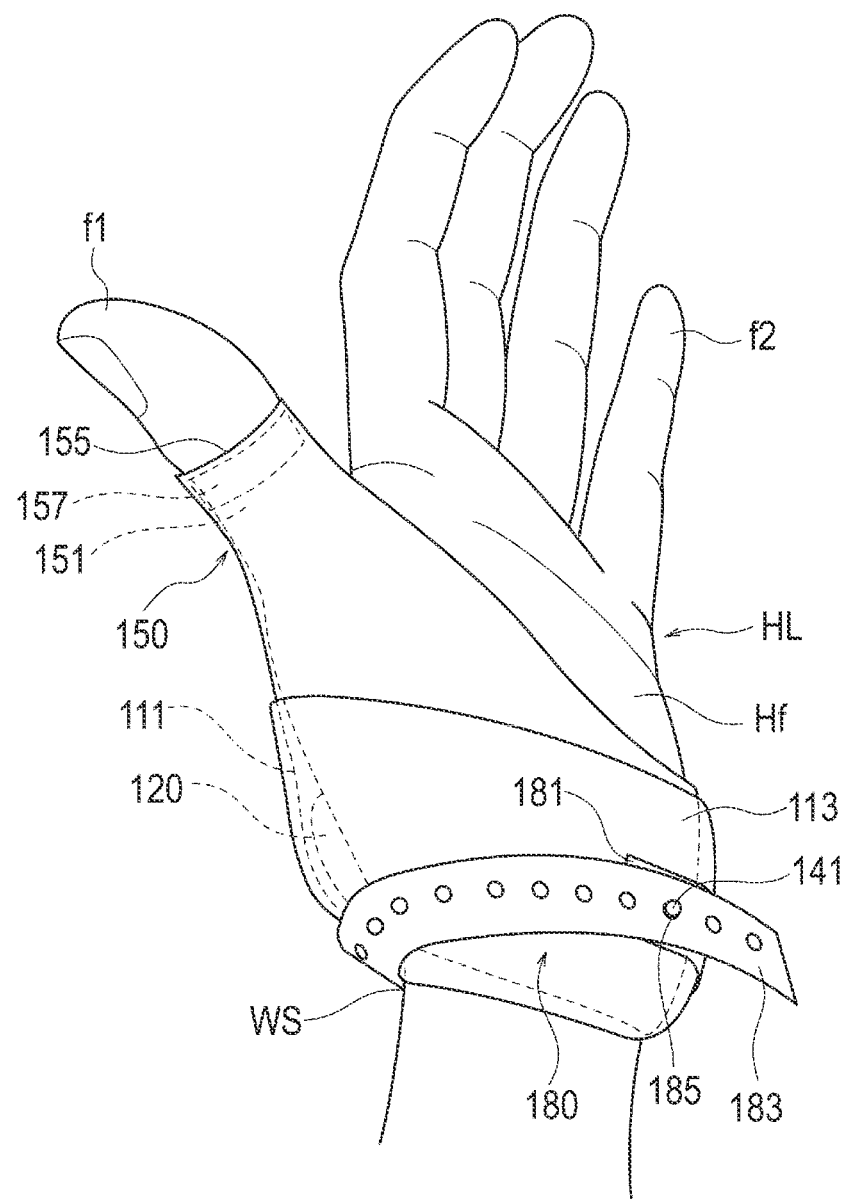
FIG. 21 is a perspective view illustrating a procedure when stopping bleeding at the puncture site formed in the left hand of the patient using the hemostatic device according to the first embodiment.

As illustrated in FIG. 14, the surgeon or the like inserts the thumb f1 of the left hand HL of the patient into the space portion 151 of the anchor portion 150. As illustrated in FIG. 15, the surgeon or the like winds the main body belt 110 left-handed from the dorsal side Hb of the left hand HL of the patient to the palm side Hf. As illustrated in FIG. 16, the surgeon or the like further winds the main body belt 110, which is wound from the palm side Hf of the left hand HL of the patient to the dorsal side Hb, toward the dorsal side Hb. As illustrated in FIG. 17, the surgeon or the like further winds the main body belt 110 from the dorsal side Hb of the left hand HL of the patient toward the palm side Hf of the left hand HL. As illustrated in FIGS. 18 and 19, the surgeon or the like winds the auxiliary belt 180 connected to the main body belt 110 from the palm side Hf toward the dorsal side Hb. As illustrated in FIG. 20, the surgeon or the like passes the head portion 141 of the fixing member 140 through the hole portion 185 of the auxiliary belt 180 to fix the auxiliary belt 180 to the left hand HL of the patient. As illustrated in FIG. 21, the surgeon or the like removes the sheath tube 710 of the introducer 700 in a state in which the main body belt 110 and the auxiliary belt 180 are wound around the left hand HL of the patient and the pressing member 120 disposed on the inner surface 110a of the main body belt 110 applies the compressive force to the puncture site t1. By maintaining the state in which the hemostatic device 100 is attached to the left hand HL of the patient, the surgeon or the like can apply the compressive force to the puncture site t1 from the pressing member 120 over time.

Operations and effects of the hemostatic device 100 according to the first embodiment will be described.

The hemostatic device 100 includes the main body belt 110 that is wound around at least a part of the hand and the wrist WS of the patient, and the pressing member 120 that is disposed at the puncture site t1 formed in the hand and compresses the puncture site t1. The main body belt 110 includes the distal region 111 and the proximal region 113 disposed at the position farther away from the fingertip of the patient than the distal region 111. The distal region 111 is provided with the anchor portion 150 including the space portion 151 that allows the finger of the patient to be disposed into, the insertion port 153 that is opened toward the proximal region 113 and allows the finger of the patient to be inserted into the space portion 151, and the distal opening 155 that allows the fingertip of the finger of the patient inserted into the space portion 151 to protrude therefrom. The pressing member 120 is implemented by a member that allows the puncture site t1 to be viewed from the outside in a state in which the pressing member 120 is disposed at the puncture site t1, and is fixed to the distal region 111 at a position away from the insertion port 153 of the anchor portion 150 on the inner surface 110a of the main body belt 110 in which the insertion port 153 is provided.

The hemostatic device 100 includes the main body belt 110 that is wound around at least a part of the hand and the wrist WS of the patient, and the pressing member 120 that is disposed at the puncture site t1 formed in the hand and compresses the puncture site t1. The main body belt 110 includes the distal region 111 and the proximal region 113 disposed at the position farther away from the fingertip of the patient than the distal region 111. The distal region 111 is provided with the anchor portion 150 including the space portion 151 that allows the finger of the patient to be disposed into, and the insertion port 153 that is opened toward the proximal region 113 and allows the finger of the patient to be inserted into the space portion 151. The pressing member 120 is implemented by a member that allows the puncture site t1 to be viewed from the outside in a state in which the pressing member 120 is disposed at the puncture site t1, and is fixed to the distal region 111 at a position away from the insertion port 153 of the anchor portion 150 on the inner surface 110a of the main body belt 110 in which the insertion port 153 is provided. The pressing member 120 is disposed, in the main body belt 110, at a position different from a portion through which the center line C1 of the anchor portion 150 passes. The pressing member 120 has the short axis direction b1 and the long axis direction b2 intersecting the short axis direction b1. The long axis direction b2 of the pressing member 120 intersects a direction along the center line C1 of the anchor portion 150.

According to the hemostatic device 100 configured as described above, in a state in which the main body belt 110 is wound around at least a part of the hand and the wrist WS of the patient, misalignment of the hemostatic device 100 from the hand of the patient can be prevented by inserting the finger of the patient into the anchor portion 150 disposed in the distal region 111 of the main body belt 110. According to the hemostatic device 100, since the pressing member 120 that applies the compressive force to the puncture site t1 formed in the hand of the patient is implemented by a member that allows the puncture site t1 to be viewed from the outside, the surgeon or the like can view the puncture site t1 while stopping bleeding using the hemostatic device 100. Therefore, the surgeon or the like can easily check the hemostasis state. In the hemostatic device 100, the pressing member 120 is fixed to the distal region 111 of the main body belt 110 on the inner surface 110a of the main body belt 110 in which the insertion port 153 of the anchor portion 150 is provided. Therefore, when attaching the hemostatic device 100 to the hand of the patient, the surgeon or the like can easily dispose the pressing member 120 provided on the inner surface 110a of the main body belt 110 at the puncture site t1 of the hand of the patient while inserting the finger of the patient into the insertion port 153 of the anchor portion 150. Therefore, the surgeon or the like can easily attach the hemostatic device 100 to the hand of the patient.

In the hemostatic device 100, the anchor portion 150 into which the finger of the patient is inserted is provided with the distal opening 155. Therefore, when attaching the hemostatic device 100 to the hand of the patient, the surgeon or the like can easily dispose the pressing member 120 at the puncture site t1 formed in the hand of the patient with the anchor portion 150 as the starting point while pulling the proximal region 113 of the main body belt 110, while checking the fixation of the anchor portion 150 to the finger of the patient. Therefore, the surgeon or the like can easily wind the main body belt 110 in a short time in a manner of making the main body belt 110 be in close contact with the hand, while disposing the pressing member 120 at the puncture site t1. Since the anchor portion 150 has the distal opening 155, the hemostatic device 100 can be attached to the hand of the patient regardless of a size of the finger of the patient (such as a length of the finger of the patient).

In the hemostatic device 100, the pressing member 120 is disposed not on the center line C1 of the anchor portion 150, and the long axis direction b2 of the pressing member 120 intersects the direction along the center line C1 of the anchor portion 150. Therefore, when attaching the hemostatic device 100 to the hand of the patient, the surgeon or the like can easily align, by pulling the proximal region 113 of the main body belt 110 in a state in which the finger of the patient is inserted into the anchor portion 150, the pressing member 120 with the puncture site t1 formed in the hand. Since the long axis direction b2 of the pressing member 120 intersects the direction along the center line C1 of the anchor portion 150, the surgeon or the like can easily dispose the pressing member 120 along an extensor pollicis longus muscle of the hand of the patient when attaching the hemostatic device 100 to the hand of the patient.

The pressing member 120 is disposed, in the main body belt 110, at the position different from the portion through which the center line C1 of the anchor portion 150 passes. Therefore, when disposing the pressing member 120 at the puncture site t1 formed in the hand of the patient in a state in which the finger is inserted into the anchor portion 150, the pressing member 120 can be easily disposed, by winding the main body belt 110 in a direction intersecting an extending direction of the hand with the anchor portion 150 as the starting point, at the puncture site t1 formed in the vicinity of the snuffbox of the hand of the patient (see FIGS. 8, 16, and the like). Further, when winding the main body belt 110 along the outer periphery of the hand in a state in which the pressing member 120 is disposed at the puncture site t1, the surgeon or the like can easily dispose the main body belt 110 in a manner of overlapping the pressing member 120.

The pressing member 120 includes the first region 121 disposed at the puncture site t1, and the second region 122 surrounding the first region 121. The second region 122 has the adhesive layer 122a having adhesiveness higher than that of the material for the pressing member 120. The adhesive layer 122a has a color different from that of the first region 121. Therefore, the hemostatic device 100 can firmly fix the main body belt 110 to the body surface of the hand of the patient by the adhesive layer 122a disposed around the puncture site t1. In the hemostatic device 100, since the adhesive layer 122a is colored differently from the first region 121, the surgeon or the like can be prevented from disposing the adhesive layer 122a in a manner of overlapping the puncture site t1. Therefore, the surgeon or the like can prevent an adhesive force of the adhesive layer 122a from acting on the puncture site t1, and prevent an unnecessary pulling force from being applied to the puncture site t1 when removing the hemostatic device 100 from the hand of the patient.

The first region 121 of the pressing member 120 has the water repellent layer 121a having water repellency higher than that of the adhesive layer 122a. Therefore, the hemostatic device 100 can prevent the first region 121 from sticking to a living body surface layer of the patient due to a component contained in the blood or the like while the first region 121 presses the puncture site t1 to stop bleeding. Therefore, the surgeon or the like can be prevented from applying the unnecessary pulling force to the puncture site t1 when removing the hemostatic device 100 from the hand of the patient.

The anchor portion 150 includes the holding member 157 that holds the shape of the space portion 151. When starting stopping bleeding using the hemostatic device 100, the space portion 151 of the anchor portion 150 can be prevented from being crushed. Accordingly, the surgeon or the like can smoothly insert the finger of the patient into the space portion 151 of the anchor portion 150.

The hemostatic device 100 includes the auxiliary belt 180 that assists in compressing the puncture site t1 by the pressing member 120. The width W1 of the main body belt 110 is larger than the width W2 of the auxiliary belt 180. Therefore, when the main body belt 110 is wound around the hand of the patient, the main body belt 110 can be brought into contact with the hand of the patient over a wider range of the hand of the patient, and thus the main body belt 110 can be firmly held on the hand of the patient. Since the width W2 of the auxiliary belt 180 is smaller than the width W1 of the main body belt 110, when the auxiliary belt 180 overlaps the puncture site t1 of the hand of the patient, the auxiliary belt 180 can locally apply the compressive force to the puncture site t1. Therefore, a hemostatic effect of the hemostatic device 100 can be enhanced.

The main body belt 110 includes the connection portion 130 that allows the auxiliary belt 180 to be connected. The connection portion 130 is disposed at a position overlapping the insertion port 153 of the anchor portion 150 in the longitudinal direction of the main body belt 110. Therefore, by pulling the auxiliary belt 180 connected to the proximal region 113 of the main body belt 110 in a state in which the finger of the patient is inserted into the space portion 151 of the anchor portion 150 through the insertion port 153 formed in the distal region 111 of the main body belt 110, the surgeon or the like can wind the auxiliary belt 180 around the hand of the patient in any direction while hooking the finger of the hand of the patient on the anchor portion 150.

Therefore, the surgeon or the like can more easily wind the auxiliary belt 180 around the hand of the patient.

The auxiliary belt 180 has the plurality of hole portions 185 disposed at different positions of the auxiliary belt 180 in the longitudinal direction. The connection portion 130 of the main body belt 110 includes the fixing member 140 that is insertable through the hole portion 185 of the auxiliary belt 180. The fixing member 140 is inserted through at least two non-adjacent hole portions 185 among the plurality of hole portions 185 of the auxiliary belt 180 in a state in which the auxiliary belt 180 is attached to at least a portion of the hand and the wrist. Therefore, when the auxiliary belt 180 is long enough to be wound along the outer periphery of the hand of the patient, the surgeon or the like can adjust the compressive force by the auxiliary belt 180 and the excessive length of the auxiliary belt 180 by fixing, to the fixing member 140, the hole portion 185 that is not adjacent to the hole portion 185 at which the auxiliary belt 180 is connected to the main body belt 110 via the connection portion 130.

Second Embodiment

Figure 22:
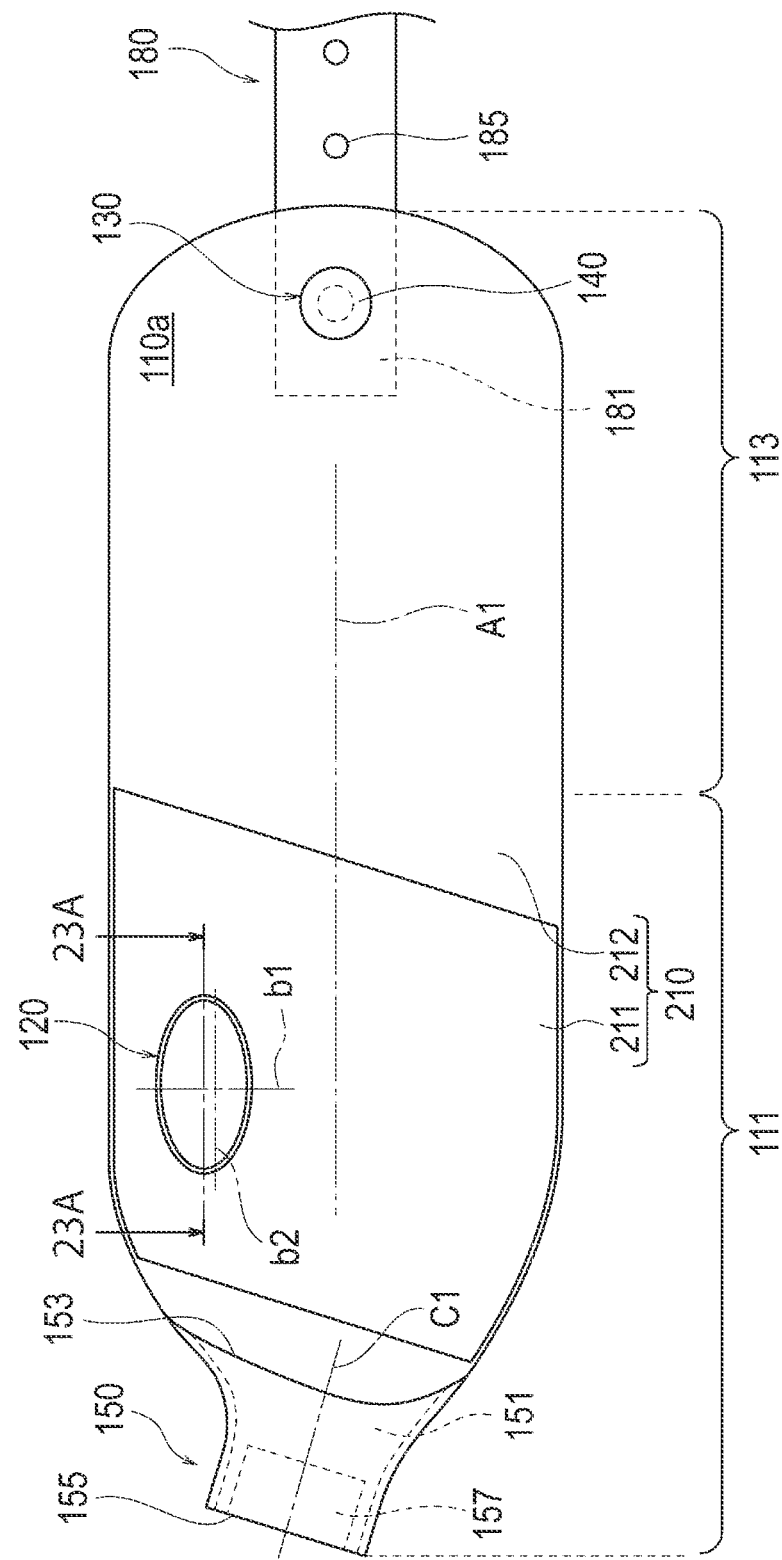
FIG. 22 is a plan view illustrating a hemostatic device according to a second embodiment as viewed from an inner surface (a surface) of a main body belt.

Next, a hemostatic device 200 according to a second embodiment of the invention will be described with reference to FIGS. 22 and 23. A detailed description of features and aspects of the hemostatic device similar to those already described above in the first embodiment will not be repeated. Configurations, operations and effects associated with the second embodiment that are not particularly described here are the same as those of the first embodiment.

The hemostatic device 200 according to the second embodiment is different from the first embodiment in a configuration of a main body belt 210.

Figure 23:
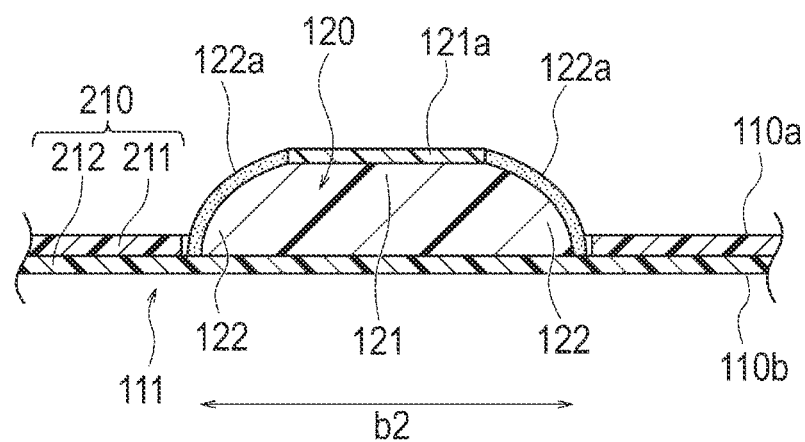
FIG. 23 is a cross-sectional view taken along a line 23A-23A illustrated in FIG. 22.

As illustrated in FIG. 23, the main body belt 210 has a first layer 211 surrounding the pressing member 120, and a second layer 212 to which the first layer 211 is fixed. The first layer 211 is implemented by a material softer than that of the second layer 212.

In the main body belt 210, the entire main body belt 210 is implemented by or constituted by the second layer 212. The first layer 211 is fixed around a region where the pressing member 120 is disposed in the distal region 111 of the main body belt 210. The first layer 211 comes into contact with a body surface of a hand of a patient when the pressing member 120 is disposed at the puncture site t1 to stop bleeding. Since the first layer 211 is more flexible than the second layer 212, the patient can be prevented from feeling uncomfortable when the main body belt 210 is wound around the hand of the patient. Since the second layer 212 is implemented by a material harder than that of the first layer 211, the main body belt 210 can be prevented from excessively extending (stretching) when the main body belt 210 is wound around the hand of the patient. Therefore, a surgeon or the like can effectively apply a compressive force to the puncture site t1 in a state in which the main body belt 210 of the hemostatic device 200 is wound around the hand of the patient.

The inner surface 110a of the main body belt 210 is implemented by (defined by) one surface (a surface not facing the second layer 212) of the first layer 211, and the outer surface 110b of the main body belt 210 is implemented by (defined by) the other surface (a surface not facing the first layer 211) of the second layer 212.

The first layer 211 may be implemented or constituted by, for example, a material such as vinyl chloride, silicone rubber, or urethane rubber. The second layer 212 may be implemented or constituted by a material harder than that of the first layer 211 by, for example, a material such as vinyl chloride, silicone rubber, or urethane rubber having a grade different from that of a resin material for the first layer 211.

A position at which the first layer 211 is provided is not particularly limited as long as the first layer 211 can be disposed at a position surrounding the puncture site t1 when the hemostatic device 100 is attached to the hand of the patient. Thicknesses of the layers 211 and 212 are not particularly limited. For example, the first layer 211 may be attachable to and detachable from the second layer 212. Due to the first layer 211 configured in this manner, the surgeon or the like can appropriately replace the first layer 211.

Modifications of Pressing Member

A specific configuration of the pressing member is not particularly limited as long as the pressing member can apply the compressive force to the puncture site t1.

Figure 24:
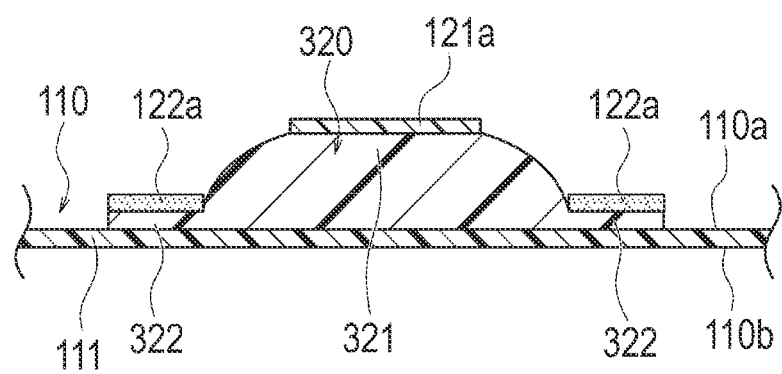
FIG. 24 is a view illustrating a modification of a pressing member.

A pressing member 320 according to a modification illustrated in FIG. 24 includes a flat flange-shaped second region 322 surrounding a periphery of a first region 321. The water-repellent layer 121a may be disposed in the first region 321. The adhesive layer 122a may be disposed in the second region 322.

Figure 25:
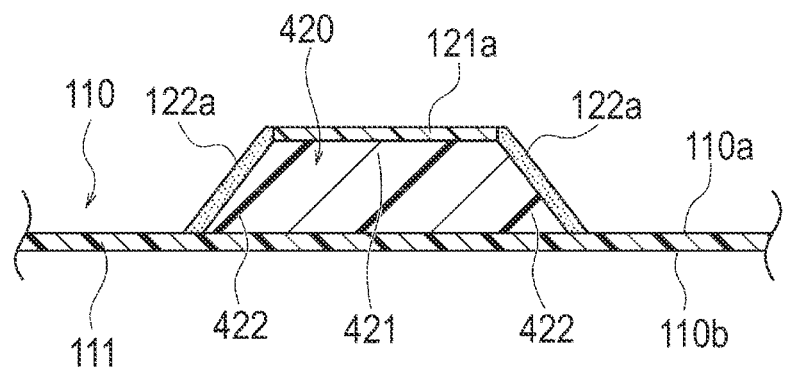
FIG. 25 is a cross-sectional view illustrating another modification of the pressing member.

A pressing member 420 according to another modification illustrated in FIG. 25 has a trapezoidal cross-sectional shape. A first region 421 has a flat surface shape. A second region 422 is implemented by an inclined surface extending from the first region 421 toward the inner surface 110a of the main body belt 110. The water-repellent layer 121a may be disposed in the first region 421. The adhesive layer 122a may be disposed in the second region 422.

Third Embodiment

Next, a hemostatic device 500 according to a third embodiment will be described with reference to FIGS. 26 to 29. A detailed description of features and aspects of the hemostatic device already described in the first and second embodiments will not be repeated. Configurations, operations and effects associated with the third embodiment that are not particularly described are the same as those of the first and second embodiments.

The hemostatic device 500 according to the third embodiment is different from the first embodiment in the arrangement of the pressing member 120.

Figure 26:
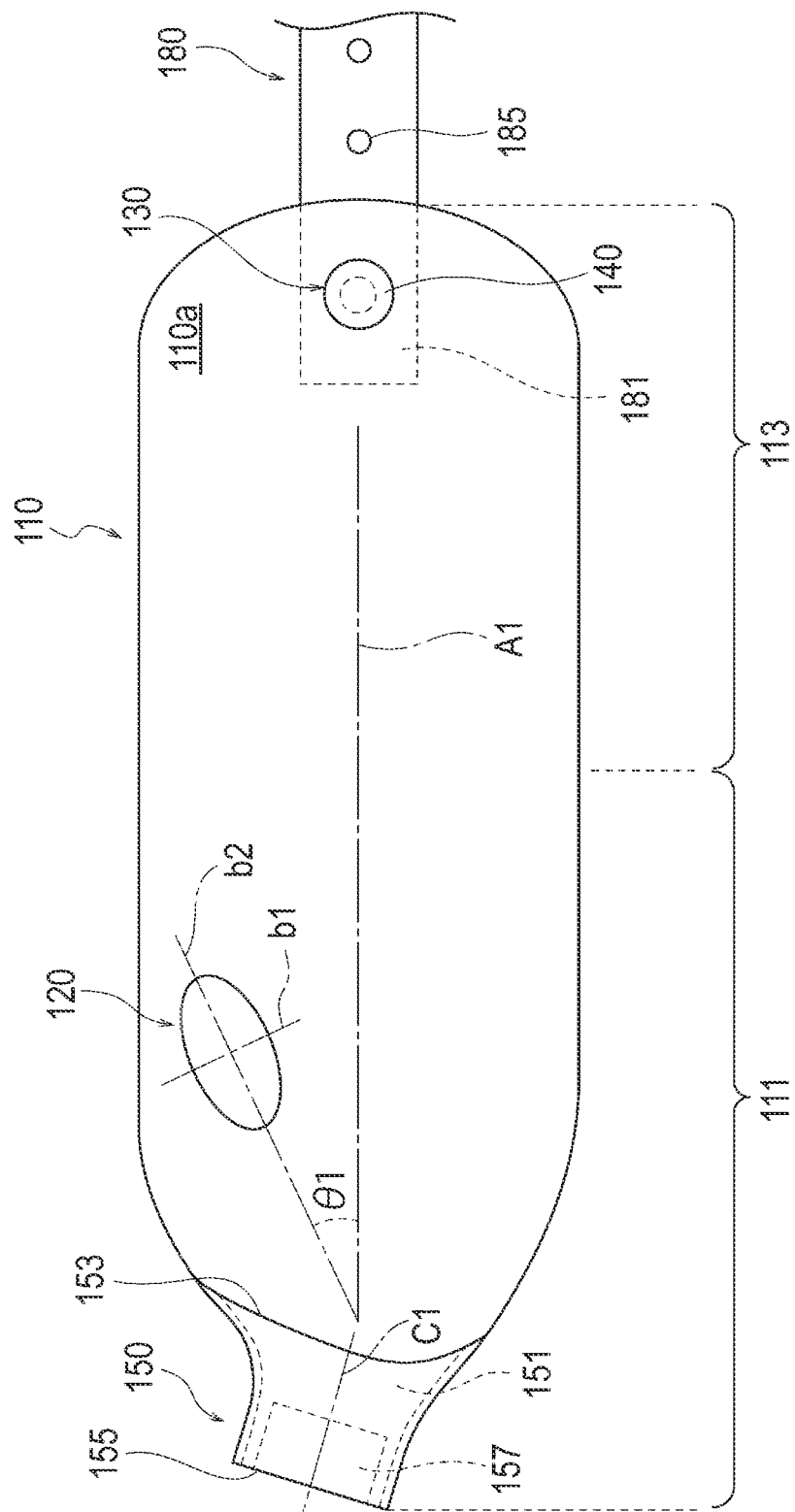
FIG. 26 is a plan view illustrating an enlarged part of a hemostatic device according to a third embodiment as viewed from an inner surface (a surface) of a main body belt.

As illustrated in FIG. 26, the pressing member 120 of the hemostatic device 500 has the short axis direction b1 and the long axis direction b2 intersecting the short axis direction b1. The long axis direction b2 of the pressing member 120 intersects the long axis direction A1 of the main body belt 110 along a longitudinal direction. An angle θ1 defined by a straight line along the long axis direction b2 of the pressing member 120 and a straight line along the long axis direction A1 of the main body belt 110 may be, for example, 0° to 30°.

Example of Use of the Hemostatic Device 500

Figure 28:
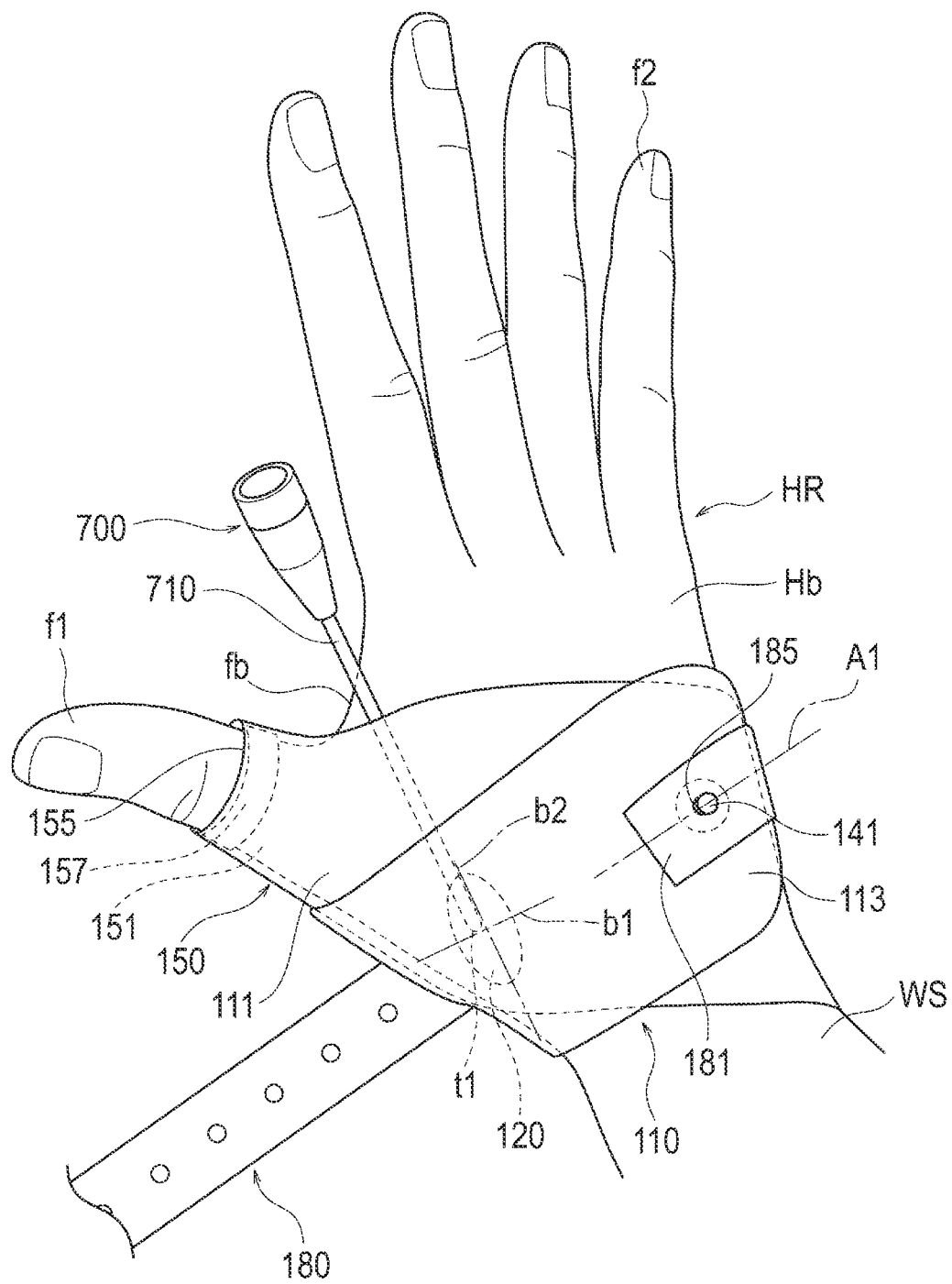
FIG. 28 is a perspective view illustrating a procedure when stopping bleeding at the puncture site formed in the right hand of the patient using the hemostatic device according to the third embodiment.
Figure 29:
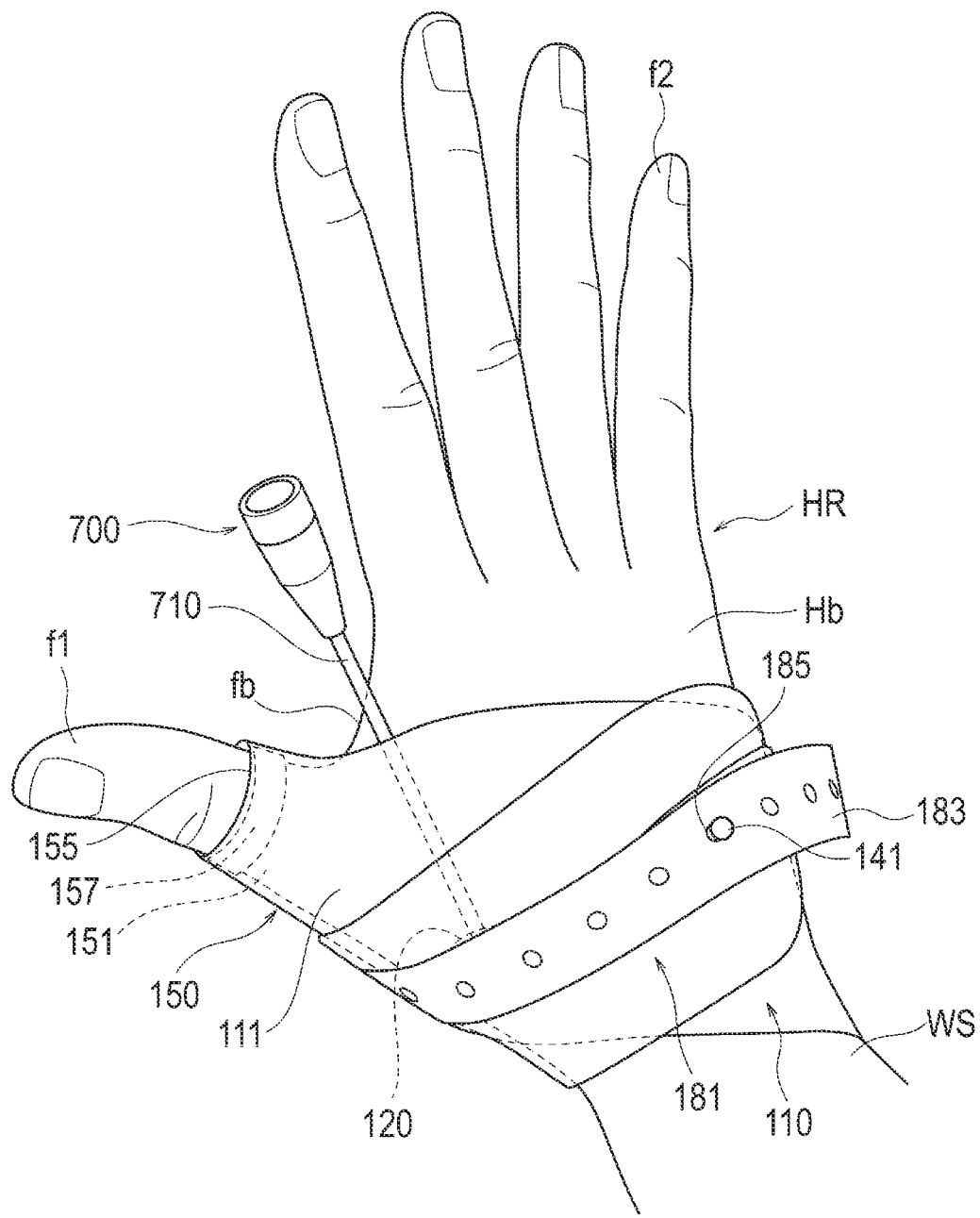
FIG. 29 is a perspective view illustrating a procedure when stopping bleeding at the puncture site formed in the right hand of the patient using the hemostatic device according to the third embodiment.

Procedures for stopping bleeding at the puncture site t1 formed on the dorsal side Hb of the right hand HR of a patient using the hemostatic device 500 will be described with reference to FIGS. 27 to 29. The procedures and the like already described in the example of use of the hemostatic device 100 according to the first embodiment are not repeated.

Figure 27:
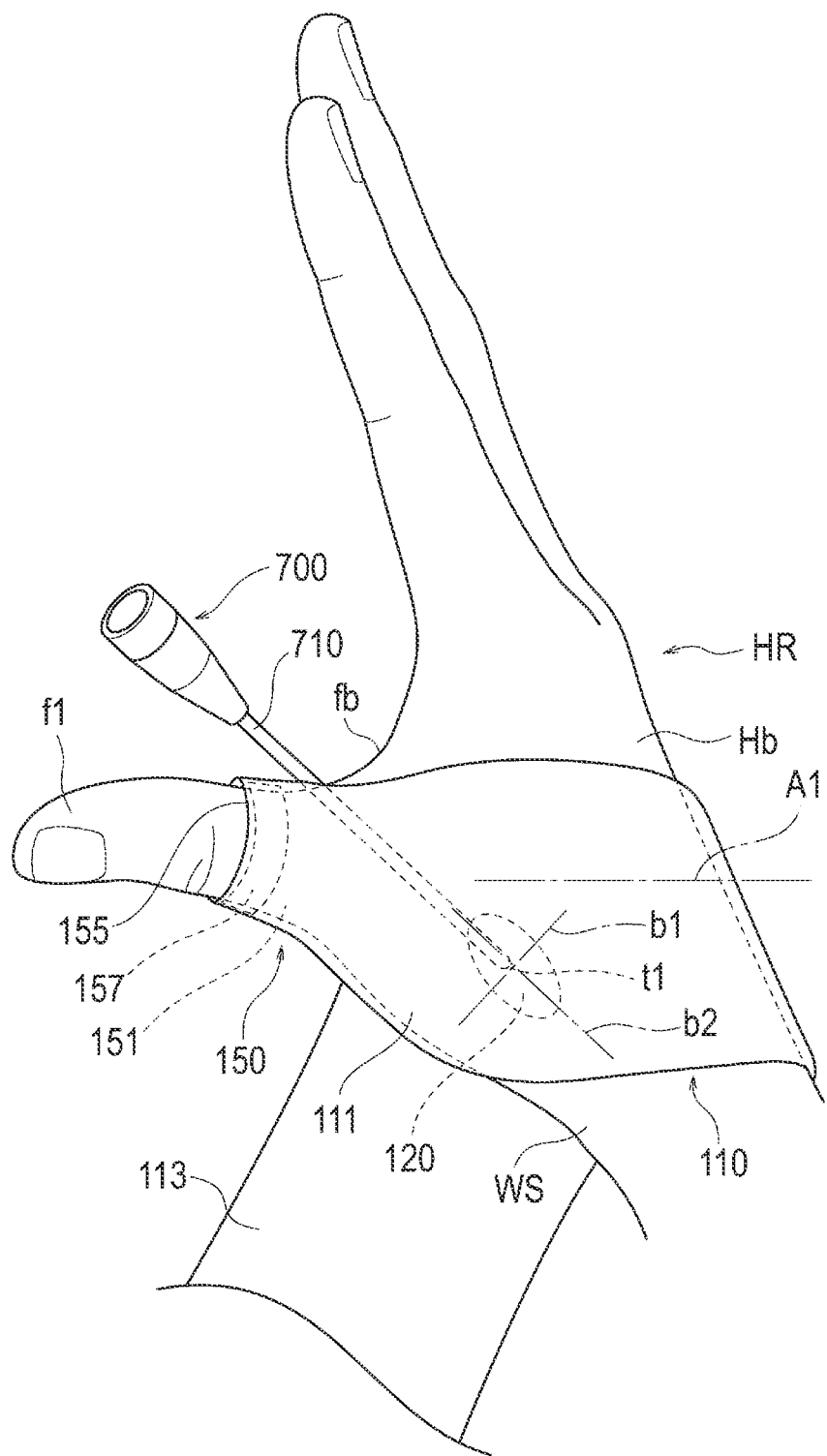
FIG. 27 is a perspective view illustrating a procedure when stopping bleeding at a puncture site formed in a right hand of a patient using the hemostatic device according to the third embodiment.

As illustrated in FIG. 27, a surgeon or the like inserts the thumb f1 of the right hand HR of the patient into the space portion 151 of the anchor portion 150. The surgeon or the like adjusts a winding direction of the main body belt 110 such that the long axis direction b2 of the pressing member 120 is disposed along an extending direction of the right hand HR of the patient (substantially the same direction as an extending direction of an extensor pollicis longus muscle). The surgeon or the like winds the main body belt 110 right-handed from the dorsal side Hb of the right hand HR of the patient toward the palm side Hf. After winding the main body belt 110 along an outer periphery of the right hand HR of the patient, the surgeon or the like winds the auxiliary belt 180 from the dorsal side Hb of the right hand HR of the patient toward the palm side Hf, as illustrated in FIG. 28. As illustrated in FIG. 29, the surgeon or the like passes the head portion 141 of the fixing member 140 through the hole portion 185 of the auxiliary belt 180 to fix the auxiliary belt 180 to the right hand HR of the patient. The surgeon or the like removes the sheath tube 710 of the introducer 700 in a state in which the pressing member 120 disposed on the inner surface 110a of the main body belt 110 applies a compressive force to the puncture site t1. By maintaining a state in which the hemostatic device 500 is attached to the right hand HR of the patient, the surgeon or the like can apply the compressive force to the puncture site t1 over time.

As described above, the pressing member 120 of the hemostatic device 500 according to the third embodiment has the short axis direction b1 and the long axis direction b2 intersecting the short axis direction b1, and the long axis direction b2 of the pressing member 120 intersects the long axis direction A1 of the main body belt 110 along the longitudinal direction. According to the hemostatic device 500 configured as described above, when the hemostatic device 500 is attached to the hand of the patient, the pressing member 120 can be disposed along the extensor pollicis longus muscle of the hand of the patient. Therefore, when stopping bleeding using the hemostatic device 500, the surgeon or the like can appropriately dispose the pressing member 120 at the puncture site t1 when the puncture site t1 is formed in the extension direction of the extensor pollicis longus muscle of the hand of the patient or in the vicinity of the extensor pollicis longus muscle.

Fourth Embodiment

Next, a hemostatic device 600 according to a fourth embodiment of the invention will be described with reference to FIGS. 30 to 46. A detailed description of features and aspects of the hemostatic device already described in the first, the second, and the third embodiments will not be repeated. Configurations, operations and effects associated with the fourth embodiment that are not particularly described are the same as those of the first, the second, and the third embodiments.

The hemostatic device 600 according to the fourth embodiment is different from the first embodiment in arrangement of the pressing member 120.

Figure 30:
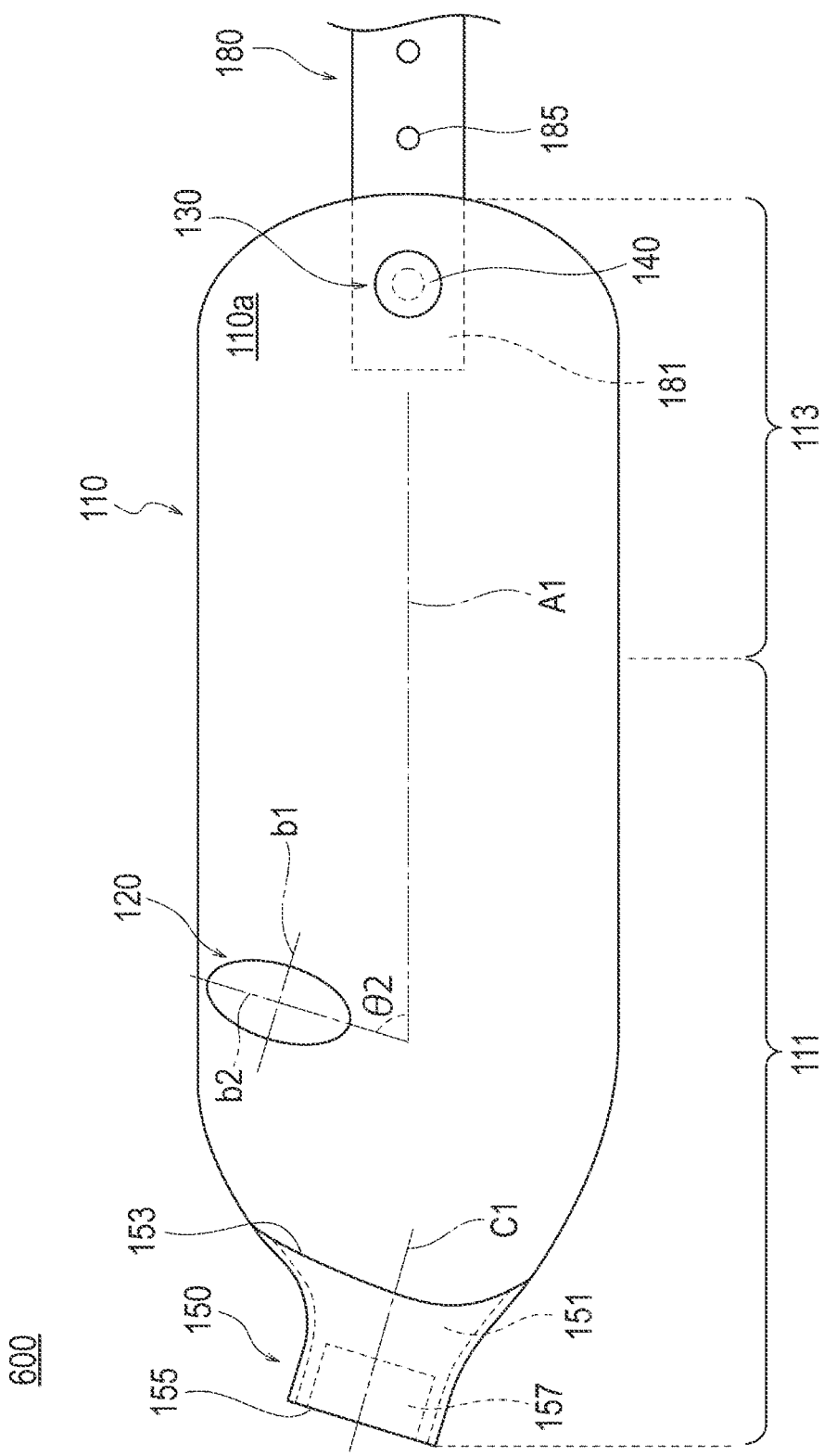
FIG. 30 is a plan view illustrating an enlarged part of a hemostatic device according to a fourth embodiment as viewed from an inner surface (a surface) of a main body belt.

As illustrated in FIG. 30, the pressing member 120 of the hemostatic device 600 has the short axis direction b1 and the long axis direction b2 intersecting the short axis direction b1. The long axis direction b2 of the pressing member 120 intersects the long axis direction A1 of the main body belt 110 along a longitudinal direction. An angle θ2 defined by a straight line along the long axis direction b2 of the pressing member 120 and a straight line along the long axis direction A1 of the main body belt 110 may be, for example, 30° to 60°.

First Example of Use of the Hemostatic Device 600

Procedures for stopping bleeding at the puncture site t1 formed on the dorsal side Hb of the right hand HR of a patient using the hemostatic device 600 will be described with reference to FIGS. 31 to 38. A detailed description of aspects of the procedures and the like already described in the examples of use of the hemostatic devices 100, 200, and 500 according to the embodiments described above are not repeated.

Figure 31:
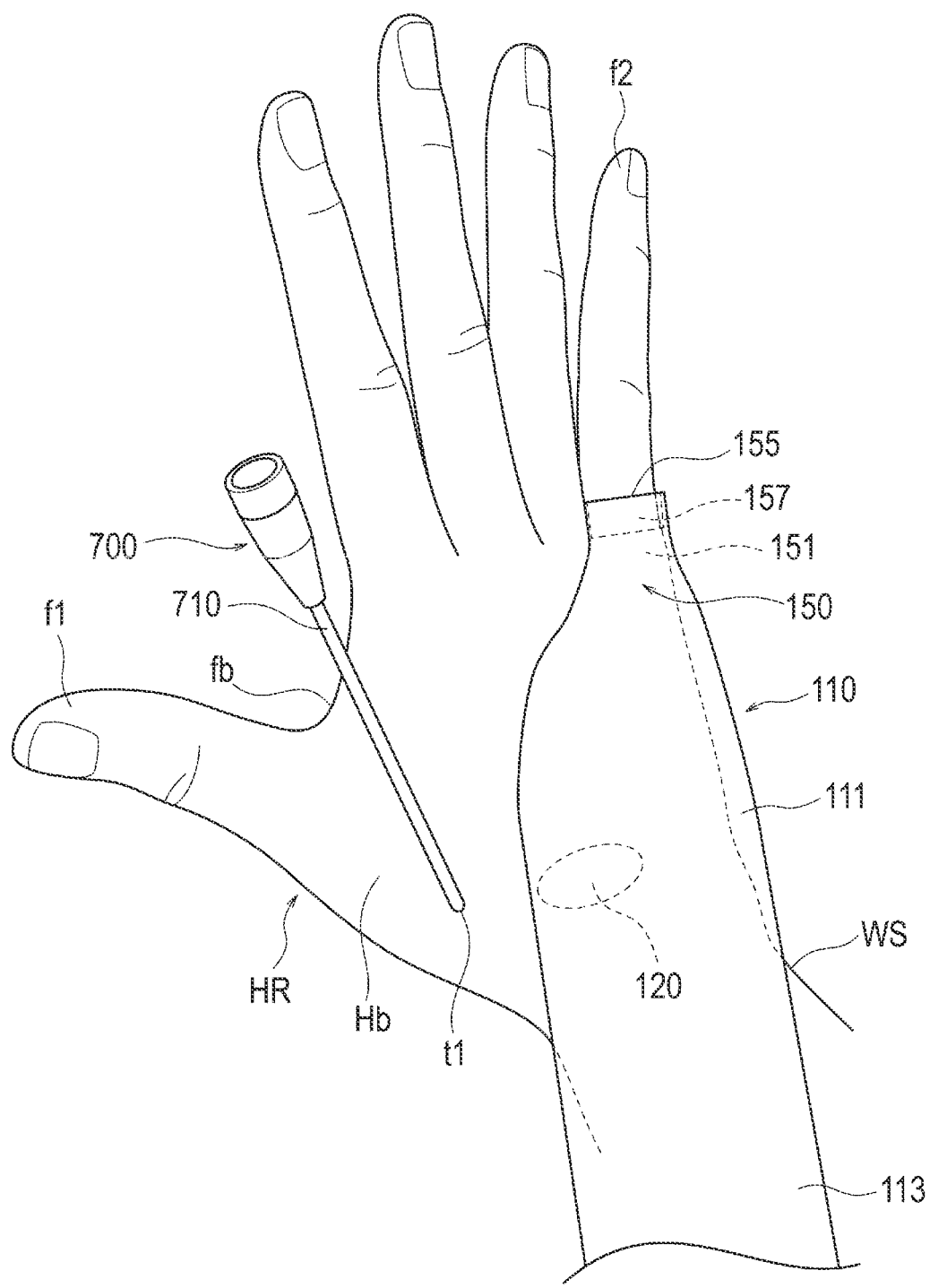
FIG. 31 is a perspective view illustrating a procedure when stopping bleeding at a puncture site formed in a right hand of a patient using the hemostatic device according to the fourth embodiment.
Figure 32:
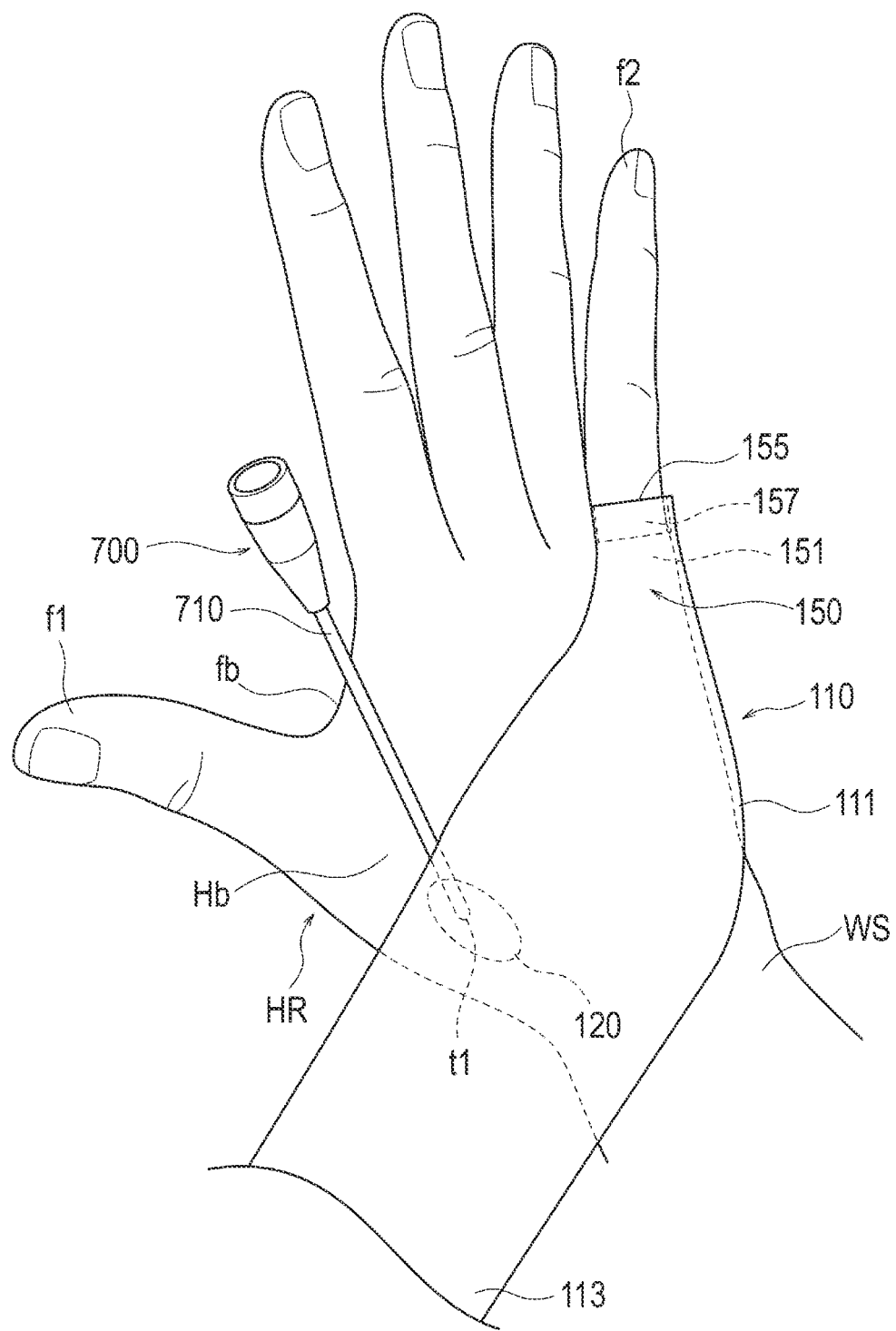
FIG. 32 is a perspective view illustrating a procedure when stopping bleeding at the puncture site formed in the right hand of the patient using the hemostatic device according to the fourth embodiment.
Figure 33:
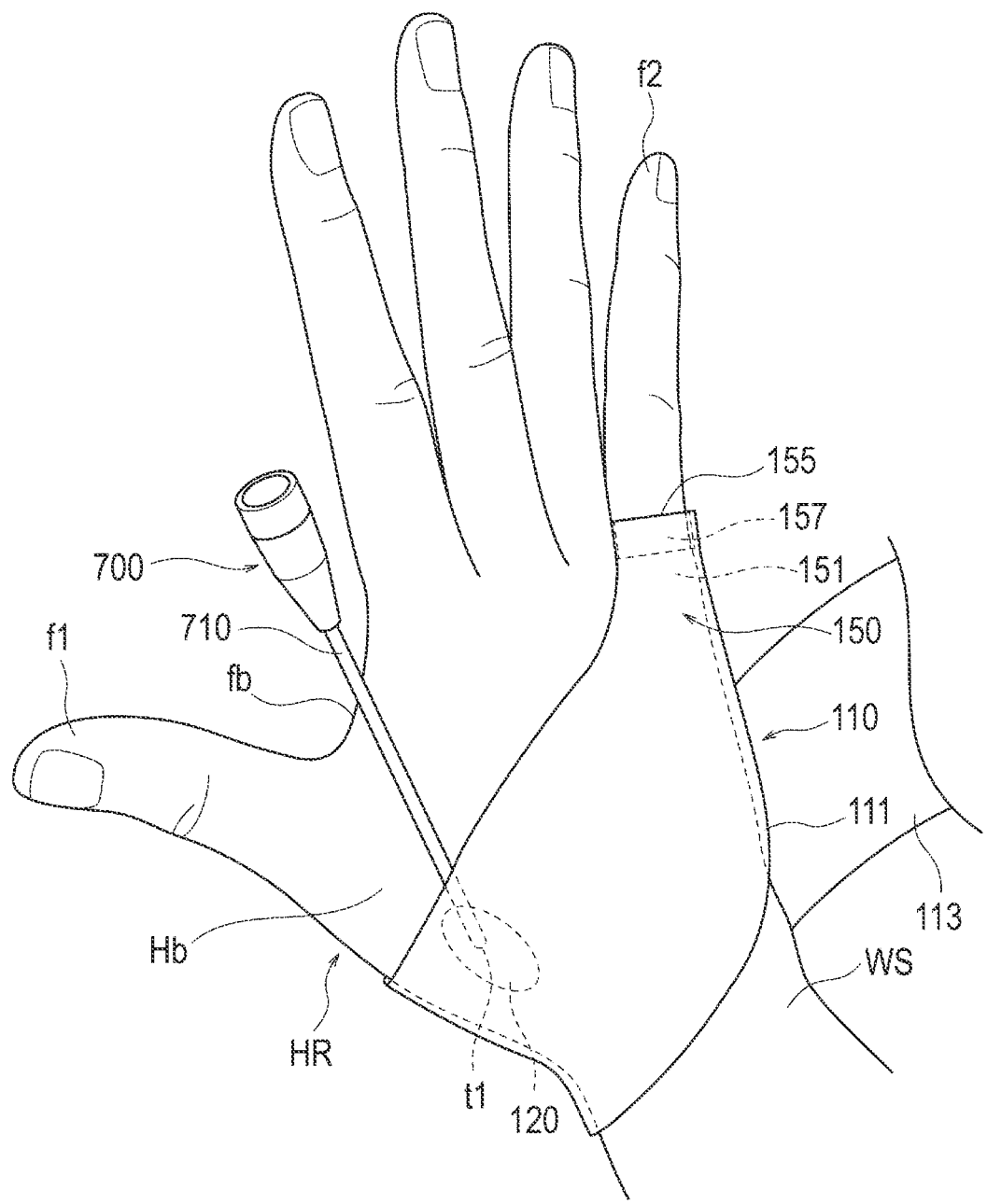
FIG. 33 is a perspective view illustrating a procedure when stopping bleeding at the puncture site formed in the right hand of the patient using the hemostatic device according to the fourth embodiment.
Figure 34:
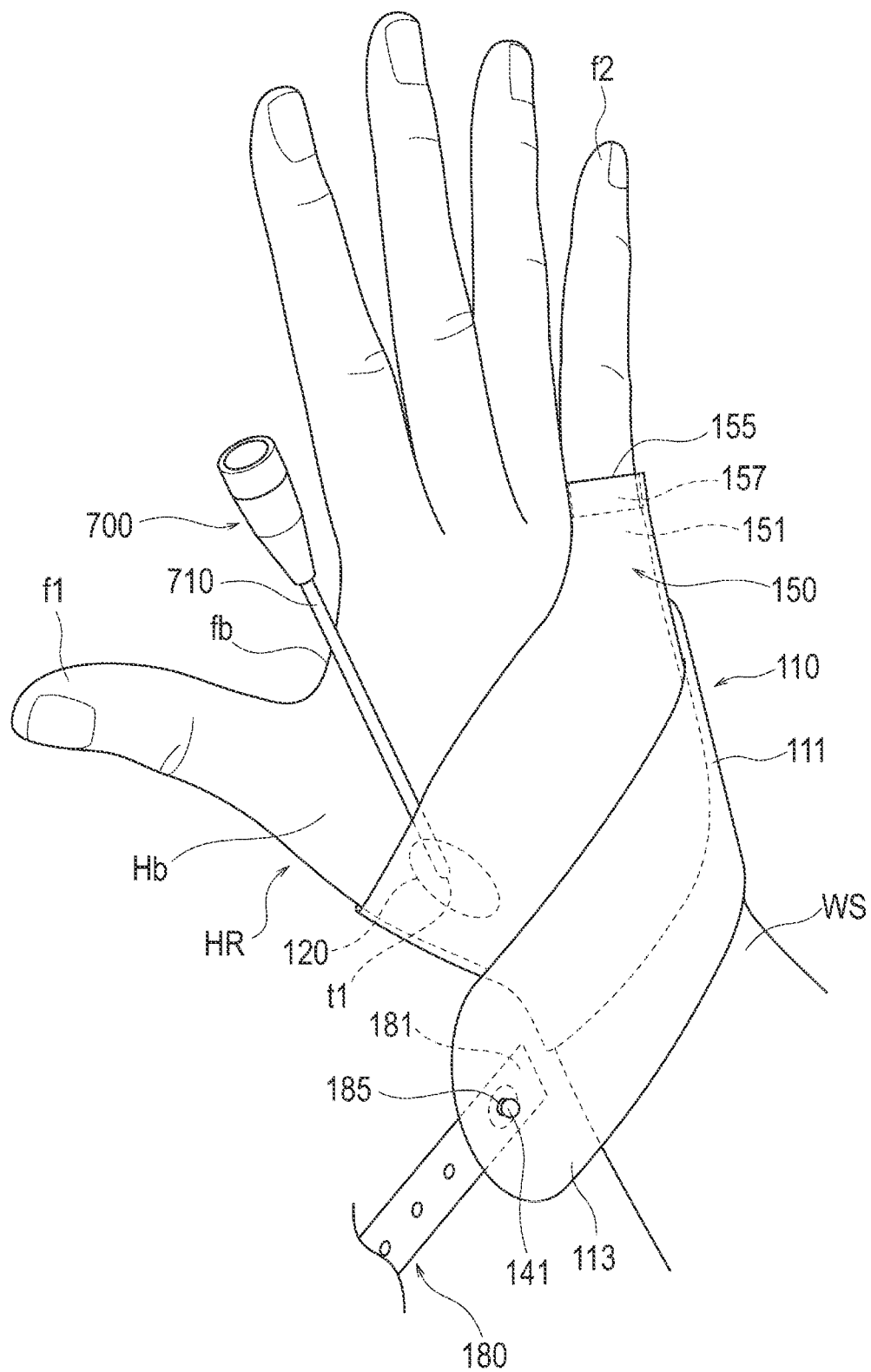
FIG. 34 is a perspective view illustrating a procedure when stopping bleeding at the puncture site formed in the right hand of the patient using the hemostatic device according to the fourth embodiment.
Figure 35:
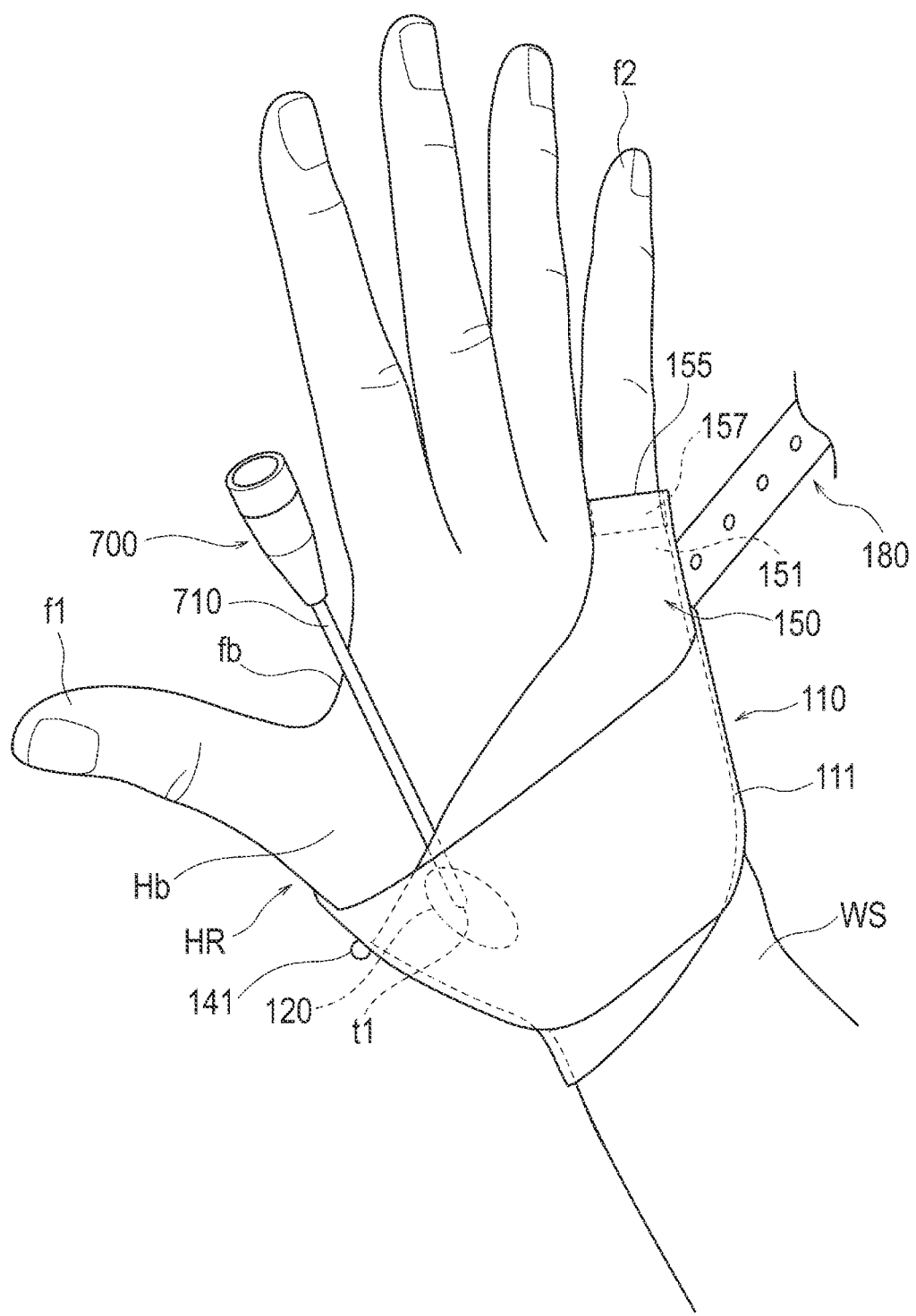
FIG. 35 is a perspective view illustrating a procedure when stopping bleeding at the puncture site formed in the right hand of the patient using the hemostatic device according to the fourth embodiment.
Figure 36:
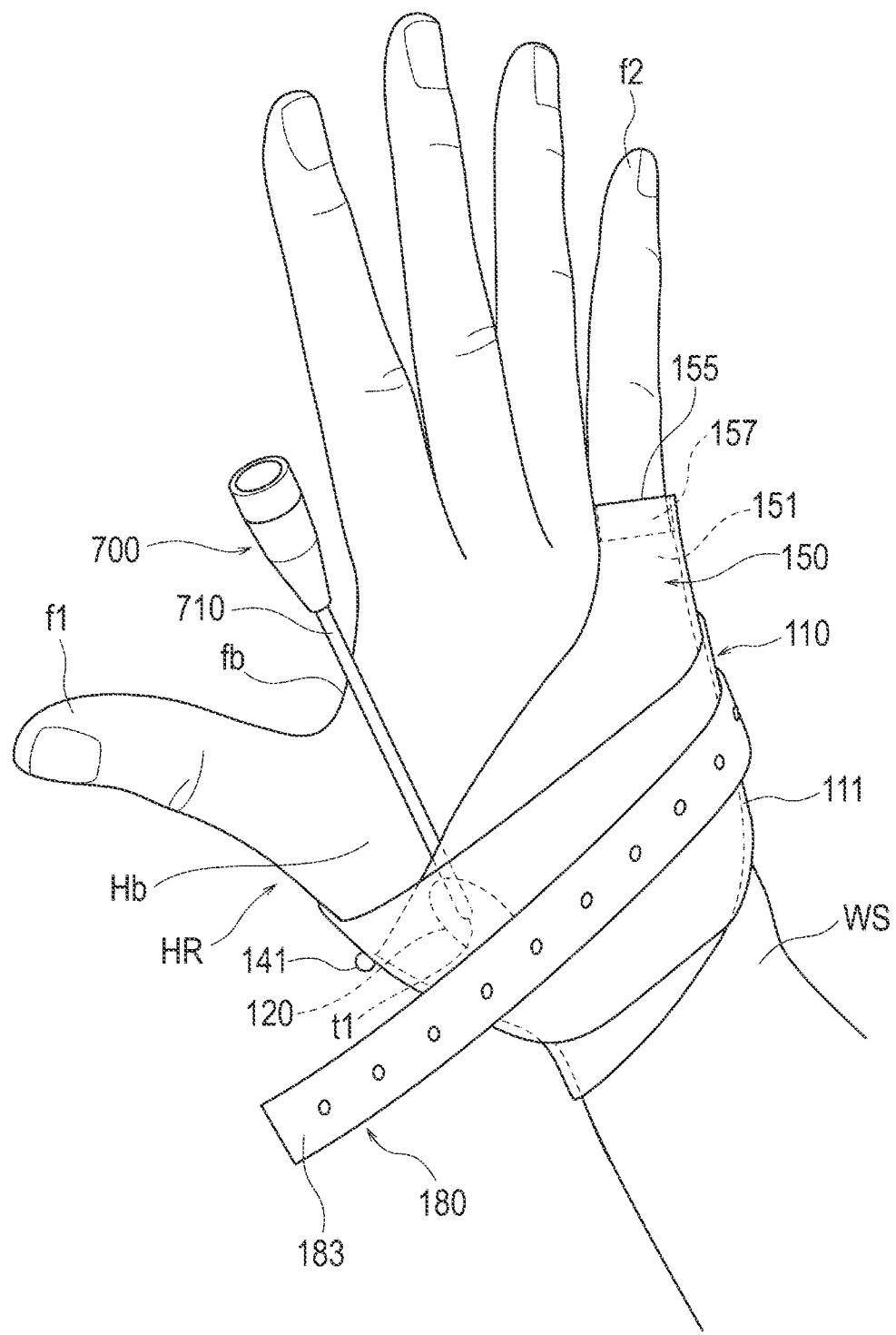
FIG. 36 is a perspective view illustrating a procedure when stopping bleeding at the puncture site formed in the right hand of the patient using the hemostatic device according to the fourth embodiment.
Figure 37:
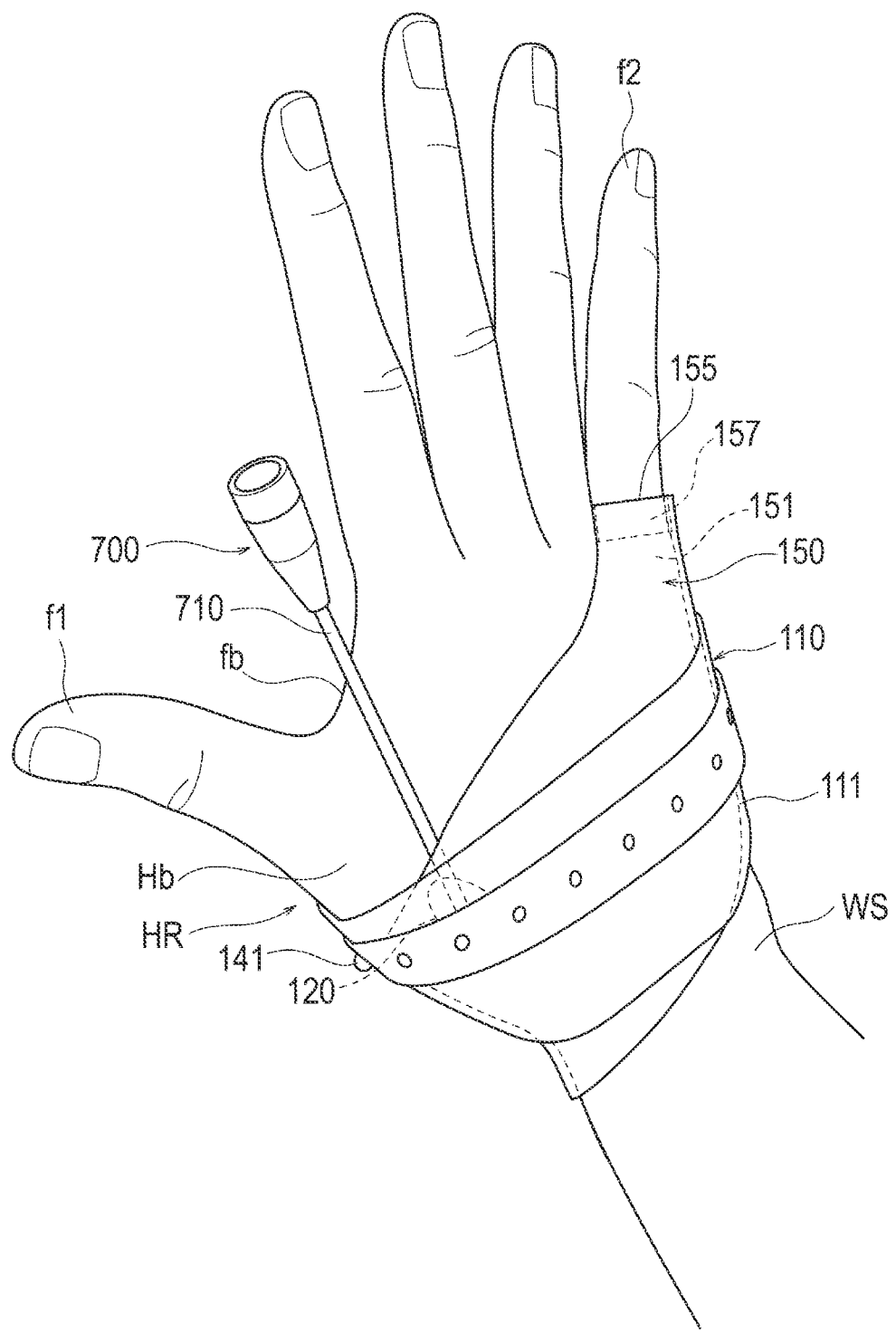
FIG. 37 is a perspective view illustrating a procedure when stopping bleeding at the puncture site formed in the right hand of the patient using the hemostatic device according to the fourth embodiment.
Figure 38:
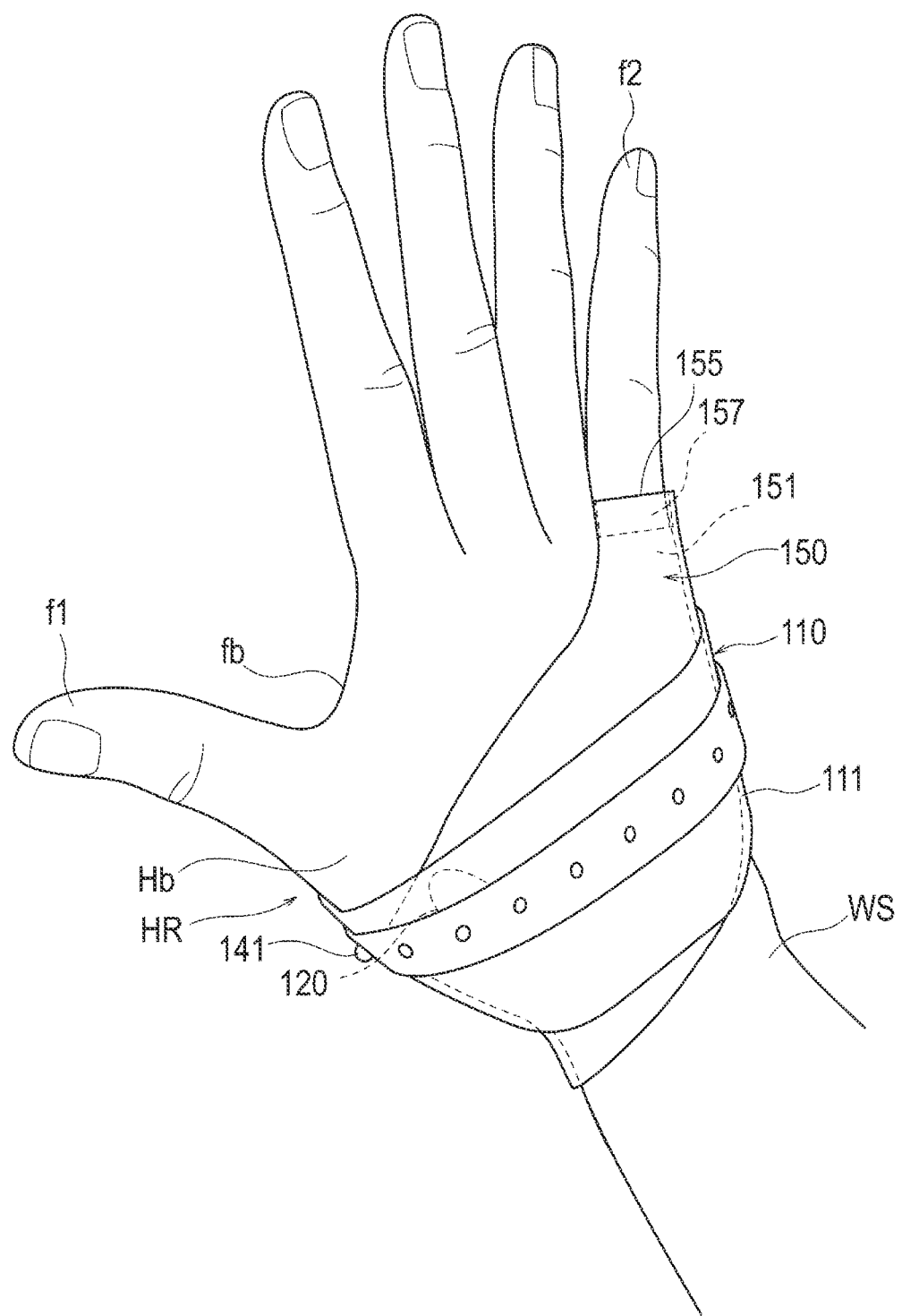
FIG. 38 is a perspective view illustrating a procedure when stopping bleeding at the puncture site formed in the right hand of the patient using the hemostatic device according to the fourth embodiment.

As illustrated in FIG. 31, a surgeon or the like inserts the little finger f2 of the right hand HR of the patient into the space portion 151 of the anchor portion 150. As illustrated in FIG. 32, the surgeon or the like winds the main body belt 110 left-handed from the dorsal side Hb of the right hand HR of the patient toward the palm side Hf. At this time, the surgeon or the like disposes the pressing member 120 at the puncture site t1 formed on the dorsal side Hb of the right hand HR of the patient. As illustrated in FIG. 33, the surgeon or the like further winds the main body belt 110 from the palm side Hf of the right hand HR of the patient toward the dorsal side Hb. As illustrated in FIGS. 34, 35, and 36, the surgeon or the like winds the auxiliary belt 180 connected to the main body belt 110 along an outer periphery of the right hand HR. As illustrated in FIG. 37, the surgeon or the like passes the head portion 141 of the fixing member 140 through the hole portion 185 of the auxiliary belt 180 to fix the auxiliary belt 180 to the right hand HR of the patient. As illustrated in FIG. 38, the surgeon or the like removes the sheath tube 710 of the introducer 700 in a state in which the main body belt 110 and the auxiliary belt 180 are wound around the right hand HR of the patient and the pressing member 120 disposed on the inner surface 110a of the main body belt 110 applies a compressive force to the puncture site t1. By maintaining a state in which the hemostatic device 600 is attached to the right hand HR of the patient, the surgeon or the like can continuously apply the compressive force to the puncture site t1.

Second Example of Use of the Hemostatic Device 600

Procedures for stopping bleeding at the puncture site t1 formed on the dorsal side Hb of the left hand HL of the patient using the hemostatic device 600 will be described with reference to FIGS. 39 to 46. A detailed description of aspects of the procedures and the like already described in the first example of use of the hemostatic device 600 are not repeated.

Figure 39:
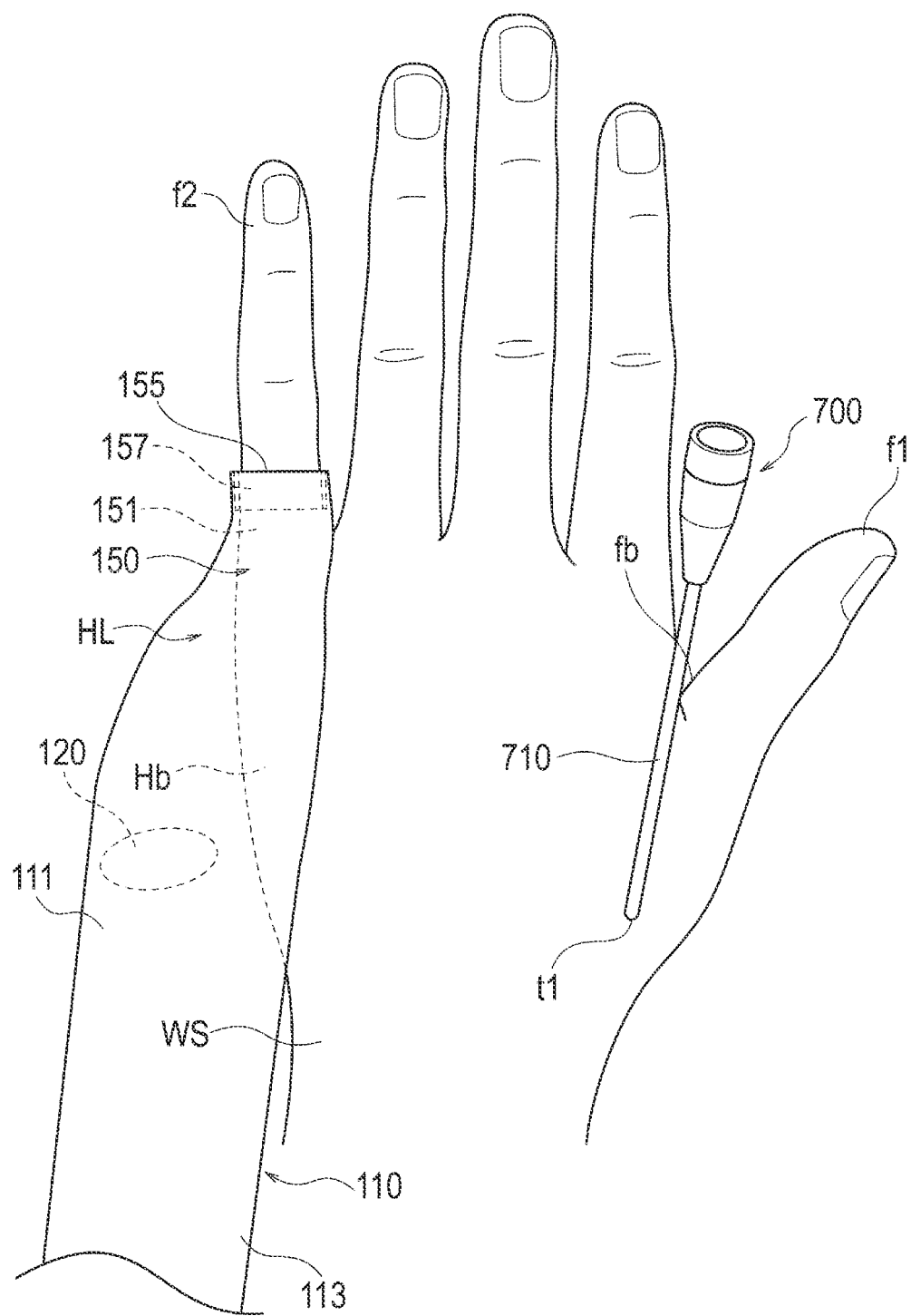
FIG. 39 is a perspective view illustrating a procedure when stopping bleeding at a puncture site formed in a left hand of the patient using the hemostatic device according to the fourth embodiment.
Figure 40:
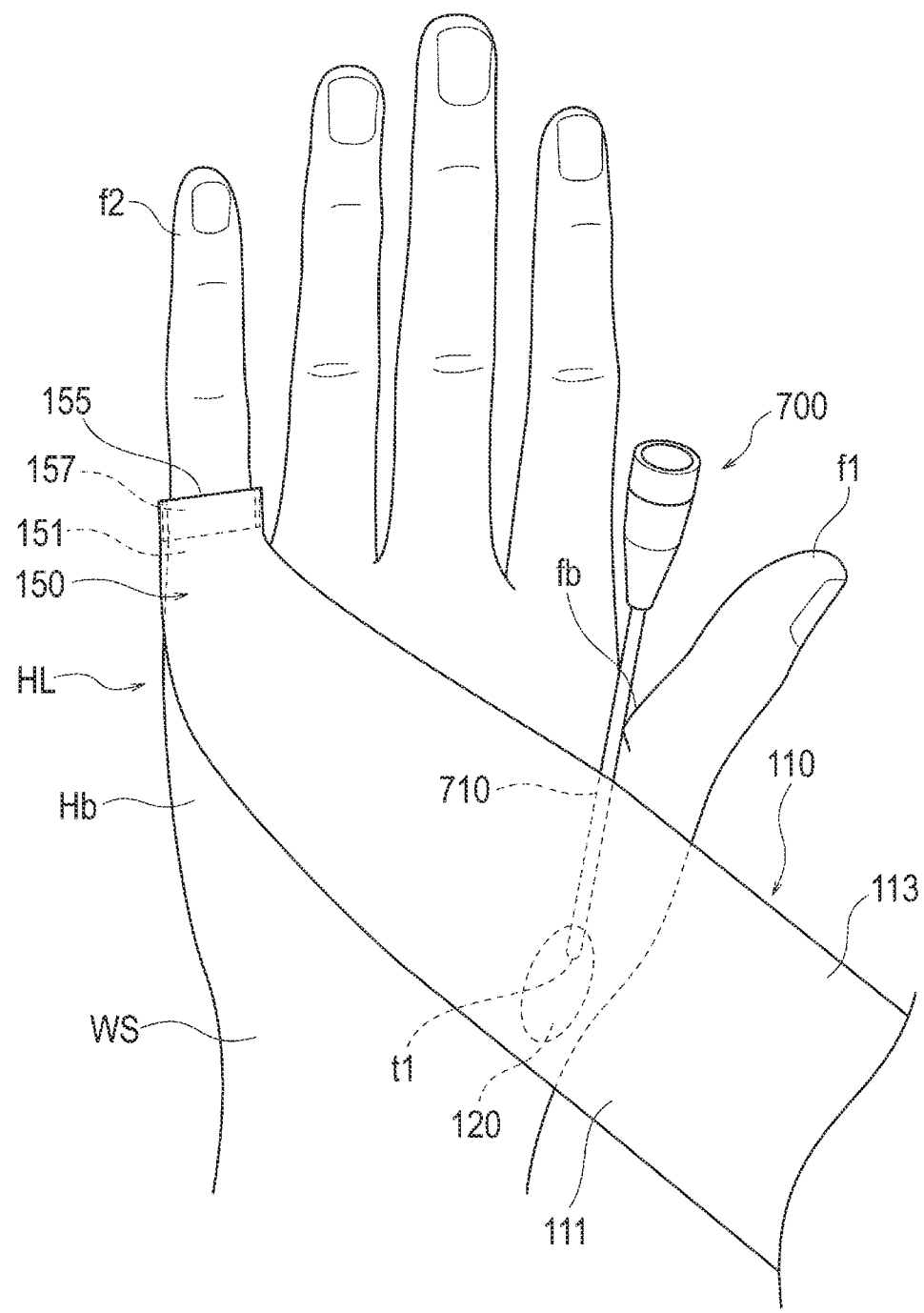
FIG. 40 is a perspective view illustrating a procedure when stopping bleeding at the puncture site formed in the left hand of the patient using the hemostatic device according to the fourth embodiment.
Figure 41:
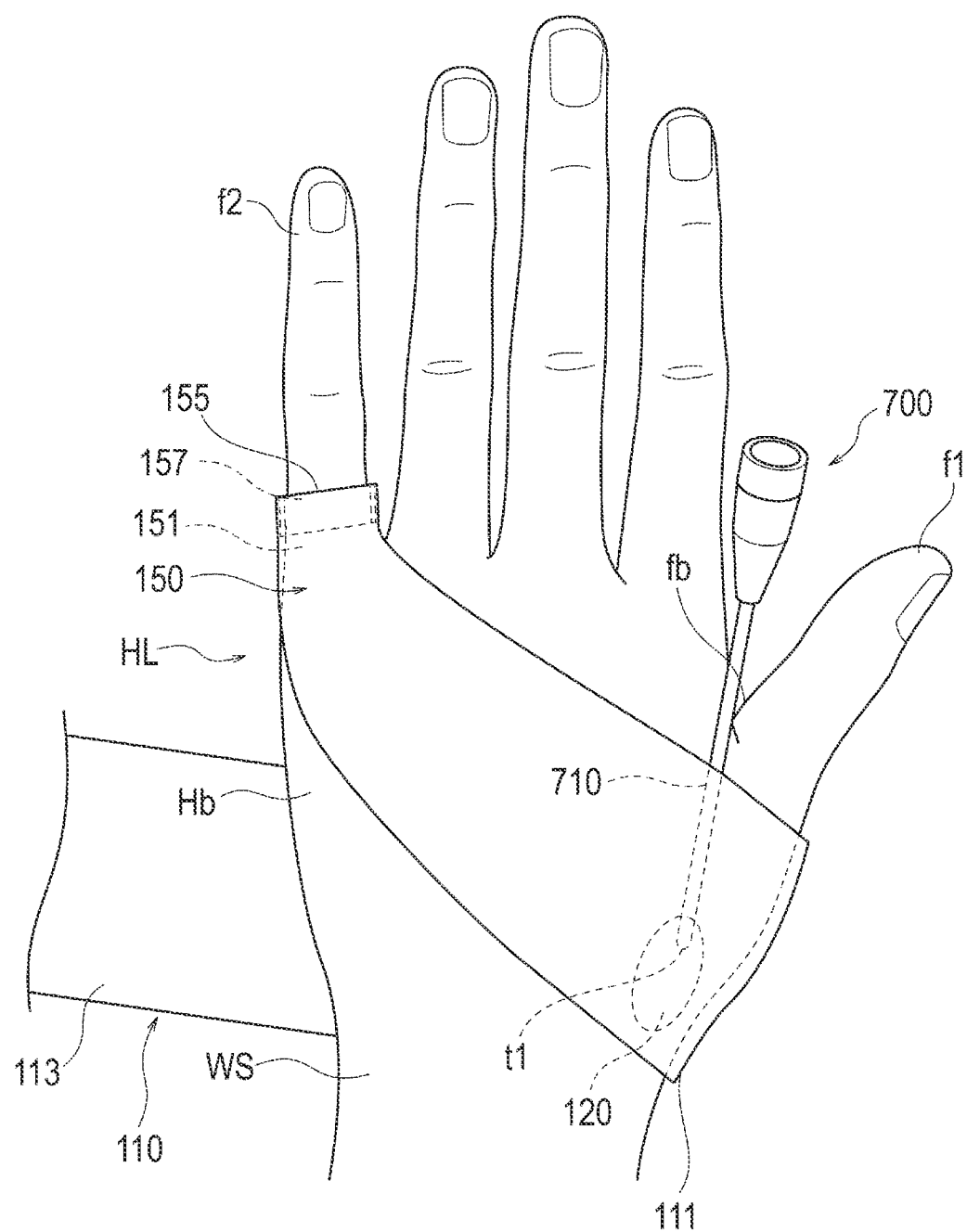
FIG. 41 is a perspective view illustrating a procedure when stopping bleeding at the puncture site formed in the left hand of the patient using the hemostatic device according to the fourth embodiment.
Figure 42:
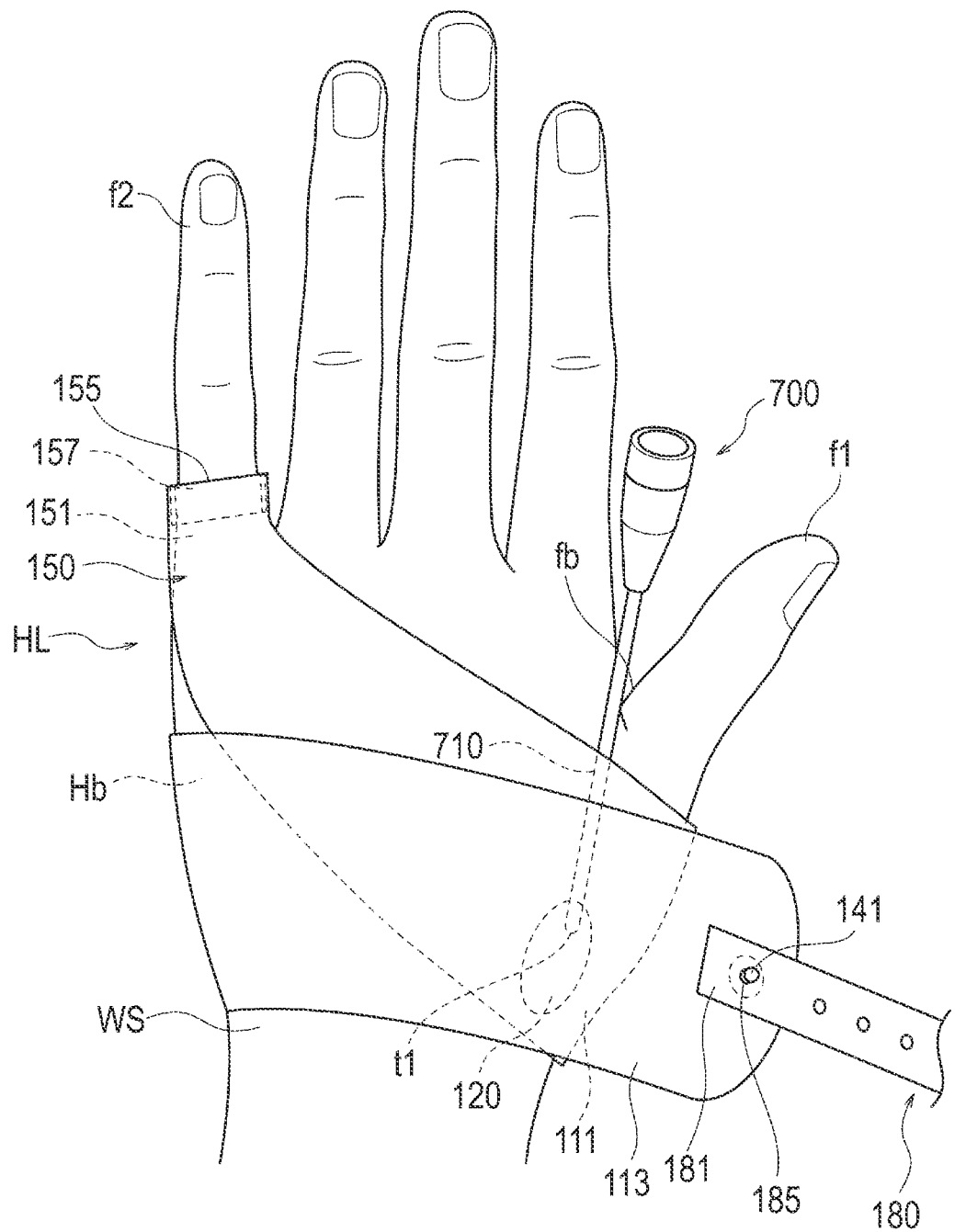
FIG. 42 is a perspective view illustrating a procedure when stopping bleeding at the puncture site formed in the left hand of the patient using the hemostatic device according to the fourth embodiment.
Figure 43:
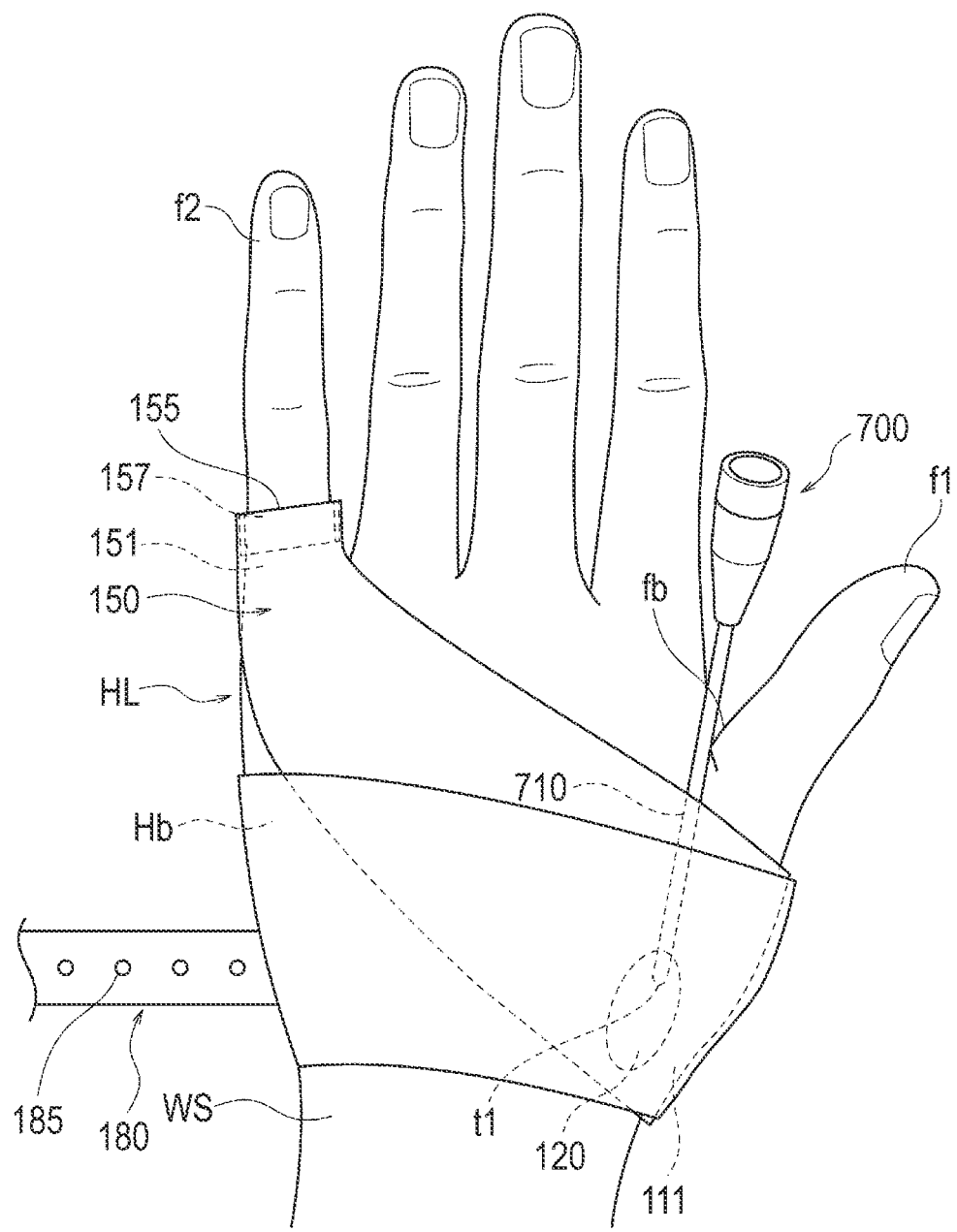
FIG. 43 is a perspective view illustrating a procedure when stopping bleeding at the puncture site formed in the left hand of the patient using the hemostatic device according to the fourth embodiment.
Figure 44:
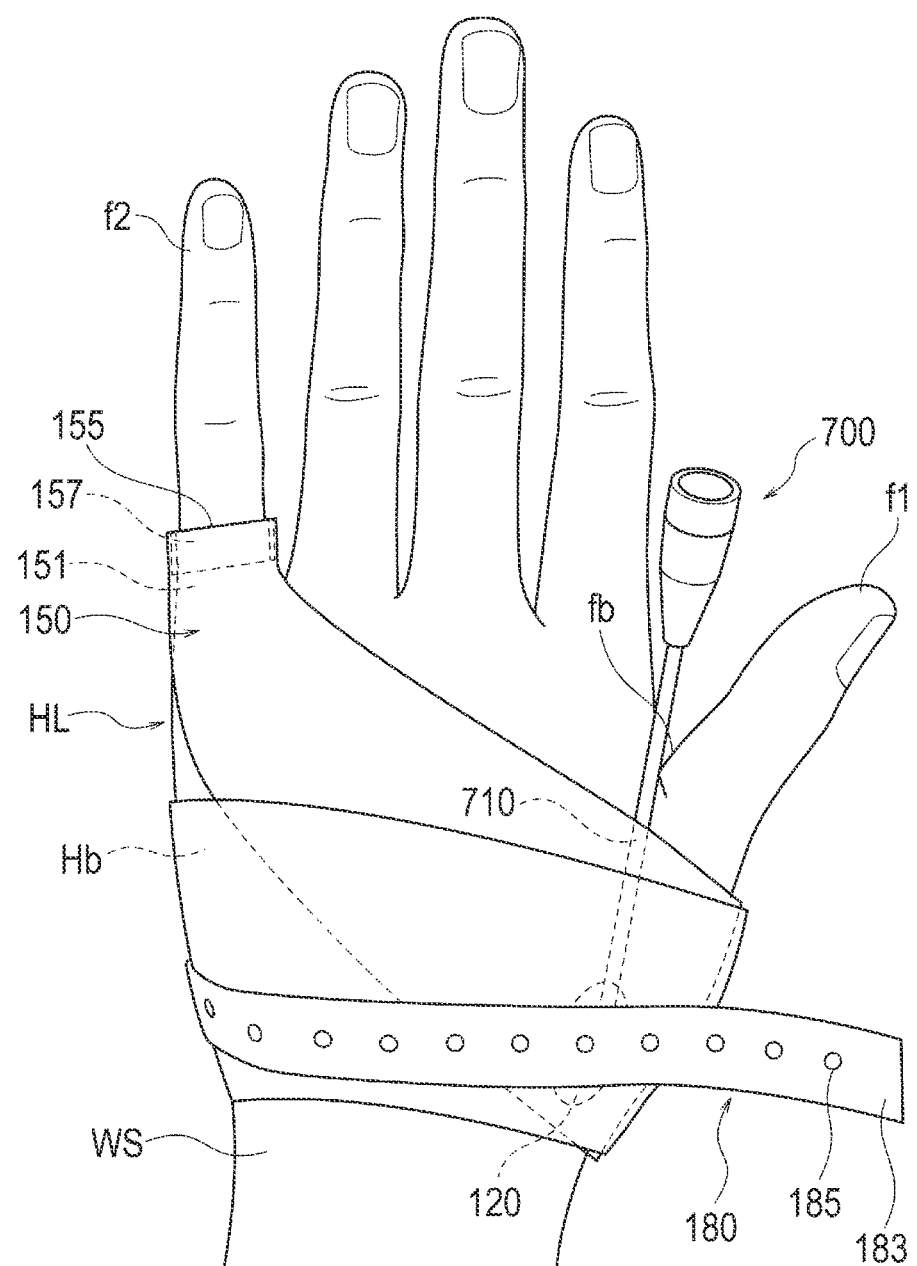
FIG. 44 is a perspective view illustrating a procedure when stopping bleeding at the puncture site formed in the left hand of the patient using the hemostatic device according to the fourth embodiment.
Figure 45:
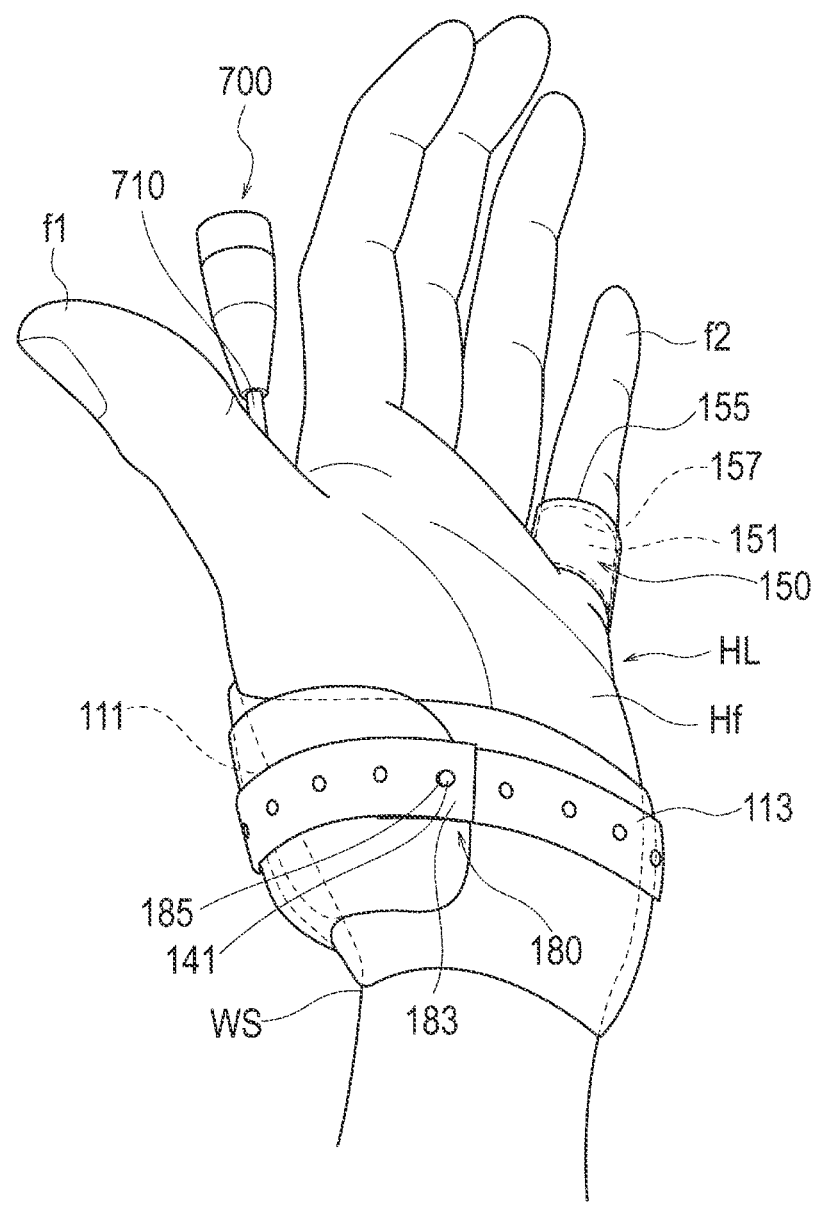
FIG. 45 is a perspective view illustrating a procedure when stopping bleeding at the puncture site formed in the left hand of the patient using the hemostatic device according to the fourth embodiment.
Figure 46:
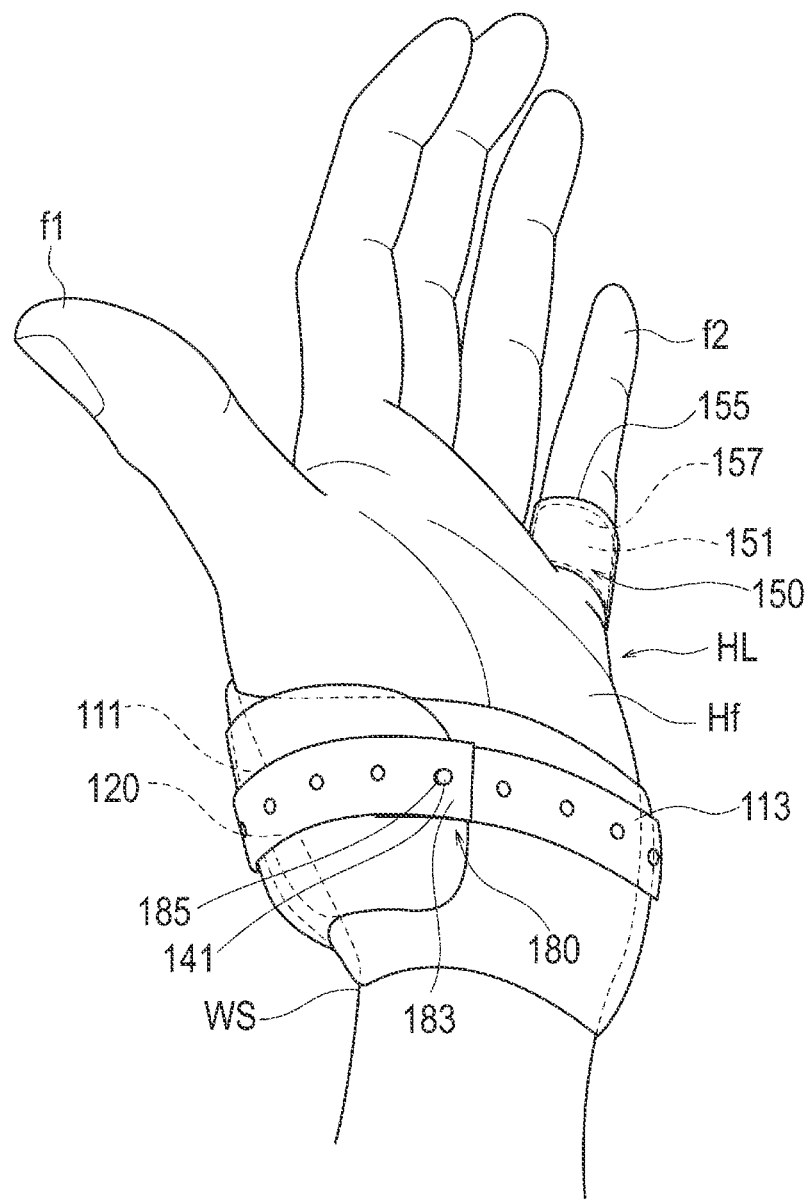
FIG. 46 is a perspective view illustrating a procedure when stopping bleeding at the puncture site formed in the left hand of the patient using the hemostatic device according to the fourth embodiment.

As illustrated in FIG. 39, the surgeon or the like inserts the little finger f2 of the left hand HL of the patient into the space portion 151 of the anchor portion 150. As illustrated in FIG. 40, the surgeon or the like winds the main body belt 110 right-handed from the dorsal side Hb of the left hand HL of the patient toward the palm side Hf. At this time, the surgeon or the like disposes the pressing member 120 at the puncture site t1 formed on the dorsal side Hb of the left hand HL of the patient. As illustrated in FIG. 41, the surgeon or the like further winds the main body belt 110 from the palm side Hf of the left hand HL of the patient toward the dorsal side Hb. As illustrated in FIGS. 42, 43, and 44, the surgeon or the like winds the auxiliary belt 180 connected to the main body belt 110 along an outer periphery of the left hand HL of the patient. As illustrated in FIG. 45, the surgeon or the like passes the head portion 141 of the fixing member 140 through the hole portion 185 of the auxiliary belt 180 on the palm side Hf of the left hand HL of the patient to fix the auxiliary belt 180 to the left hand HL of the patient. As illustrated in FIG. 46, the surgeon or the like removes the sheath tube 710 of the introducer 700 in a state in which the main body belt 110 and the auxiliary belt 180 are wound around the left hand HL of the patient and the pressing member 120 disposed on the inner surface 110a of the main body belt 110 applies the compressive force to the puncture site t1. By maintaining a state in which the hemostatic device 600 is attached to the left hand HL of the patient, the surgeon or the like can continuously apply the compressive force to the puncture site t1.

As described above, the hemostatic device 600 according to the present embodiment is disposed such that the long axis direction b2 of the pressing member 120 intersects the long axis direction A1 of the main body belt 110 along the longitudinal direction at the predetermined angle 82. The hemostatic device 600 configured as described above can hold the anchor portion 150 on the hand of the patient by, for example, inserting a finger (for example, the little finger f2 or the like) other than the thumb f1 into the anchor portion 150. Since the hemostatic device 600 can hold the anchor portion 150 on the finger other than the thumb f1 of the patient, the hemostatic device 600 can be attached to the hand of the patient in various states depending on a situation of a procedure. Therefore, the hemostatic device 600 has high versatility. Note that the angle 62 can be arbitrarily changed according to the position where the pressing member 120 is disposed on the hand of the patient, the type of the finger to be inserted into the anchor portion 150, and the like.

Fifth Embodiment

Figure 47:
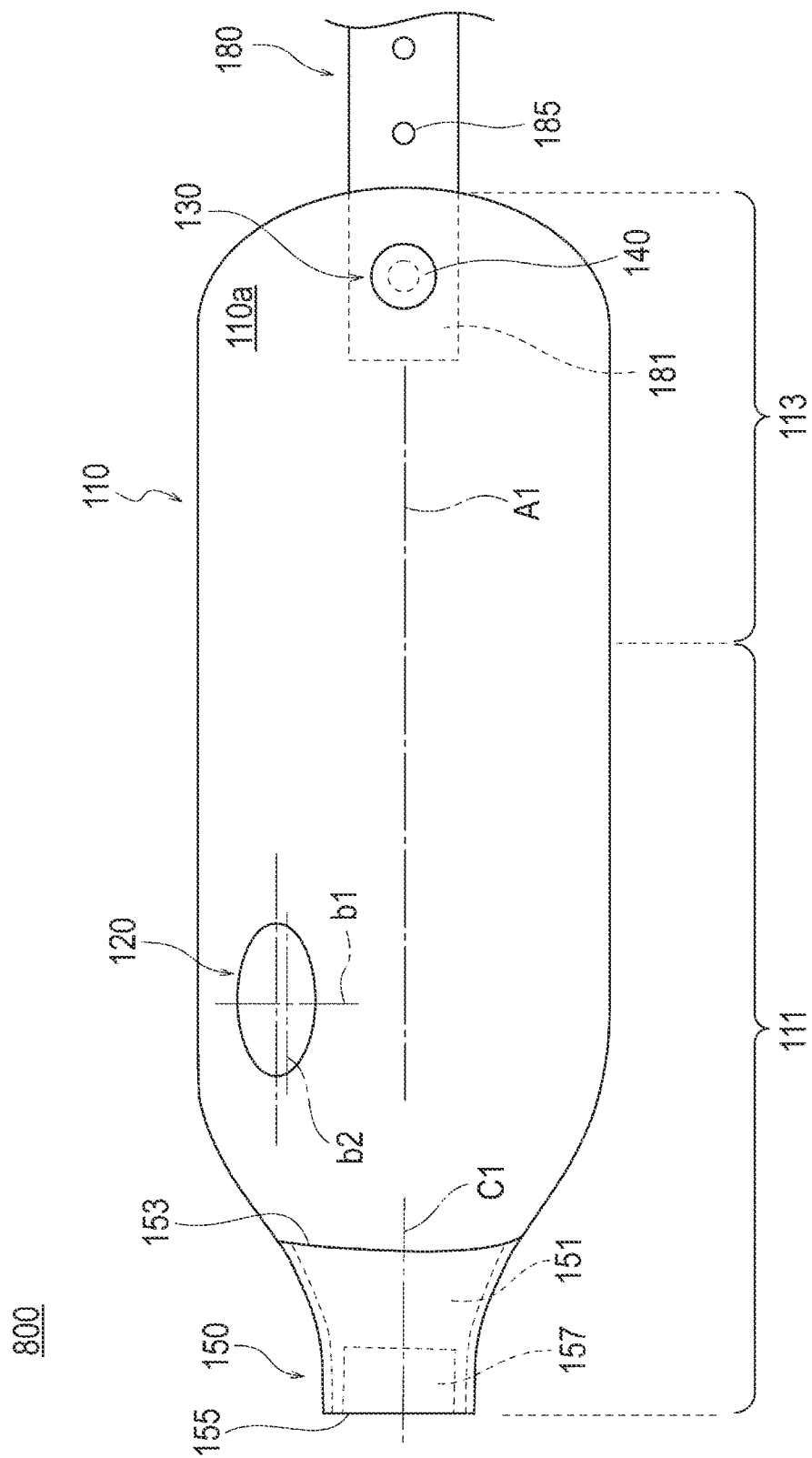
FIG. 47 is a plan view illustrating an enlarged part of a hemostatic device according to a fifth embodiment as viewed from an inner surface (a surface) of a main body belt.

FIG. 47 illustrates a view of an enlarged part of a hemostatic device 800 according to a fifth embodiment of the invention. In the hemostatic device 800, a longitudinal direction (a direction parallel to the center line C1) of the anchor portion 150 is substantially parallel to the long axis direction A1 of the main body belt 110 along a longitudinal direction. As illustrated in the present embodiment, in the hemostatic device according to the invention, the longitudinal direction of the anchor portion 150 may not intersect the long axis direction A1 of the main body belt 110 along the longitudinal direction.

Although the hemostatic device disclosed here has been described above through the embodiments, the invention is not limited only to the contents described in the specification, and can be appropriately changed based on the description of the claims In the descriptions of the embodiments, the hemostatic device for stopping bleeding at the puncture site formed in the dorsal side of one's hand is exemplified, and the hemostatic device can also be used to stop bleeding at a puncture site or the like formed in the palm side of one's hand.

The arrangements and shapes of members, the methods for connecting the members, the constituent materials, the procedures for using the hemostatic device, and the like described in the embodiments are examples, and these contents can be appropriately changed as long as the effects of the invention can be exhibited. For example, the hemostatic device may not include the auxiliary belt.

The detailed description above describes embodiments of a hemostatic device representing examples of the new hemostatic device disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A hemostatic device comprising:
a main body belt configured to be wound around at least a part of a hand and a wrist of a patient, the main body belt having an inner surface that faces a surface of the patient when the main body belt is wound around at least the part of the hand and the wrist of the patient, the main body belt also having an outer surface that is opposite the inner surface;
a pressing member configured to be disposed at a site of the hand where bleeding is to be stopped to compress the site where bleeding is to be stopped;
the main body belt including a distal region and a proximal region that are positioned relative to one another so that when the pressing member is at the site on the hand where bleeding is to be stopped the proximal region of the main body belt is disposed at a position farther away from a fingertip of the hand of the patient than the distal region of the main body belt;
the distal region of the main body belt including an anchor portion that includes
overlying material that overlies a part of the inner surface of the main body belt before the main body belt is wound around at least the part of the hand and the wrist of the patient, the overlying material and the part of the inner surface of the main body belt defining a space portion configured to receive the finger of the patient so that the finger is positioned in the space portion before the main body belt is wound around at least the part of the hand and the wrist of the patient, the overlying material extending between a most proximal end of the overlying material and a most distal end of the overlying material,
an insertion port that is opened toward the proximal region and that communicates with the space portion to allow the finger of the patient to be inserted into the space portion, the insertion port being located at the most proximal end of the overlying material, and
a distal opening that communicates with the space portion to allow the fingertip of the finger of the patient inserted into the space portion to protrude distally beyond the anchor portion, the distal opening being located at the most distal end of the overlying material;
the pressing member being configured to allow the site where bleeding is to be stopped to be viewed from outside in a state in which the pressing member is disposed at the site where bleeding is to be stopped; and
the pressing member being fixed to the distal region of the main body belt at a position spaced on a proximal side from the insertion port and being fixed on the inner surface of the main body belt.

2. The hemostatic device according to claim 1, wherein the anchor portion includes a center line extending throughout the anchor portion, the pressing member being disposed, on the inner surface of the main body belt, at a position spaced from a portion through which the center line of the anchor portion extends.

3. The hemostatic device according to claim 1, wherein the main body belt is elongated along a longitudinal direction along a long axis direction of the main body belt,
the pressing member possesses a configuration having a width along a short axis direction and a length along a long axis direction, the short axis direction and the long axis direction intersecting one another, the length of the pressing member being greater than the width of the pressing member, and
the long axis direction of the pressing member intersects the long axis direction of the main body belt.

4. The hemostatic device according to claim 1, wherein the pressing member is fabricated from a material and includes a first region positionable in contact with the site where bleeding is to be stopped, and a second region surrounding the first region,
the second region includes an adhesive layer having adhesiveness higher than that of the material from which the pressing member is fabricated, and
the adhesive layer has a color different from that of the first region.

5. The hemostatic device according to claim 4, wherein the first region has a water repellent layer having water repellency higher than that of the adhesive layer.

6. The hemostatic device according to claim 1, wherein the anchor portion includes a holding member, the holding member being a hollow tubular member that is positioned in the space portion and configured to maintain a shape of the space portion, the holding member being constructed of a material that is harder than a material from which the anchor portion is constructed.

7. The hemostatic device according to claim 1, wherein the main body belt is comprised of a first layer completely surrounding the pressing member, and a second layer to which the first layer is fixed, the first layer having one surface facing the second layer and an opposite surface facing in a first direction away from the second layer, the pressing member projecting away from the second layer in the first direction, the first layer being fabricated of a material softer than a material from which the second layer is fabricated.

8. The hemostatic device according to claim 1, further comprising:
an auxiliary belt configured to be wound around a portion of the hand of the patient to assist in compressing the site where bleeding is to be stopped by the pressing member, wherein
a width of the main body belt is larger than a width of the auxiliary belt.

9. The hemostatic device according to claim 8, wherein the main body belt is elongated in a longitudinal direction and includes a part at one end of the main body belt that is positioned in overlapping relation to a part of the auxiliary belt at one end of the auxiliary belt before the auxiliary belt is wound around at least a part of the hand and the wrist,
further comprising a connection portion passing through the part of the main body part and the part of the auxiliary belt so that the auxiliary belt is connected to the main body belt, and
the connection portion being disposed at a position overlapping the insertion port in the longitudinal direction of the main body belt.

10. The hemostatic device according to claim 9, wherein the auxiliary belt has a plurality of holes disposed at spaced apart locations along the auxiliary belt in a longitudinal direction of the auxiliary belt,
the connection portion includes a fixing member insertable through the holes of the auxiliary belt, the outer surface of the main body belt facing in a first direction, the fixing member projecting away from the outer surface of the main body belt in the first direction before the auxiliary belt is wound around at least the part of the hand and the wrist; and the fixing member is configured to be inserted through at least two non-adjacent holes among the plurality of holes of the auxiliary belt while the auxiliary belt is wound around at least the part of the hand and the wrist.

11. A hemostatic device comprising:
a main body belt configured to be wound around at least a part of a hand and a wrist of a patient;
a pressing member configured to be disposed at a site on the hand where bleeding is to be stopped to compress the site where bleeding is to be stopped, the pressing member having a width extending along a short axis direction and a length extending along a long axis direction, the length of the pressing member along the long axis direction being greater than the width of the pressing member along the short axis direction;
the main body belt including a distal region and a proximal region that are positioned relative to one another so that when the pressing member is at the site on the hand where bleeding is to be stopped the proximal region of the main body belt is disposed at a position farther away from a fingertip of the patient than the distal region of the main body belt;
the distal region of the main body belt including an anchor portion that includes
a space portion configured to receive the finger of the patient before the main body belt is wound around at least the part of the hand and the wrist of the patient so that the finger is positioned in the space portion before the main body belt is wound around at least the part of the hand and the wrist of the patient, and
an insertion port that is opened toward the proximal region and that communicates with the space portion to allow the finger of the patient to be inserted into the space portion before the main body belt is wound around at least the part of the hand and the wrist of the patient, and
a center line extending throughout the anchor portion,
the pressing member being configured to allow the site where bleeding is to be stopped to be viewed from outside in a state in which the pressing member is disposed at the site where bleeding is to be stopped, and the pressing member being fixed to the distal region of the main body belt at a position spaced from the insertion port and being fixed on a surface of the main body belt at which the insertion port is provided;
the pressing member being disposed, at the main body belt, at a position different from a portion through which the center line of the anchor portion passes;
the short axis direction and the long axis direction of the pressing member intersecting one another; and
the long axis direction of the pressing member intersecting the center line of the anchor portion.

12. The hemostatic device according to claim 11, wherein the anchor portion includes a distal opening that communicates with the space portion, the pressing portion being spaced from a region that is bounded by two lines: i) that are parallel to one another; ii) that are parallel to the center line of the anchor portion; and iii) that are disposed at diametrically opposite portions of an outer surface of the distal opening of the anchor portion.

13. The hemostatic device according to claim 11, wherein the pressing member is fabricated from a material and includes a first region positionable in contact with the site where bleeding is to be stopped, and a second region surrounding the first region, the second region including an adhesive having adhesiveness higher than that of the material from which the pressing member is fabricated.

14. The hemostatic device according to claim 11, wherein the pressing member is fabricated from a material and includes a first region positionable in contact with the site where bleeding is to be stopped, and a second region surrounding the first region, the second region being colored visually different from a color of the first region.

15. The hemostatic device according to claim 11, wherein the pressing member includes a first region positionable in contact with the site where bleeding is to be stopped, and a second region surrounding the first region, the first region including a water repellent layer having water repellency higher than a water repellency of the second region.

16. The hemostatic device according to claim 11, wherein the anchor portion includes a holding member, the holding member being a hollow tubular member that is positioned in the space portion and configured to maintain a shape of the space portion, the holding member being constructed of a material that is harder than a material from which the anchor portion is constructed.

17. The hemostatic device according to claim 11, wherein the main body belt is comprised of a first layer completely surrounding the pressing member, and a second layer to which the first layer is fixed, the first layer having one surface facing the second layer and an opposite surface facing in a first direction away from the second layer, the pressing member projecting away from the second layer in the first direction, the first layer being softer than the second layer.

18. The hemostatic device according to claim 11, further comprising an elongated auxiliary belt that is configured to be wound around the hand or wrist of the patient to assist in compressing the site where bleeding is to be stopped by the pressing member, a part of the elongated auxiliary belt being positioned in overlapping relation to a part of the proximal region of the main body belt, the elongated auxiliary belt and extending away from the main body belt, the part of the elongated auxiliary belt and the part of the proximal region of the main body belt that are positioned in overlying relation to one another being connected to each other, the elongated auxiliary belt possessing a width less than a width of the main body belt.

19. The hemostatic device according to claim 18, wherein the elongated auxiliary belt includes plural holes disposed at spaced apart locations along the elongated auxiliary belt in a longitudinal direction of the elongated auxiliary belt, the main body belt including a fixing member insertable through at least one of the holes of the auxiliary belt.

20. The hemostatic device according to claim 11, wherein:
the proximal region of the main body belt is a planar proximal region;
the main body belt has an inner surface that faces a surface of the patient when the main body belt is wound around at least the part of the hand and the wrist of the patient, the main body belt also having an outer surface that is opposite the inner surface;
the insertion port is located at a most proximal end of the space portion;
the pressing member is fixed on the inner surface of the main body belt at a position spaced on a proximal side from the insertion port; and
the pressing member is on a distal side of the planar proximal region so that after the finger of the patient is positioned in the space portion and after the pressing member is disposed at the site of the hand where bleeding is to be stopped, the planar proximal region is windable around at least a part of the hand and the wrist of the patient such that the inner surface of one part of the main body belt contacts the outer surface of another part of the main body belt.

21. A hemostatic device comprising:

a main body belt configured to be wound around at least a part of a hand and a wrist of a patient, the main body belt having an inner surface that faces a surface of the patient when the main body belt is wound around at least the part of the hand and the wrist of the patient, the main body belt also having an outer surface that is opposite the inner surface;

a pressing member configured to be disposed at a site of the hand where bleeding is to be stopped to compress the site where bleeding is to be stopped;

the main body belt including a distal region and a proximal region that are positioned relative to one another so that when the pressing member is at the site on the hand where bleeding is to be stopped the proximal region of the main body belt is disposed at a position farther away from a fingertip of the hand of the patient than the distal region of the main body belt, the proximal region of the main body belt being a planar proximal region;

the distal region of the main body belt including an anchor portion that includes a space portion configured to receive the finger of the patient so that the finger is positioned in the space portion, an insertion port that is opened toward the proximal region and that communicates with the space portion to allow the finger of the patient to be inserted into the space portion, the insertion port being located at a most proximal end of the space portion, and a distal opening that communicates with the space portion to allow the fingertip of the finger of the patient inserted into the space portion to protrude distally beyond the anchor portion;

the pressing member being configured to allow the site where bleeding is to be stopped to be viewed from outside in a state in which the pressing member is disposed at the site where bleeding is to be stopped;

the pressing member being fixed on the inner surface of the main body belt at the distal region of the main body belt and at a position spaced on a proximal side from the insertion port; and the pressing member being on a distal side of the planar proximal region so that after the finger of the patient is inserted into the space portion and after the pressing member is disposed at the site of the hand where bleeding is to be stopped, the planar proximal region is windable around at least a part of the hand and the wrist of the patient such that the inner surface of one part of the main body belt contacts the outer surface of another part of the main body belt.

* * * * *